Jan. 9, 1940.　　　A. H. ADAMS　　　2,186,814
TEXTILE FABRIC MANUFACTURE
Filed Aug. 16, 1934　　　19 Sheets-Sheet 2
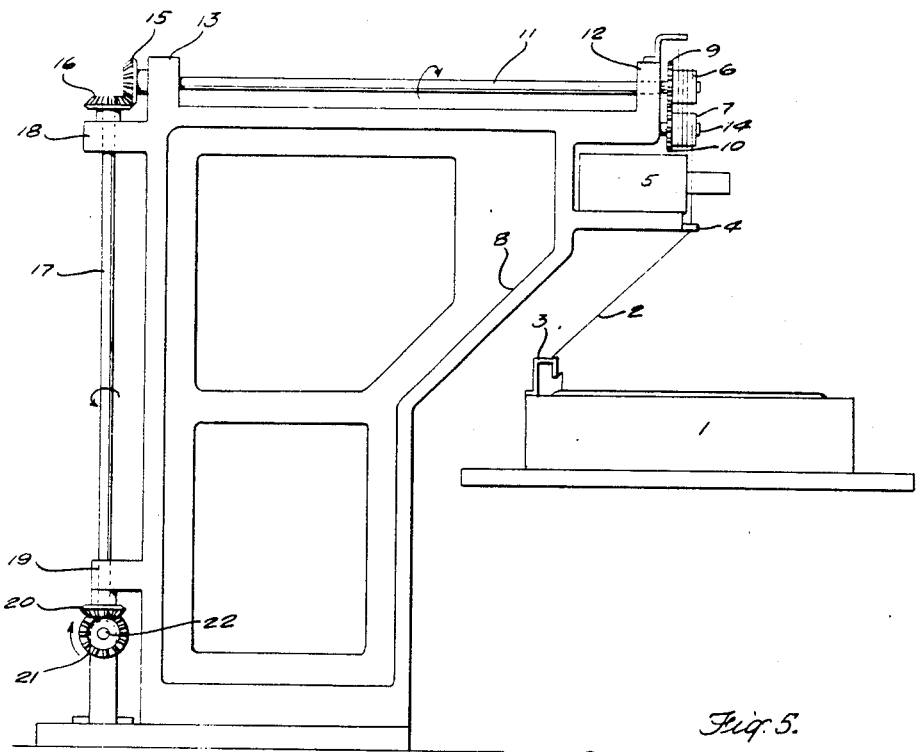
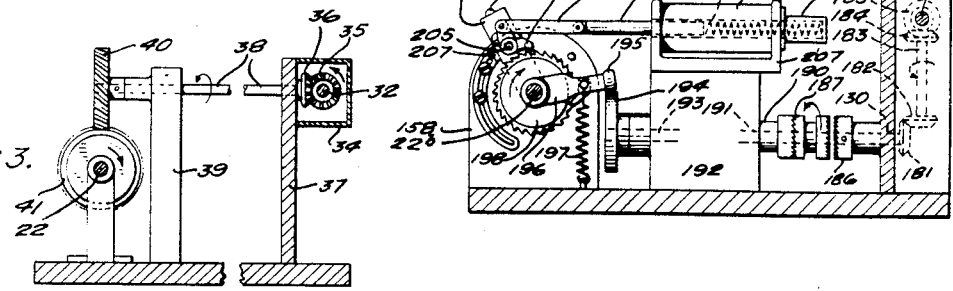
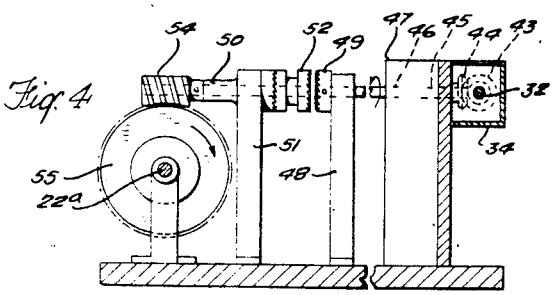
INVENTOR
ARTHUR H. ADAMS
BY
ATTORNEY

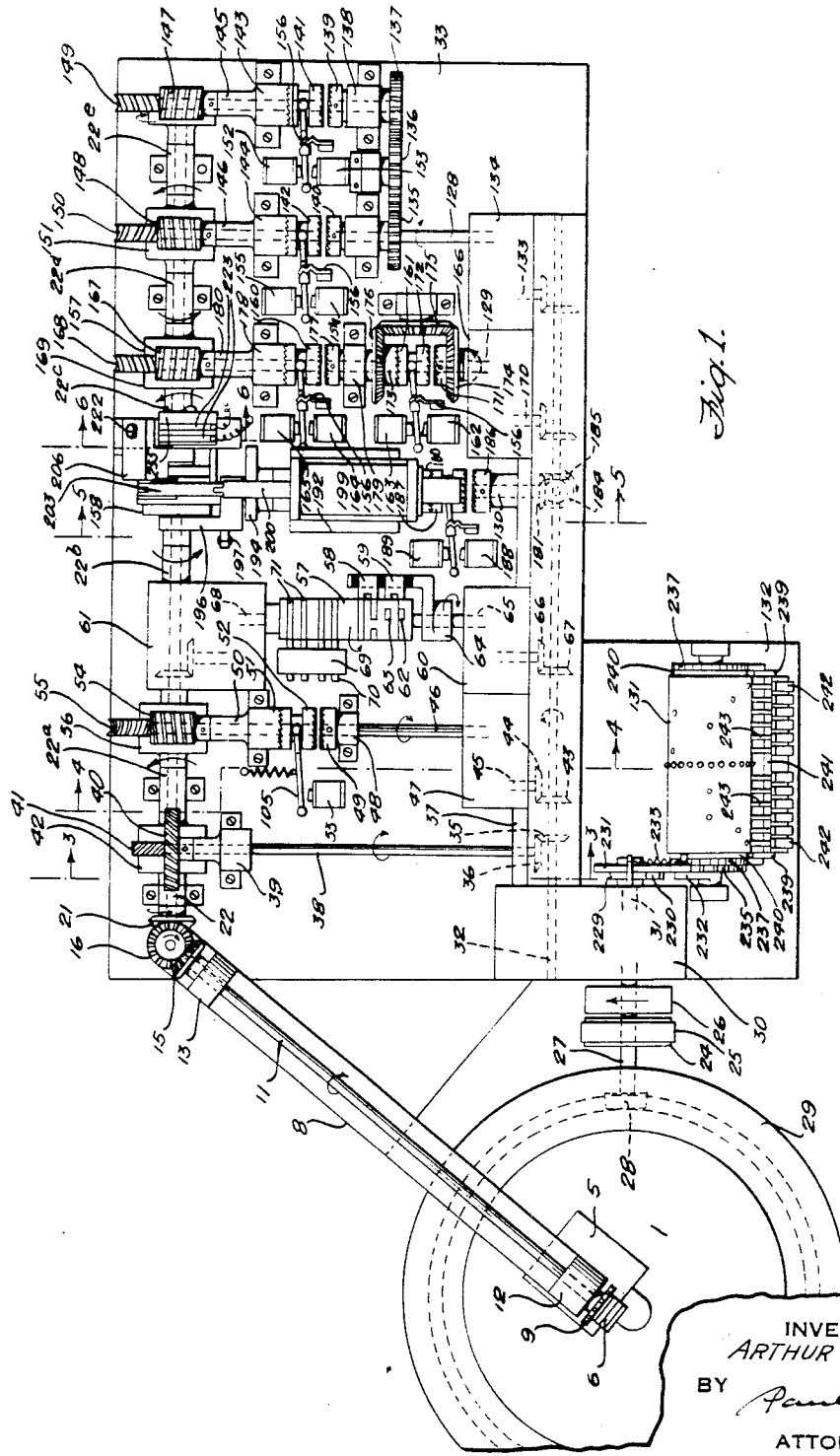

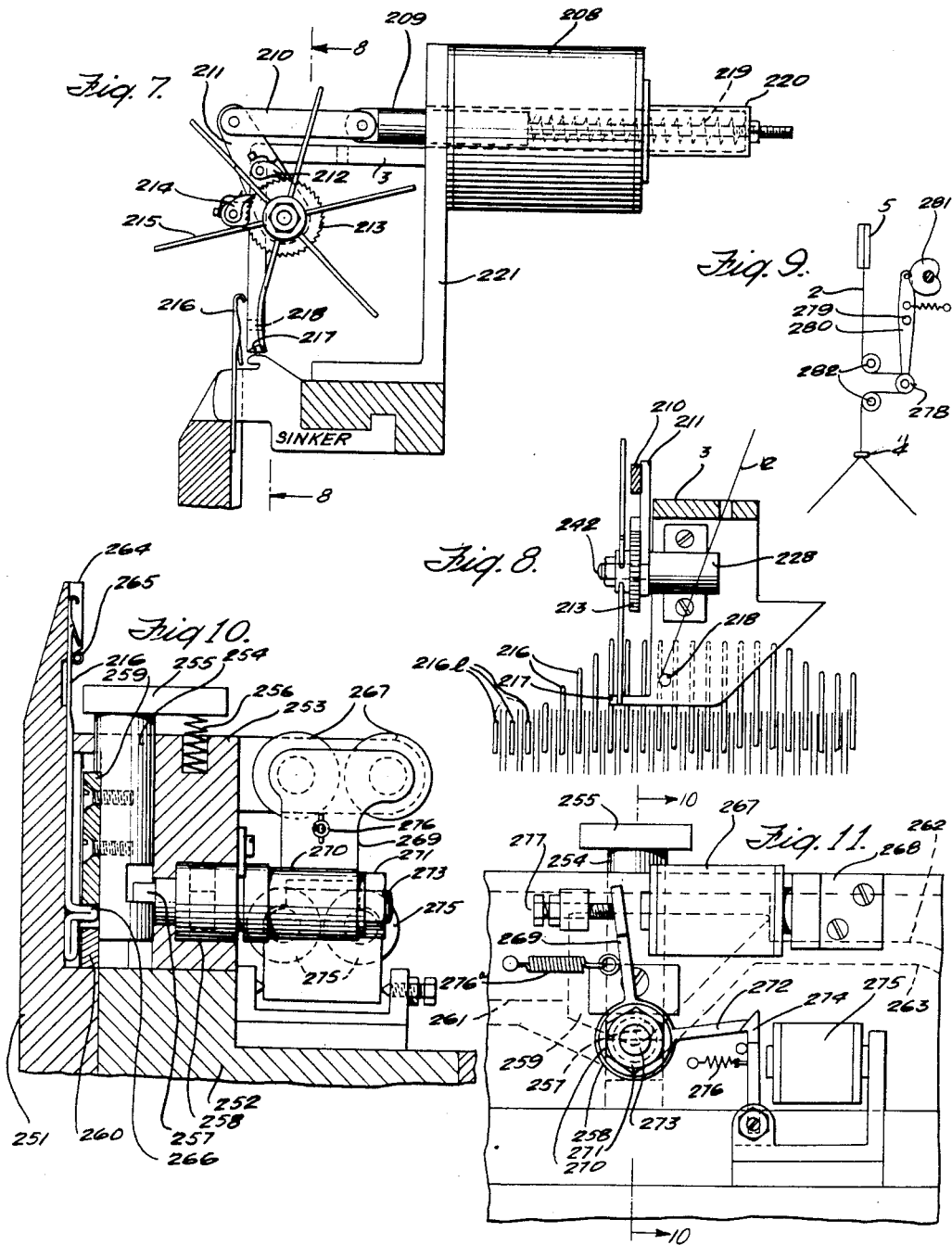

Jan. 9, 1940.     A. H. ADAMS     2,186,814

TEXTILE FABRIC MANUFACTURE

Filed Aug. 16, 1934     19 Sheets—Sheet 4

INVENTOR
ARTHUR H. ADAMS
BY
ATTORNEY

Jan. 9, 1940. A. H. ADAMS 2,186,814
TEXTILE FABRIC MANUFACTURE
Filed Aug. 16, 1934 19 Sheets-Sheet 5
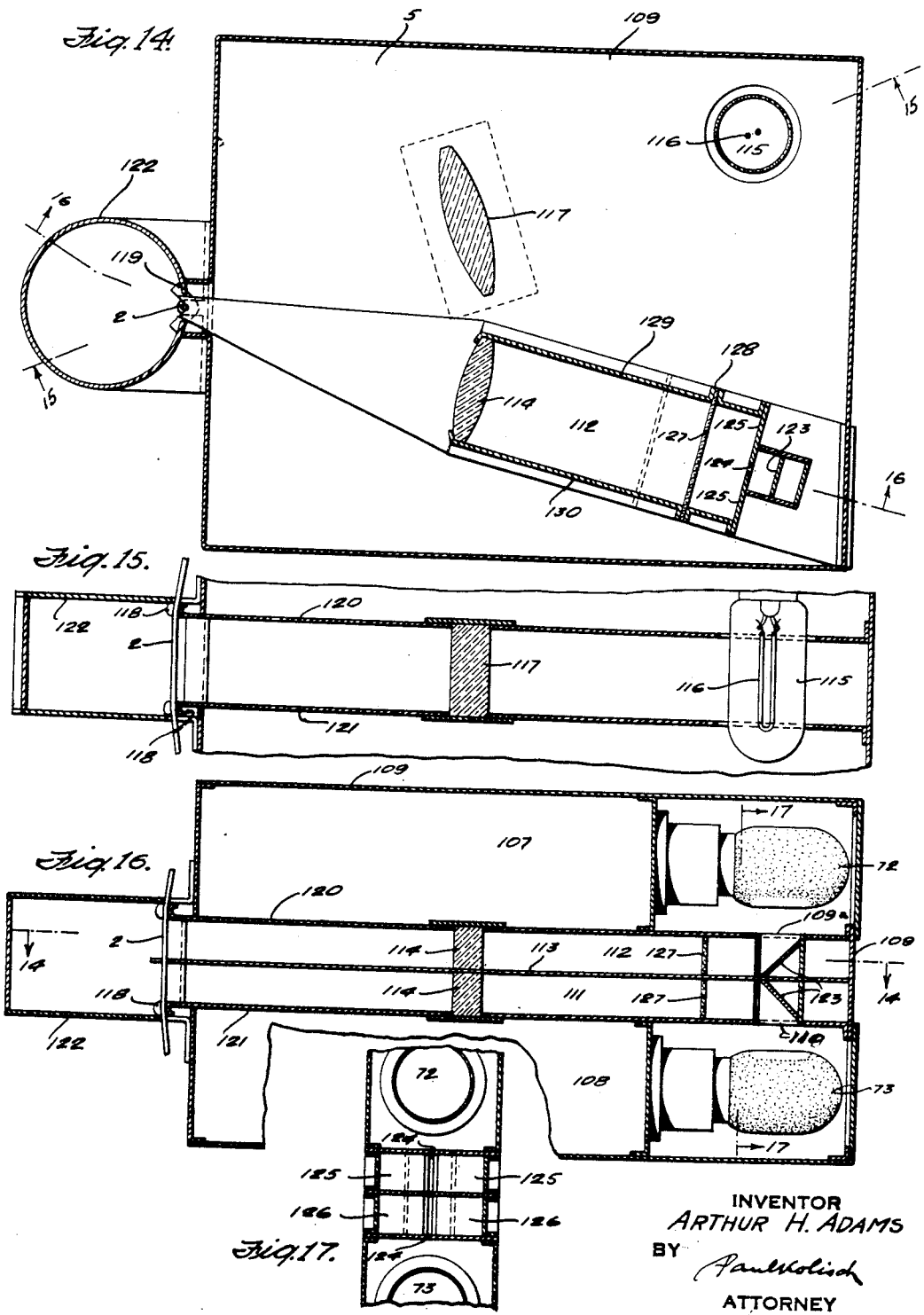

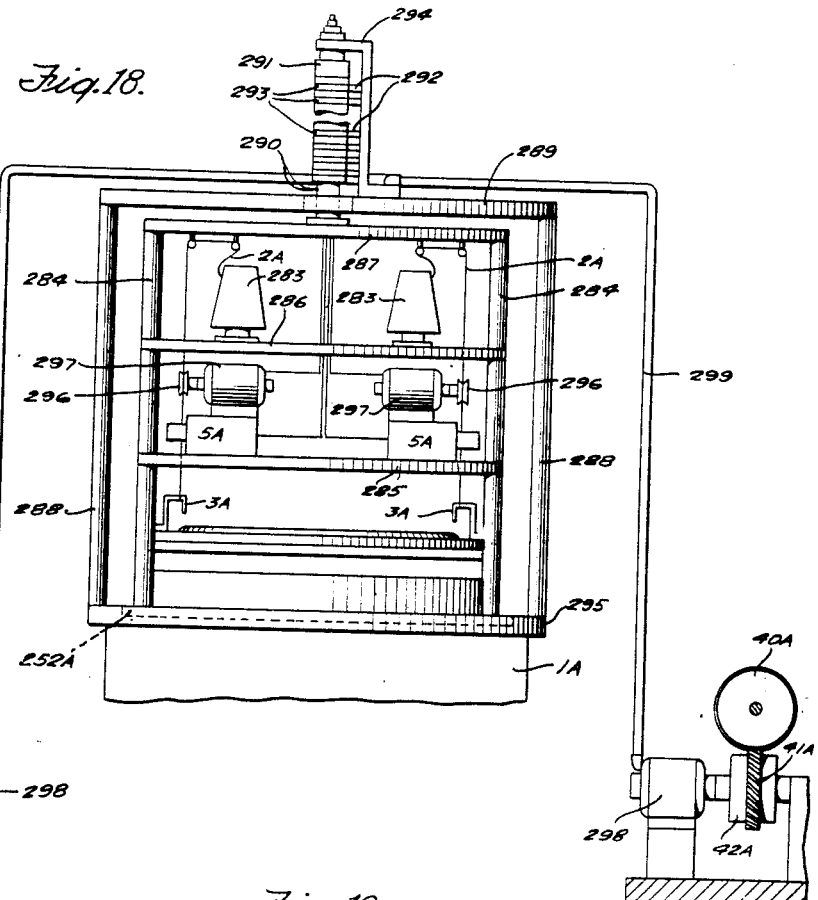

Jan. 9, 1940.        A. H. ADAMS        2,186,814
TEXTILE FABRIC MANUFACTURE
Filed Aug. 16, 1934        19 Sheets-Sheet 7
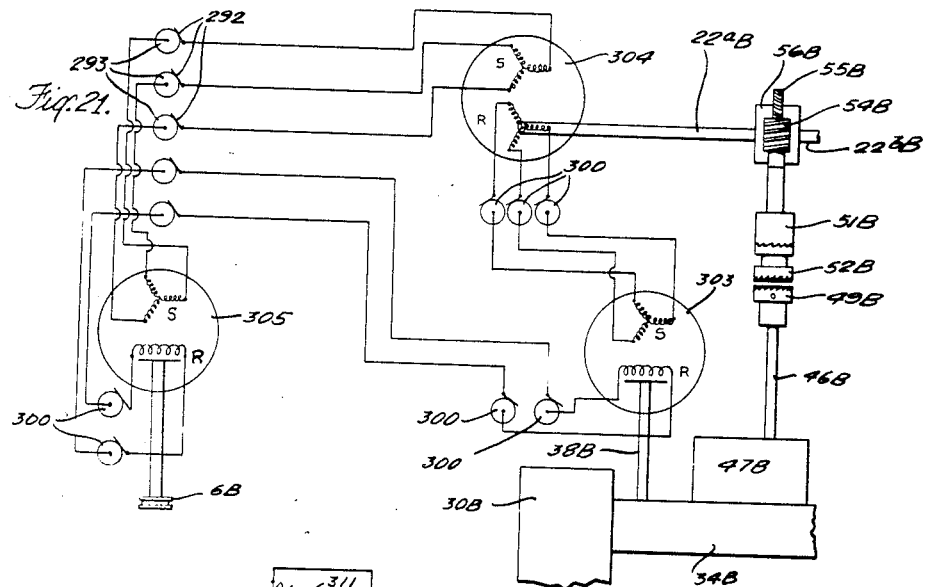
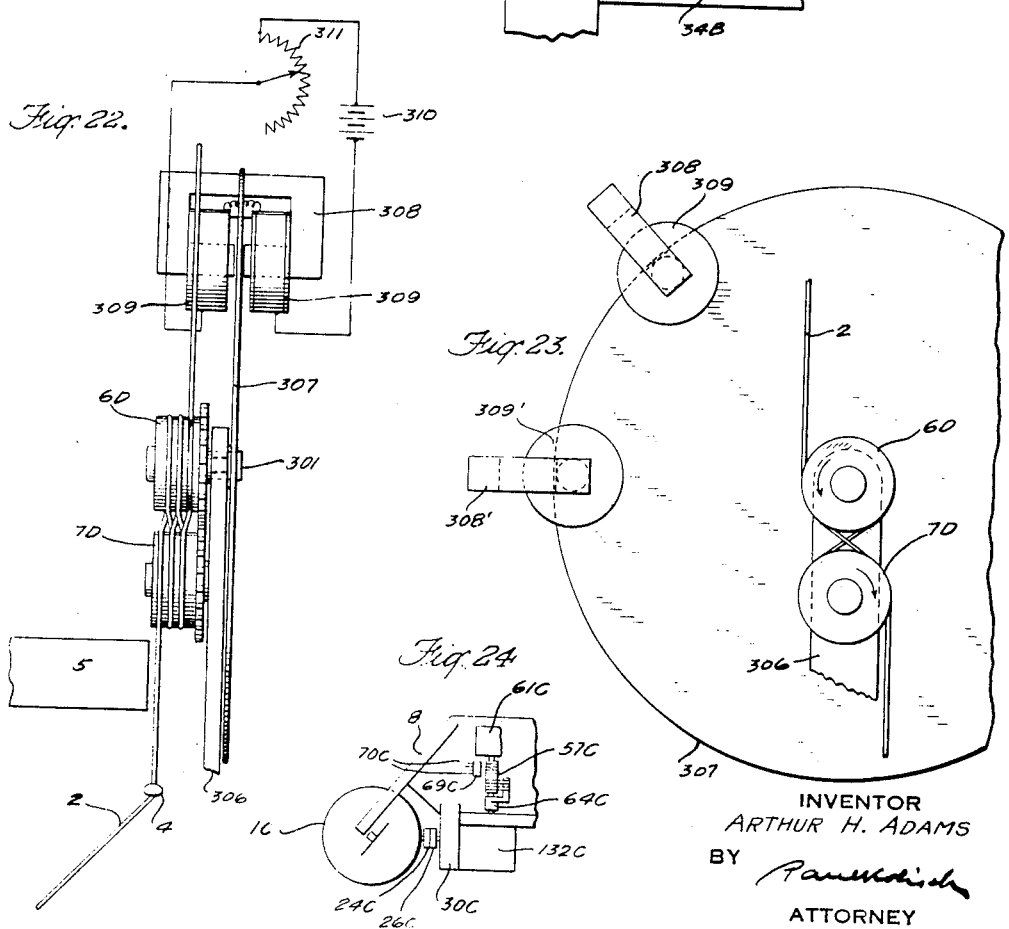
INVENTOR
ARTHUR H. ADAMS
BY
ATTORNEY Jan. 9, 1940. A. H. ADAMS 2,186,814
TEXTILE FABRIC MANUFACTURE
Filed Aug. 16, 1934 19 Sheets-Sheet 8
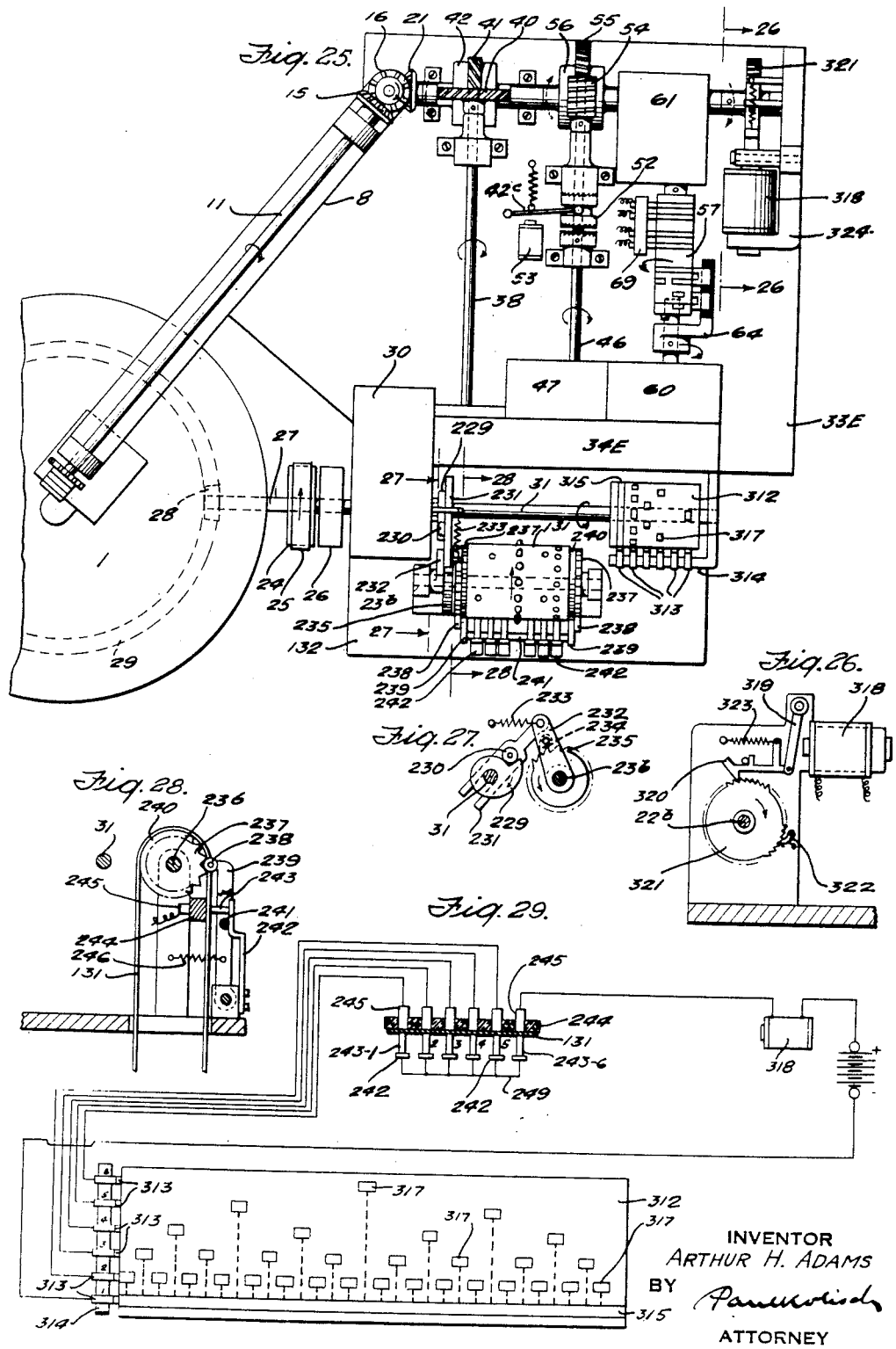
INVENTOR
ARTHUR H. ADAMS
BY
ATTORNEY

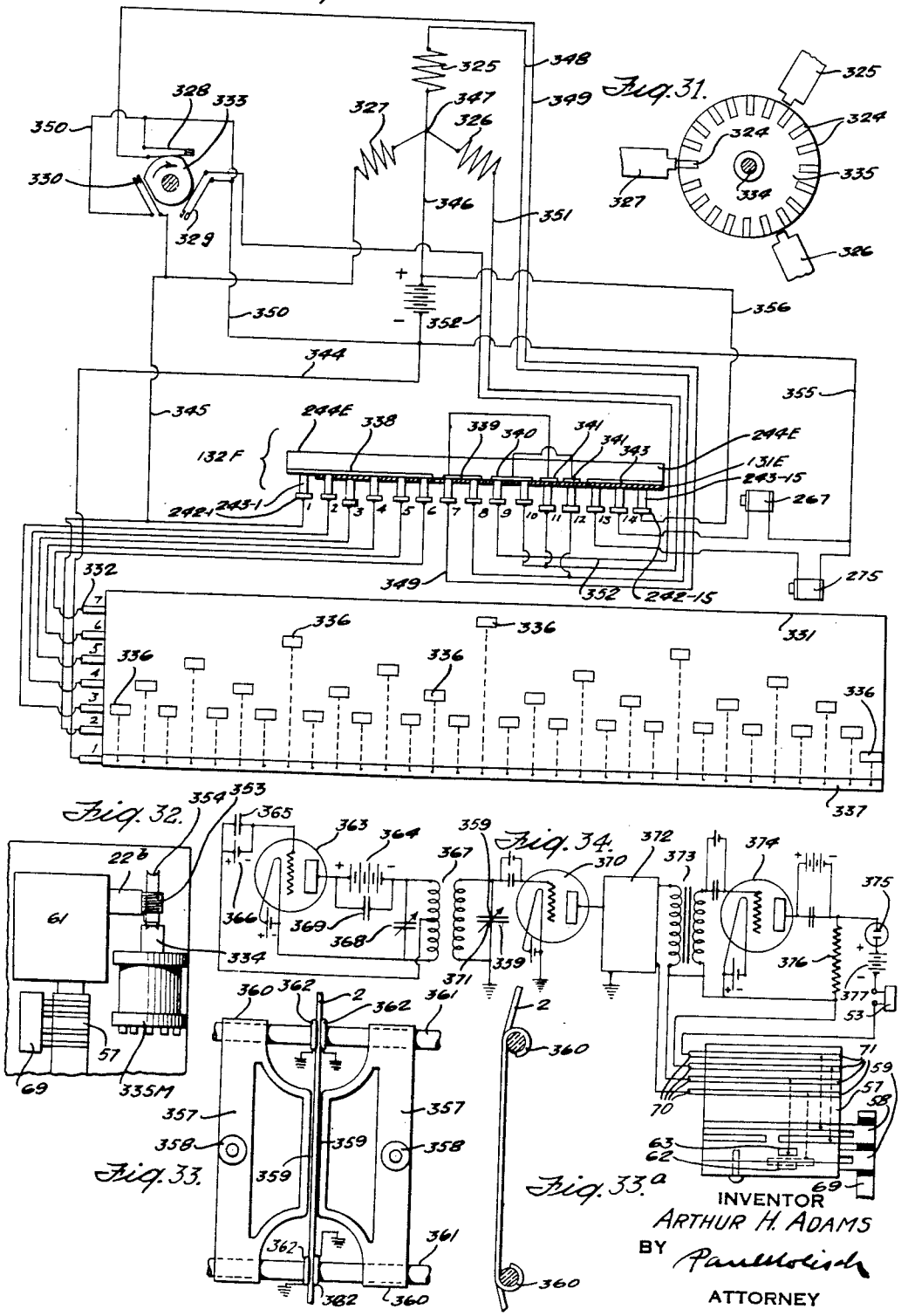

Jan. 9, 1940.     A. H. ADAMS     2,186,814
TEXTILE FABRIC MANUFACTURE
Filed Aug. 16, 1934    19 Sheets-Sheet 10
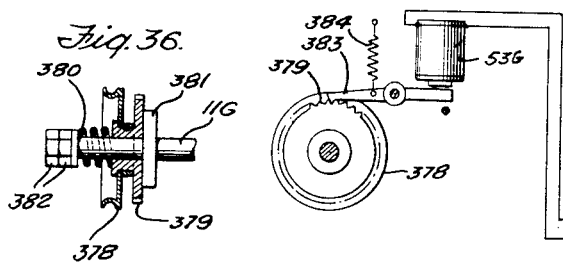
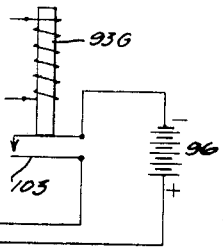
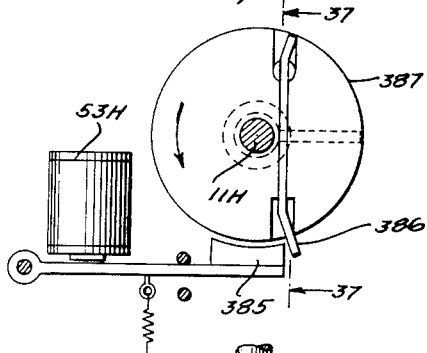
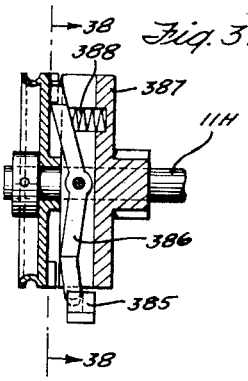
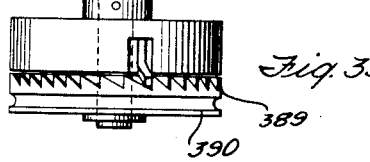
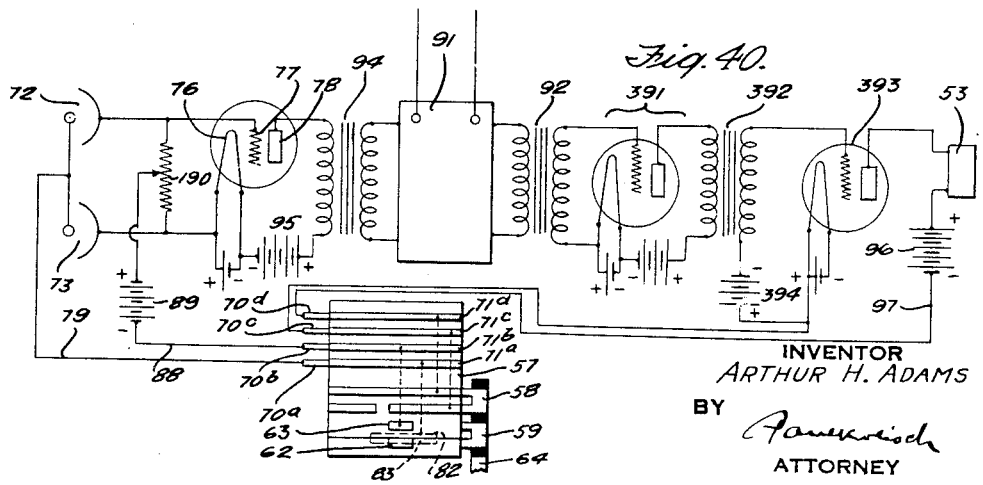
INVENTOR
ARTHUR H. ADAMS
BY
ATTORNEY Jan. 9, 1940.　　　A. H. ADAMS　　　2,186,814
TEXTILE FABRIC MANUFACTURE
Filed Aug. 16, 1934　　　19 Sheets-Sheet 11
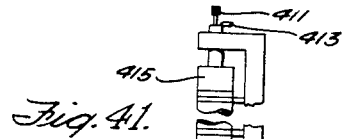
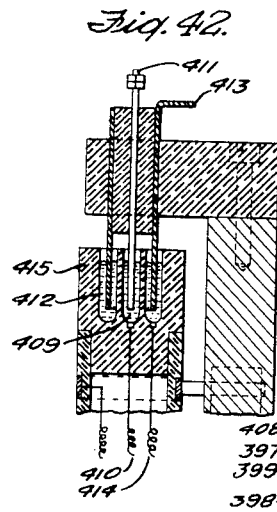
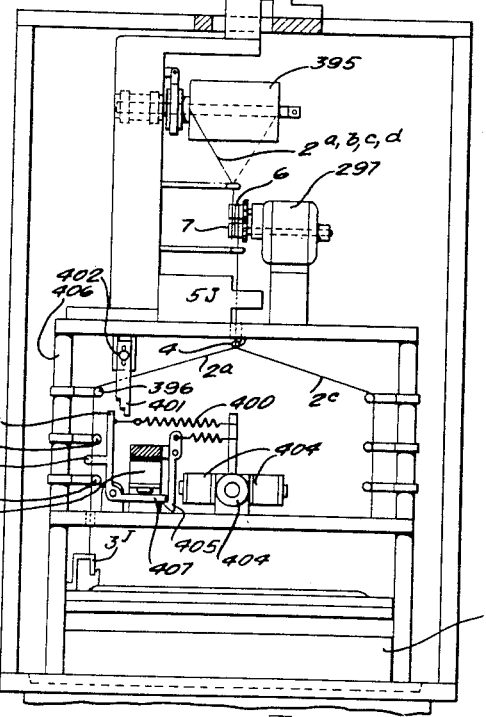
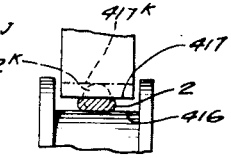
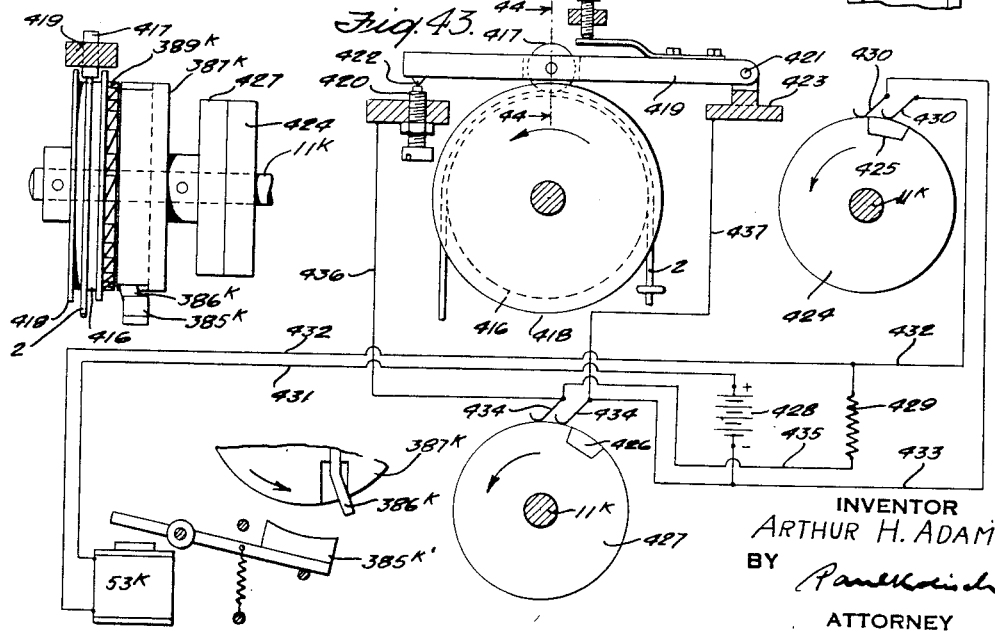
INVENTOR
ARTHUR H. ADAMS
BY
ATTORNEY Jan. 9, 1940.   A. H. ADAMS   2,186,814
TEXTILE FABRIC MANUFACTURE
Filed Aug. 16, 1934   19 Sheets-Sheet 12

INVENTOR
ARTHUR H. ADAMS
BY
ATTORNEY

Jan. 9, 1940.                A. H. ADAMS                 2,186,814
                      TEXTILE FABRIC MANUFACTURE
                   Filed Aug. 16, 1934      19 Sheets-Sheet 13
Fig. 52.
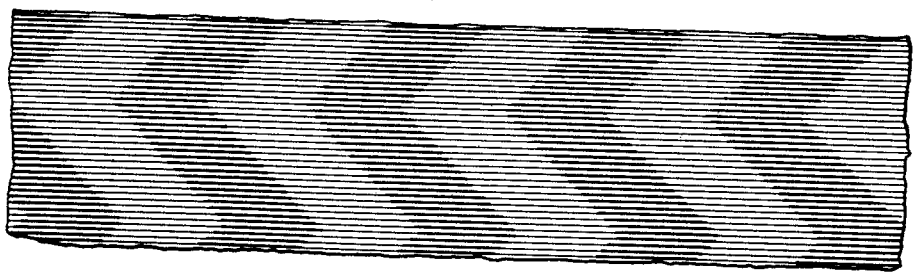
Fig. 53.
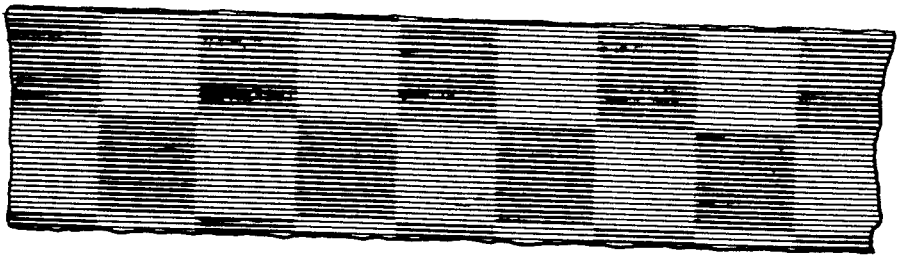
Fig. 54.
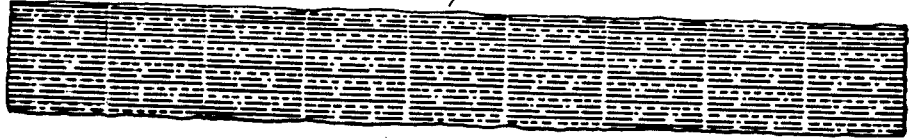
Fig. 55.
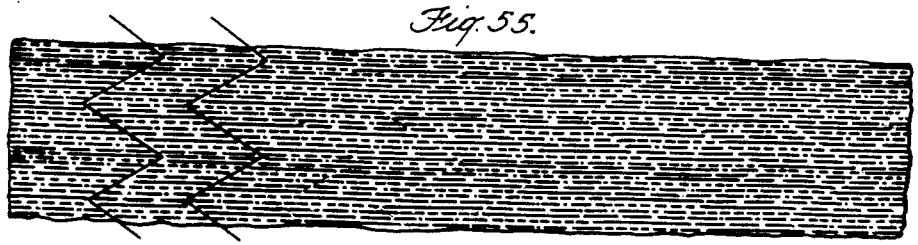

Fig. 58
INVENTOR
ARTHUR H. ADAMS
BY
ATTORNEY

Jan. 9, 1940.    A. H. ADAMS    2,186,814
TEXTILE FABRIC MANUFACTURE
Filed Aug. 16, 1934    19 Sheets-Sheet 14

INVENTOR
ARTHUR H. ADAMS
BY
ATTORNEY

Jan. 9, 1940.    A. H. ADAMS    2,186,814
TEXTILE FABRIC MANUFACTURE
Filed Aug. 16, 1934    19 Sheets-Sheet 15
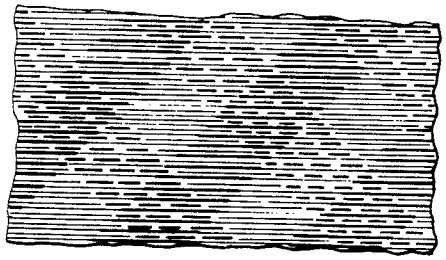
Fig. 67.
Fig. 68.
Fig. 69.
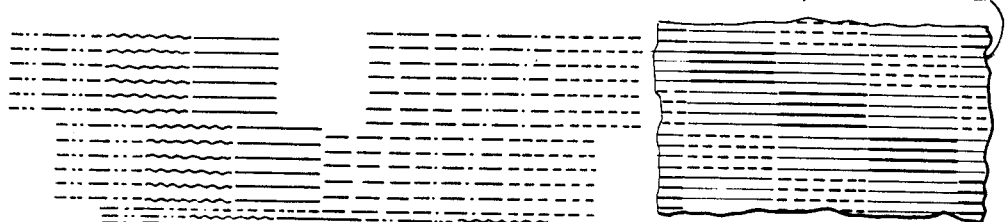
Fig. 70.
Fig. 71.
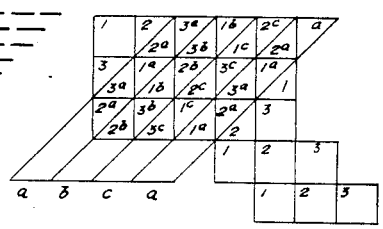
Fig. 71.ª
INVENTOR
ARTHUR H. ADAMS
BY
ATTORNEY Jan. 9, 1940.  A. H. ADAMS  2,186,814
TEXTILE FABRIC MANUFACTURE
Filed Aug. 16, 1934  19 Sheets—Sheet 16
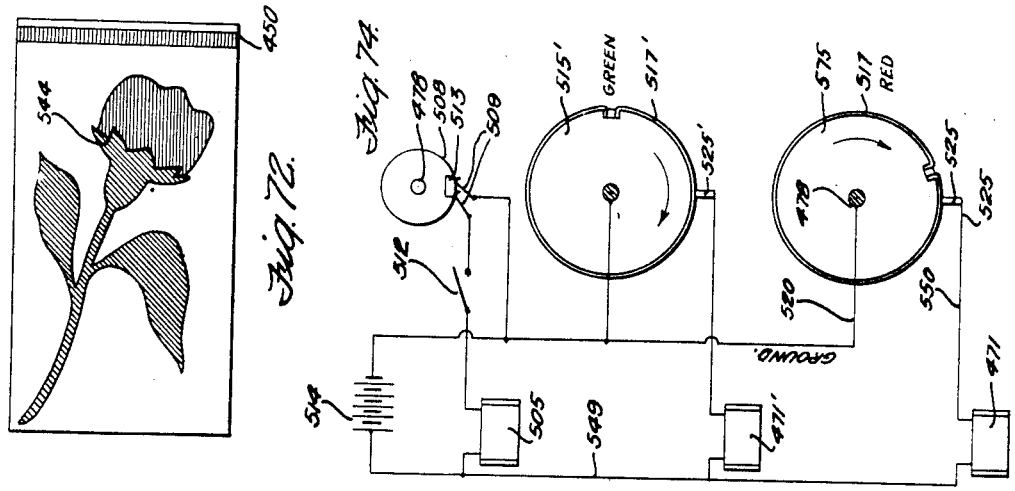
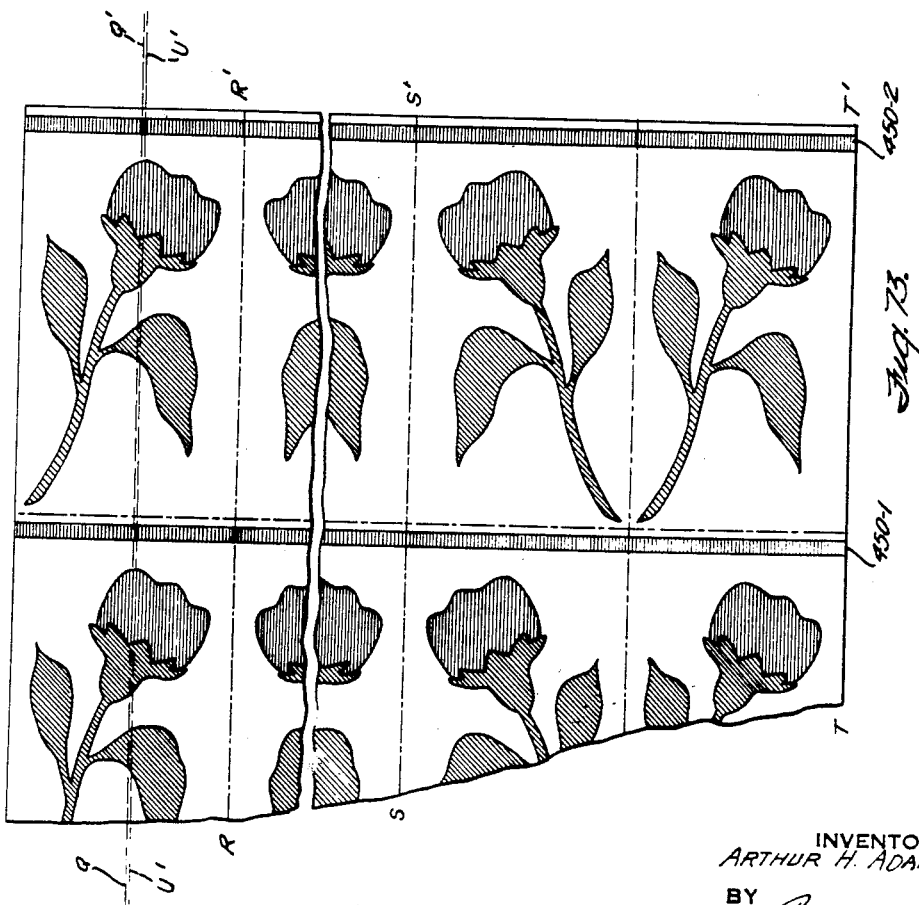
INVENTOR
ARTHUR H. ADAMS
BY
ATTORNEY

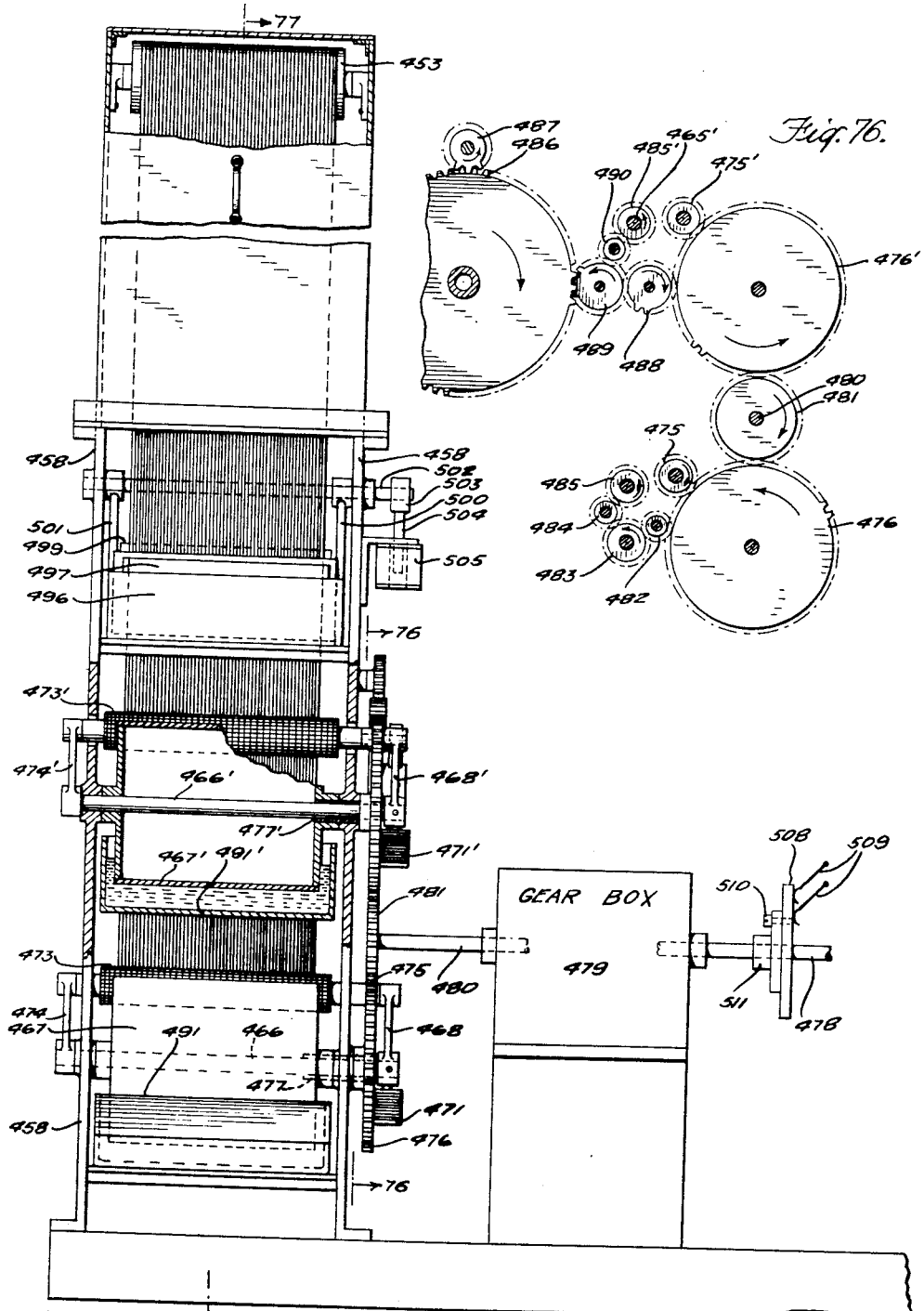

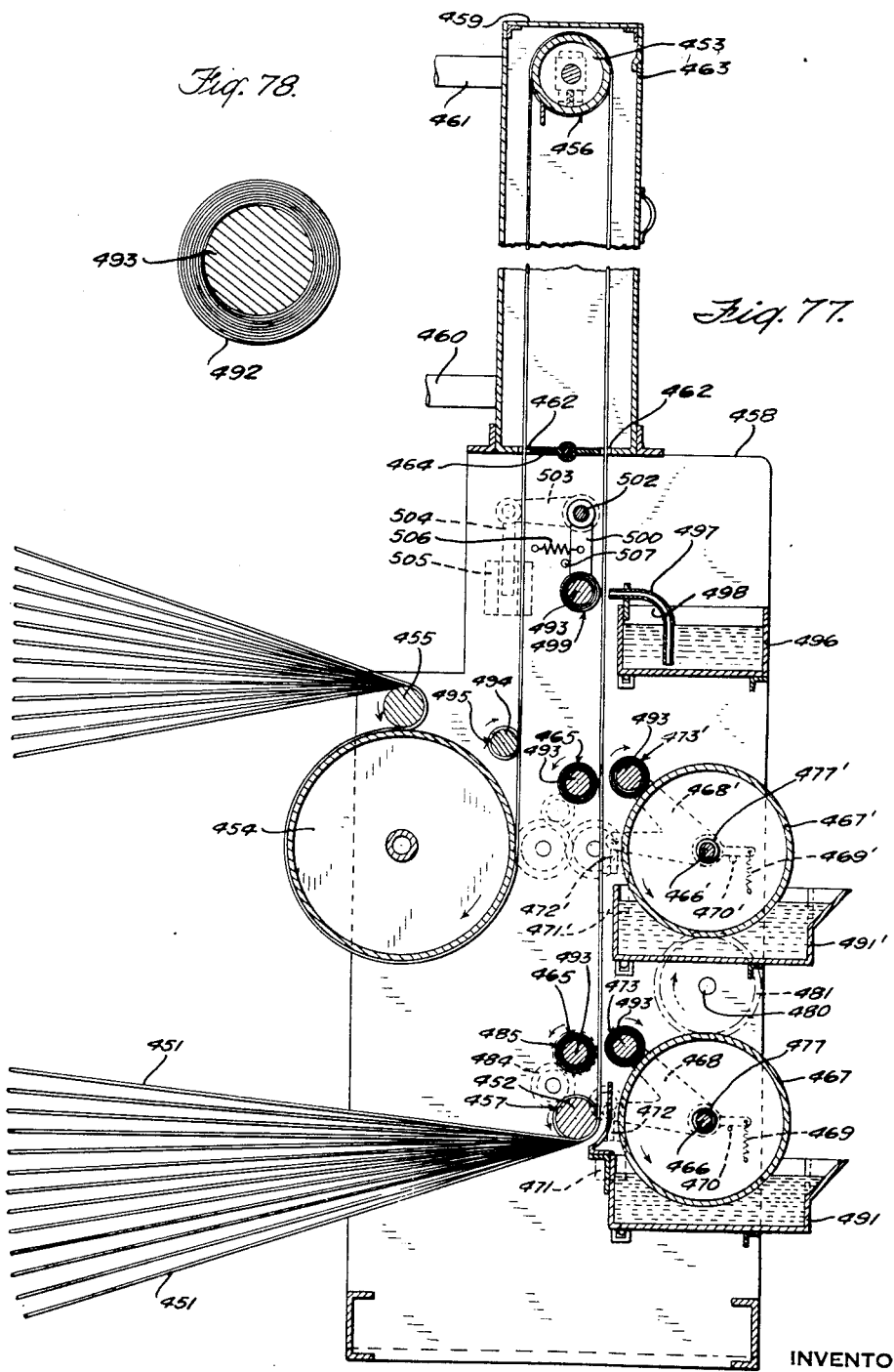

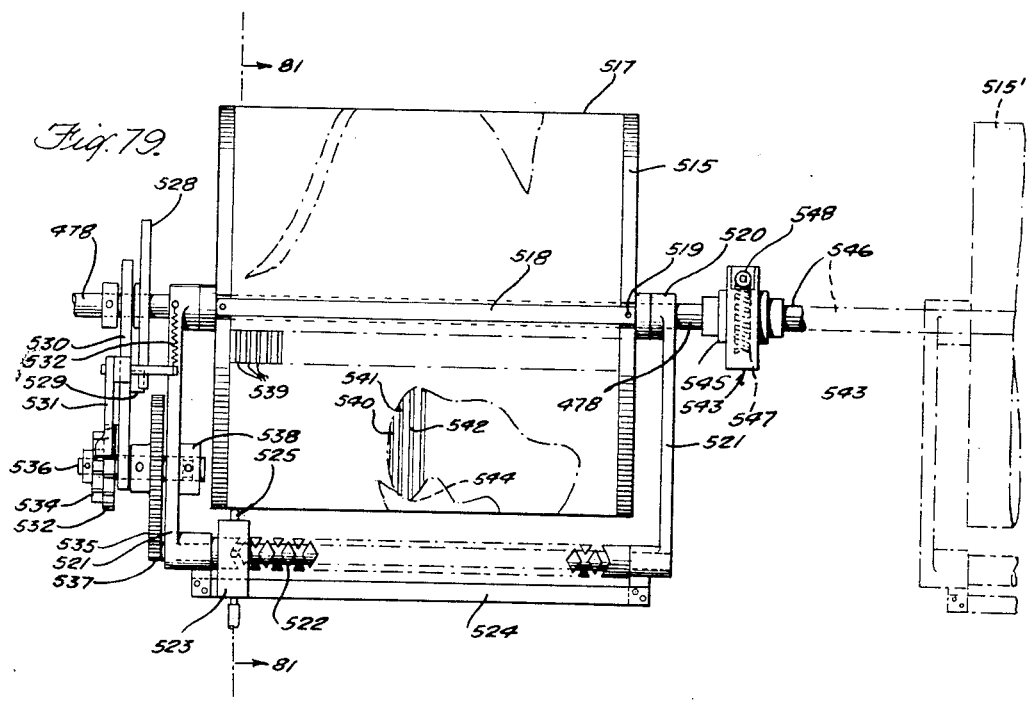
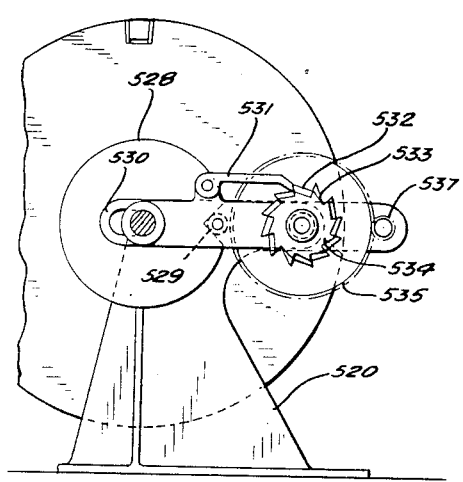
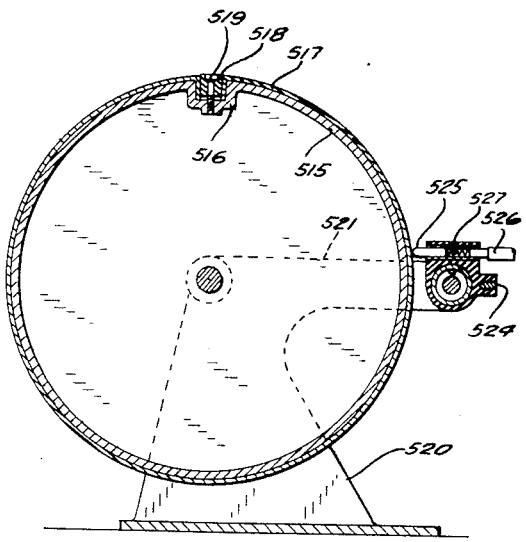
Fig. 79.
Fig. 80.
Fig. 81.
INVENTOR
ARTHUR H. ADAMS
BY
ATTORNEY Patented Jan. 9, 1940

2,186,814

UNITED STATES PATENT OFFICE 2,186,814

TEXTILE FABRIC MANUFACTURE

Arthur H. Adams, Yonkers, N. Y.; Edith R. Adams, executrix of said Arthur H. Adams, deceased, assignor to Herman Epstein, Newark, N. J.

Application August 16, 1934, Serial No. 740,075

47 Claims. (Cl. 66—125)

This invention relates to new and useful improvements in the ornamentation of fabrics produced from polychrome yarns by knitting or other well known methods of the textile art.

By a polychrome yarn is here meant a filament having sequentially in its length a plurality of differently colored stretches. The linear pattern may be repeated very frequently or in comparatively short lengths, or the pattern may be very long, such as to form a considerable area of fabric before repeating itself fully. A long repeat may, of course, contain stretches of short repeats.

By proper control of the placement in a fabric of yarns of the class of short patterns, (these will usually be so short as to repeat one or more times in a cycle of the machine—i. e. in one "course" of a knitter, in one "pick" of a loom, etc.) a vast number of new geometric and color effects can be produced in fabrics. Furthermore, reliably uniform mixed and random effects can be produced by means of polychrome yarns. Heretofore practically all fabric ornamentation has been by changing the stitch or fabric structure or by alternating the use of two or more yarns of different solid colors.

Fabrics have been produced by hand weaving using yarns colored beforehand in appropriate spacings and tints. By laborious manual adjusting of such yarns or threads both in the warp and filler, irregular crude patterns could be produced. One example of this is the Japanese spotted tissue, known also as "Kasuri."

It will be noted that fabric ornamentation of this sort involves no change in the weave or structure of the fabric as it does in all applications of the jacquard. The simplest and sheerest weaves and knitted structures may be used. This polychrome yarn method of fabric ornamentation gives equally clear color effects on both sides of the fabric and there are no wasteful or unsightly stretches of unnecessary threads on the back side.

The art of printing in color on sheer muslins and the like comes the nearest in results to this new art of any now practiced save the above mentioned handicraft art. However, the effects attainable are not the same since prints are never full colored and presentable on the back of the fabric. The outlines of the figures in prints are very hard and mechanical, being independent of the threads or stitches of the fabric. The whole knitting art to which this new art of ornamentation is particularly adapted yields fabrics to which printing cannot be applied because they stretch too easily, are too thick and too resilient.

In contrast, by my invention knitted patterns can be produced which have a prearranged artistic regularity or softness of outline more pleasing than prints or even the best product of the jacquard.

Heretofore, in knitting the range of patterns and effects obtainable by mingling and changing yarns was relatively limited. In weaving we deal with a large number of yarns particularly in the warp and a tremendous range of ornamentation is possible by varying the colors of these warp yarns and varying their interweavings. In knitting, preferably a single yarn is used and by the very structure of knitted fabrics this yarn may not be changed too often. A considerable range of ornamentation is now practicable in knitters by various devices for dropping or varying the stitches, doubling or otherwise changing the yarn, introducing jacquard type pattern controls, etc. Nevertheless, knitted goods as heretofore produced were inherently restricted in ornamentation when compared to woven goods. My polychrome ornamentation therefore greatly enriches the knitting art. By the very nature of this invention involving the accurate positioning in the fabric of the colored yarns used, it is well adapted to cooperate with the various pattern knitting devices. If a knitter is equipped, for instance, with means to produce a diagonal or zig-zag double stitch line or a ladder or open stitch effect it may be synchronized with the colored yarn feed of this invention so as to cooperate with the pattern wheel or stitch control in use, whereby the figures or shapes in the fabric structure may coincide with shapes or outlines of the color.

Any figure or representation, however complex, can be reduced to or embodied in a linear pattern. Suppose, for example, that a spray of flowers in three colors be stenciled on a plain woven or knit fabric. Let this fabric be then unraveled. The long unraveled yarn will then exhibit a certain definite sequence and extent of the three colors. If it were replaced in the fabric, millimeter per millimeter, just as it originally lay, the original figure, a three colored spray of flowers, would be recreated.

By this invention, such "long repeats" or long yarn patterns are also made possible, and the exact and planned building thereof of fabrics ornamented with figures. Means are shown to print such long patterns from a control sheet.

One of the objects of this invention is to provide a cheap and accurate control of the placement of polychrome yarns in fabrics.

Another object is the production of ornamental two dimensional patterns in fabrics by the prior production of suitable linear color patterns on filaments and by the planned positioning of these linear patterns in the fabric being formed.

Another object is the automatic production in fabrics of ornamental effects due to changes in the rate of use of repetitively colored yarns.

Another object is the production of planned figures and effects in knit goods by the accurate control of the rate of use of plannedly colored yarns.

Another object is the positive and reproducible generation in knit goods of mixed or random effects from parti-colored yarns of known linear pattern without those occasional and objectionable striped or insufficiently random areas that result when the yarn use rate is not constantly controlled in relation to the linear pattern thereof.

Another object is the production of cyclically varying effects such as wave patterns and zig zag effects, in knit goods by cyclic variations in the feed of parti-colored yarns.

Another object is the determination according to a standard time schedule, of the timing of the feed of a parti-colored yarn in relation to its colors and the correction of that feed before the yarn is caught in a fabric.

One object is the control by linear color patterns of the color phase between a portion of polychrome yarn being laid into a fabric and a portion previously laid in, whereby colored yarn portions are ornamentally juxtaposed.

Another object is the automatic control of the feed into fabric of long sequentially colored yarn patterns to form figures in the fabric,—where the yarn color changes are not regularly repeated at sufficiently short intervals for easy color control,—by the use for this control of electrical or mechanical properties of repeated marker spots placed in relation to the yarn colors.

Another object is the automatic color printing of the necessary long sequentially colored yarns, according to a master, for combining into a fabric under accurate planned feed control so as to produce planned figures therein.

Another object is the control of the feed of polychrome yarns into fabrics at such rates that various planned color blendings occur by the successive juxtaposition of differently colored portions of the one yarn, and/or of several yarns.

One object is the provision of a program sheet or jacquard means whereby the controlled yarn feed may be automatically changed, i. e. timed to varying rates, in a planned order, so as to produce automatically a sequence of changing fabric effects as planned by the fabric designer.

*Fundamental principles*

Accurate control of the rate at which the yarn is used, or fed into the fabric is one of the important features of this invention. A rate of use or of feed measured by the color spots and not by feet and inches is necessary.

In applying the invention to a circular knitting machine let us call X the rate of yarn pattern use, i. e. the number of short yarn patterns used per cycle or course.

It will be obvious that when the yarn pattern is relatively short and simple (e. g. red, blue, green, yellow spots, each 2″ long) if X is any exact whole number, the result will be plain vertical stripes of those colors. The red spots will fall exactly under the red spots, etc., all the way around, and in each course.

Now if X (the number of repeats or repetitive patterns of yarn color in a course) is even very slightly changed,—say from 8 to 8.01 or to 7.99,—the result is a slant of those color stripes. This slant of the stripes will be maintained as long as this new value of X is maintained.

If X is now changed more and more the slanting plain stripe slants so far it merges into mixed colors (e. g. the red spots fall under the blue spots, etc.) and then again into various selective color mixtures (e. g. red and green in one stripe, blue and yellow in another). A rich gamut of fabric effects is obtainable by the use of simple short linear color patterns of yarn and is in fact obtainable by the mere changes of color-phase relations of one course to the next. This is another way of saying that these effects are all obtainable by controlledly varying the rate of yarn feed.

A few of the practically infinite effects and of the rules of these changed color-phase relations will be illustrated and explained.

It should be noted that if X be increased or decreased only temporarily (e. g. during only one "course" or machine cycle) and then quickly restored to its prior value, the figure or effect due to that prior value will appear to break off sharply and to resume at once at a laterally shifted point. While this very temporary change in the value of X fundamentally obeys the same rules as a more permanent change, and is actually a more change of rate quickly discontinued, it is convenient to call it by a different term. We shall therefore speak of "gains" in the rate of use of yarn patterns in the fabric, or merely "gains", as those semi-permanent changes in X that produce new fabric effects such as new slants and/or mixtures, and we shall call "shifts" those very temporary changes in X that produce lateral displacements of existing fabric effects (e. g. sidewise slip of stripes—giving checker effects, etc.)

"Gains" and "shifts" can both be plus or minus. Positive gains and shifts are herein defined as those that put more yarn in the course than before. Negative gains and shifts put in less.

The first thing to note is the exceedingly great sensitiveness of the fabric patterns or effects to vary small gains: Let us suppose in a small 200 needle circular knitter with one feed, that X is exactly integral. We shall find that the color spots in each course come exactly under each other, i. e. we obtain vertical stripes of plain colors. Now let us feed the yarn to the machine a little faster, or otherwise cause the knitter to use a little more yarn per course. Let us say only one-half of 1% more. This is enough to cause the positive gain of one needle or one whole stitch per course. The stripes are then changed from vertical to a slant of about 45° (a stitch to the side for every stitch down) by this mere one-half of 1% gain. A 1/20 of 1% gain in this instance would be very noticeable. In a one feed 500 needle machine an even smaller percentage is noticeable.

It follows that the means, of whatever kind, used for controlling and measuring off the yarn in patterns must be positively geared or otherwise definitely related or timed to the machine drive without any slip or creep at all. The drawings show both a fully geared hook-up whereby and desired color phase relation or any desired gain or shift from any original relation can be obtained by gears and clutches (the various amounts of gain to be used, i. e. the gear ratios, being first, for each yarn, set up on change gears).

They also show a more universal and much simpler hook-up where the right combination out of several interrupters gives any desired number of impulses per course to a step-by-step or impulse motor, which latter adds to or subtracts from an otherwise constant so called "basic" feed rate of yarn per course. E. g. 20 steps of this "gain motor" might be arranged at will to add 2" to, or to subtract 2" from, the amount of yarn basically fed per course. One forward or backward step of this motor per course would give sufficient gain (positive or negative) to create a marked slant in the stripes or fabric patterns. With this universal step by step gain control, while the setting up change gears is eliminated, there is a slight theoretical objection in that the gains are made by small but rather sudden discrete steps. If these steps are small enough, however, the elasticity of the yarn will integrate them into a fairly even gain in rate of feed. In any case the errors introduced are local and temporary and not cumulative.

One requirement of this invention is a reliable method and means of measuring off the yarn not by inches but by color patterns such that—if it be decided to feed 9.01 color patterns of yarn per machine cycle—it will be possible to feed on the average just 9.01 patterns and not (on the average) 9.02 or 9.015 such patterns.

This requirement does not mean that there shall be no errors in the rate of feed; it does mean that there shall be practically no cumulative errors. If the requirement is 9.01 patterns per course, and if the yarn fed into one course happens by local error to be 9.02 patterns, the yarn fed to the next course or so will average about 9.00 patterns, thus bringing the total average close to the requirement. It will approach the requirement more and more closely the larger the number of courses considered.

This result is obtained by constantly checking at proper instants the position of the color patterns of the running yarn, well before it goes into the fabric, (using one of several automatic means of which the photocell is one), and instantly making a correction in the yarn position (e. g. retarding or setting it back if it is found to be ahead of time).

By this technique, permitting only a non-cumulative deviation of the yarn pattern from the desired absolute relation or "phase", a fabric pattern outline (the edge of a stripe, for example) is obtained that has the following characteristics: it is statistically exact, straight if it should be straight, slanted or curved if it should be, zig-zag or stepped or broken, all mathematically true as planned. Yet the edge or outline of any figure or stripe is irregular or rapidly wavering. It is as though traced by a trembling hand but by a perfect eye.

This trembling or deviation of the line from the perfect or mean line is definitely limited. This limit is fixed by the frequency with which the automatic (e. g. photocell) check is made of the yarn position and by the amount of the individual corrections made in that position. "Is the yarn on time or ahead of time in relation to the machine?" is a question automatically answered at very frequent intervals. The more frequently this question is answered, the smaller each corrective retardation or 'set back' of the yarn may be, and therefore the smaller the fluctuations about the perfect mean of the line of fabric stripes or patterns.

One very distinctive feature of this invention is this constant inspection, or checking up (by automatic means) of the position or "on timeness" of the yarn itself before it has entered the fabric. This checking is done while, as a matter of fact, there is still opportunity to correct a large part of any slight error found. This results in much more accurate placement of the colored spots in the fabric than can be had by any means whatsoever of watching the fabric patterns as they form.

There is another advantage in this feature, relating to that class of fabric effects called random, which is one of the most important classes to be made of polychrome yarns. Owing to my provision of means for inspecting the yarn in time to do something at least partially corrective before the yarn is in final position in the fabric, random or "mixed" designs may be prearranged which have no shape or definite figures. The difficulty of controlling mixtures by inspection of the fabric is obvious since the desideratum is a fabric with no marked pattern or stripe, or at least having no areas of marked pattern. To inspect all the newly formed fabric continuously and rapidly so as to make sure that no marked patterns or stripes are forming anywhere and to determine quickly enough correct preventive action by such inspection would be well nigh impossible. In fact, if 'random' patterns were attempted by visual inspection of the fabric accompanied by manual corrections of the tension or feed of the yarn it would be practically impossible to expect an operator to determine whether the dissipation of any given incipient stripe requires speeding up or retarding of the yarn feed.

By purely visual inspection of the fabric patterns formed by polychrome yarns and by consequent manual adjustment of tension or of other determinants of rate of use of yarn, some knitters in the past have attempted to control fabric patterns.

The results, as regards accuracy, and range of fabric effects are not remotely comparable with those of this invention. The cost is very much higher due to the need of constant close attention.

The edge of a stripe, so made, may be said to wander rather than to tremble. The operator in these prior attempts was forced to wait until the yarn feed rate had already gained or lost enough to show a clearly visible trend away from normal in the stripe (or other fabric pattern) he was set to watch; only then could he decide whether to increase or decrease the tension or to change the stitch or the adjustment of the 'sinkers' or to exercise other controls over the yarn feed rate. The operator's eye was the sole criterion of the correctness of the lines developing in the fabric, and their incorrectness had to be already irrevocable and plainly visible before he could begin to correct it. He would then usually over-correct it, with a consequent oscillating 'wander' like the track of an inexperienced cyclist.

Only very crude and simple patterns, wide bold stripes, etc. could therefore be made by such posthumous correction methods, because the very big inherent wanderings would spoil the appearance of fine, delicate or intricate fabric patterns.

In accordance with another feature of this invention means are provided to record and execute the designer's will, changing gains and making shifts automatically, of proper sign, in proper sequence, and only after the correct or planned number of courses or cycles. Such a means, not unlike a jacquard sheet, is shown and described. This program control, with the definite gearing or gain motor means for obtaining any desired gain or shift, multiplies enormously the possibilities of fabric ornamentation opened up by this invention. No purely manual yarn feed control, still less one based on watching the finished fabric, could possibly execute with even reasonable precision the intricate programs of gains and shifts necessary to many desirable fabric effects.

Having regard for production and yet for low cost of control apparatus, this invention is made more practical by a method disclosed of printing or dyeing together and then winding together several like polychrome yarns, which may be said thus to be automatically wound in color phase. Thus several feeds may be controlled by one control device, reducing the cost of equipment.

Practical accessory devices are shown, such as cams very slowly and cyclically taking up and releasing yarn for the purpose of producing "cyclic" changes of slope (wave forms, and the like). These forms could all be produced, it will be understood, by the proper cycle of gains and/or shifts predetermined in the program or jacquard sheet, but they may often be more simply made by the fabric designer and with less mental effort, and even superimposed on any other color and form effects, by the use of cams specifically cut.

Finally, as will appear, for the automatic determination of the position or color phase of the moving yarn, so as to correct instantly any undue advance or retardation thereof, this invention uses and discloses several means. These different means have different fields of use. The photocell means shown is of most general utility, but there are conditions that it cannot fulfill readily. For these there are shown and explained two other main methods of control. The condition not so readily met by the photocell is this: If, in a "long" yarn pattern, (e. g. a linear representation of the above mentioned spray of flowers) there are no straight line portions,—such as vertical colored stripes beside the spray—by which a frequent control of the yarn by the photocell can be had, the photocell timing would have to be very peculiar and intricate. It would practically have to change at such a rate as to follow the curved and irregular line of (say) the green part of the flower spray. Complicated as this might be, it still is not quite workable where there are gaps in the green.

For conditions of this sort, and for many others where it is readily applicable and perhaps cheaper than the photocell method, there is shown an automatic yarn feed control using markers specifically put on the yarn at the right points in relation to the colors. One kind of such marker consists of a minute droplet of colorless dissolved gum or "size" put on the yarn in relation to its colored portions and usually while it is receiving its color pattern and in correct repetitive relation to this pattern. When dried such a droplet hardens the yarn locally. Means whereby such a size-hardened or indurated spot will control the yarn feed are shown. Naturally, markers of this kind may be objectionable in the finished fabric, and they may be removed from the fabric after they have done their work by proper treatments, e. g. by use of suitable solvents. The gum or size, if so removed, need not be colorless.

Other markers may be less tangible. Colorless metallic salts or chemicals may be applied to the yarn while it is being printed or dyed or afterward, in proper relation to the colored parts. Such treated portions, having different properties, may be detected in several ways. If the "marker" salts are at all fluorescent the use of proper light waves (notatably ultra violet) with appropriate photocells will make it possible for photocell methods to distinguish these invisible markers.

If the marker salts or chemicals, as they usually will, change the dielectric qualities of the yarn, very sensitive methods of measurement of these dielectric properties are possible and reliable. The use of radio frequency methods for measuring dielectric constant, or for measuring dielectric losses, are shown.

Some of these alternative methods may be preferred by certain users over the color controlled photocell methods, even where no "markers" as such need be applied. Metallic salts ("mordants" for example) are applied as part of the dyeing or printing process of certain colors. On cotton, where mordanted colors are common, dielectric measurements may easily replace light measurements in differentiating one color from another, quite without any 'ad hoc' "marker" application. Control by dielectric properties is also indicated in cases where yarns are spot "saponified", "immunized", and otherwise treated to leave them colorless but to make them later selective in their absorption of dyes.

The use of light filters is of value in the control of polychrome yarn by photocells, and one use in particular—the self-correction or self phasing of an out-of-phase yarn—is explained.

A considerable body of interesting ornamentation effects in knitted fabrics are shown and discussed, for the guidance of those who will practice this invention, and certain of the main types of phlychrome-yarn-adorned fabrics are regarded as part of this invention since without it they have never and can never be made. One of these of particular interest, because of the kaleidoscopic effects obtainable, is the independent but synchronous control of two or more polychrome feeds. Thus two yarns of only three colors each, independently controlled may cause two sets of three stripes to cross, giving a maximum of nine blends or mixtures. These may be squares or oblongs, lozenges, triangles, crescents, arrows, and many other shapes.

When the various objects of the invention will be explained as applied to circular knitting machines, it will be obvious to those skilled in the art that they are applicable also to other types of knitting machines as well as other textile machines. Similarly, the fabric patterns and specific control means disclosed are merely illustrative of a few embodiments of the invention which may be varied within wide limits without departing from the spirit thereof.

Drawings

In the drawings,

Fig. 1 is a top plan view of a circular knitting machine with all geared gain control and embodying various other features of my invention;

Fig. 2 is a side elevation of said machine;

Figure 12:
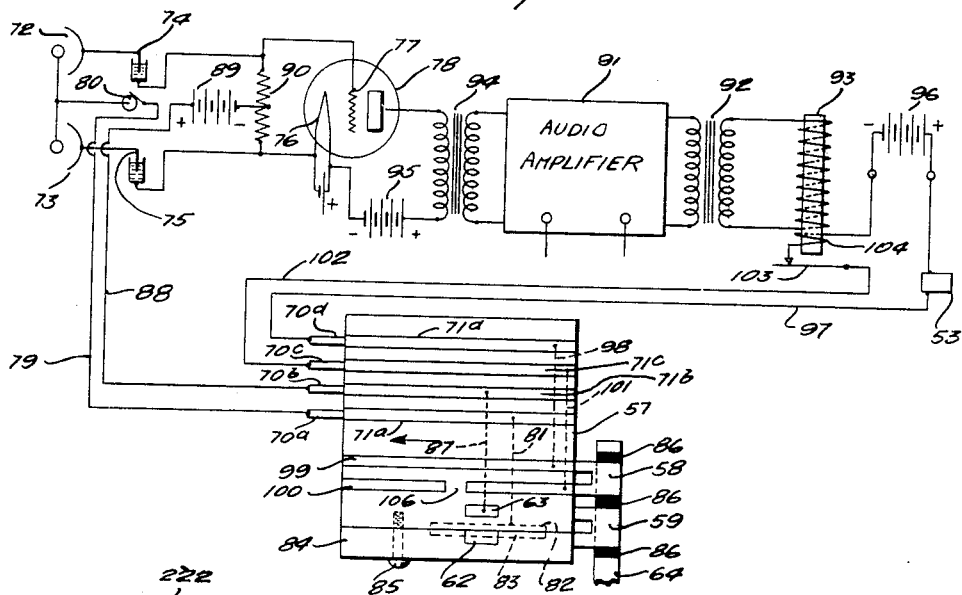
Figure 13:
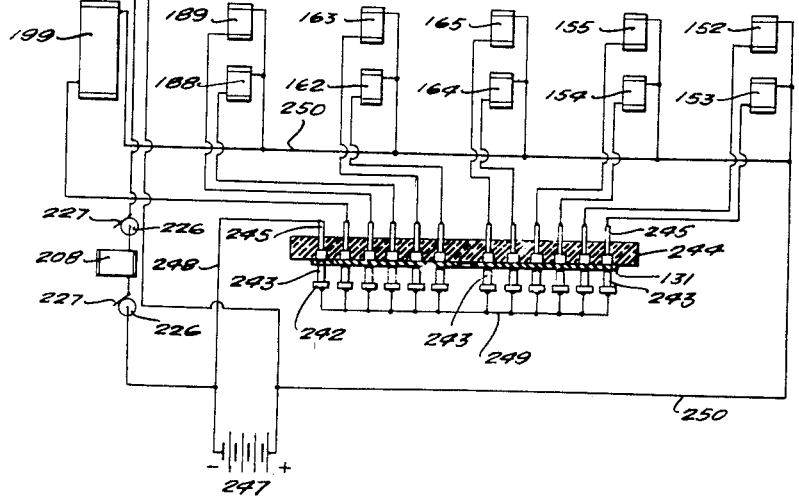
Figure 46:
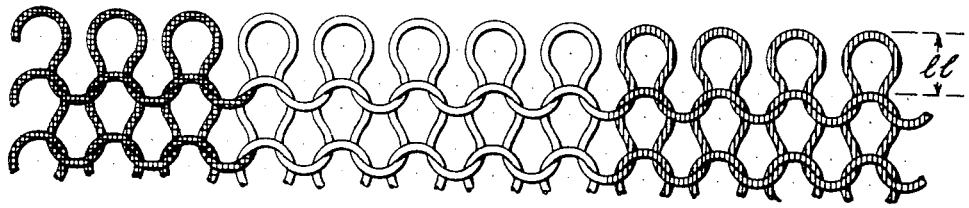

Figs. 3, 4, 5 and 6 are vertical cross-sections along lines 3—3, 4—4, 5—5, 6—6 of Fig. 1; Figs. 5 and 6 in particular show the detail of a sudden shifting device or jumper;

Fig. 7 is a side elevation of a control device whereby yarn is looped out between adjacent needles to compensate for sudden shifts, such as the Fig. 5 device may make;

Fig. 8 is a sectional view along lines 8—8 of Fig. 7;

Fig. 9 is a diagrammatic illustration of a cam device for making cyclic gains by taking in and letting out a bight of yarn and thus varying in a predetermined cyclic manner the fabric pattern;

Fig. 10 is a sectional view along lines 10—10 of Fig. 11, these two figures illustrating electromagnetically controlled mechanism for controlling the stitch or size of loops formed in the fabric, doing so in the machine illustrated by varying the vertical displacement of the needles in the "needle wave";

Fig. 12 is a diagrammatic view of the photoelectric cells of their controlling circuit, for showing their association with certain elements of the gain controller of Fig. 1;

Fig. 13 is a diagrammatic illustration of the circuits and controls for the magnets illustrated in Fig. 1;

Fig. 14 is a horizontal cross-section of the optical system, whereby the photoelectric cells are enabled to determine the position of the yarn, this figure being a sectional view along lines 14—14 of Fig. 16;

Figs. 15 and 16 are vertical cross-sections along lines 15—15 and 16—16 of Fig. 14;

Fig. 17 is a sectional view along lines 17—17 of Fig. 16;

Fig. 18 is a side elevation of a modified knitting machine of the stationary needle cylinder type having two feeds;

Fig. 19 is a circuit diagram illustrating the connections of electric motors controlling the yarn feed from two supplies in the machine illustrated in Fig. 18;

Fig. 20 is a top plan view of the machine shown in Fig. 18;

Fig. 21 is a circuit diagram illustrating a modified control for the yarn feed of a knitting machine;

Fig. 22 is a modified arrangement for controlling the rate of yarn feed to the knitter by the color patterns of the yarn;

Fig. 23 is a side view of the arrangement shown in Fig. 22;

Fig. 24 is a diagrammatic fragmentary plan of the knitting machine and its control where the arrangement shown in Figs. 22 and 23 is used;

Fig. 25 is a top plan view of a modified and simplified yarn controller for a knitting machine using a step-by-step motor instead of certain of the gears and switches of Fig. 1;

Figs. 26, 27 and 28 are sectional views along lines 26—26, 27—27 and 28—28 of Fig. 25;

Fig. 29 is a circuit diagram of the arrangement shown in Fig. 25;

Fig. 30 is a circuit diagram of another modified gain controller using an impulse motor;

Fig. 31 illustrates the principle of this electric impulse motor of Fig. 30;

Fig. 32 is a fragmentary plan, corresponding to the upper right hand part of Fig. 25 showing said motor in its association with the gain controller of Fig. 25;

Fig. 33 shows in side elevation an arrangement for testing by electrostatic means the timing of the yarn patterns;

Fig. 33a is a vertical cross-section along the center line of Fig. 33;

Fig. 34 diagrammatically illustrates a circuit arrangement which may be used in conjunction with the checking means shown in Fig. 33;

Fig. 35 is a side elevation of a modified yarn feed correcting or timing device;

Fig. 36 is a vertical cross-section through Fig. 35;

Fig. 37 is a vertical cross-section of another modified yarn feed correcting or timing device along lines 37—37 of Fig. 38;

Fig. 38 is a section of said device along lines 38—38 of Fig. 37;

Fig. 39 is a plan view of said controller;

Fig. 40 is a diagrammatic view of a modified photoelectric cell construction;

Fig. 41 is a side elevation of a knitting machine of the stationary cylinder type in which several yarn ends are fed from a common supply with a common control;

Fig. 42 shows in vertical cross-section the detail of mercury wiping contacts diagrammatically illustrated in some of the other figures, e. g. Fig. 41;

Fig. 43 is a diagrammatic view of a yarn feed correcting or timing means controlled by mechanical markers on the yarn, part of the equipment being shown in side elevation;

Fig. 44 is a sectional view along lines 44—44 of the yarn feed shown in Fig. 43;

Fig. 45 is a side view of said yarn feed and associated mechanism;

Fig. 46 illustrates a knitted fabric embodying my invention;

Figs. 47 to 73 represent diagrammatically a variety of examples of fabric patterns that may be obtained in accordance with the present invention;

Fig. 74 is a diagrammatic view of a portion of the controller for obtaining the patterns illustrated in Fig. 73;

Fig. 75 is a side elevation with parts broken away of the printing machine for printing the yarn used in knitting the patterns in Figs. 72 and 73;

Fig. 76 is a sectional view along lines 76—76 of the gearing of Fig. 75;

Fig. 77 is a sectional view along lines 77—77 of Fig. 75;

Fig. 78 is an enlarged sectional view of one of the yarn printing rollers;

Fig. 79 is a side elevation of a controller for the machine shown in Fig. 75;

Fig. 80 is an end view of said control; and

Fig. 81 is a vertical cross section along lines 81—81 of Fig. 79.

*Summary of description*

I

Figs. 1 to 17 show how a typical latch needle circular knitter, stationary cylinder type with one feed—a very simple machine as knitters go— may be equipped: (*a*) with one of the type of yarn feed control of this invention comprising a power driven yarn feed, a photoelectric cell means and hook-up for checking up to a timer and for correcting thereto the rate of feed of the colored patterns of a polychrome yarn; (*b*) with means for positively making slight variations, over a desired range, in the rate of feed brought under control by means (*a*) and for thus rendering control (*a*) useful in relating the colors of one course variably at will to the colors of previously knit courses; (*c*) with means for altering as needed the stitch adjustment to cause the natural use rate of yarn per course to accord with the enforced feed determined upon; (d) with means for producing certain fabric pattern discontinuities by very suddenly advancing the yarn feed and removing from the fabric in a loop the excess; (e) with additional means for superimposing on that feed rate determined by (b), (c), (d) a set of cyclic feed variations in accordance with a simple cam cut to any shape and revolved at any rate the designer elects; and finally (f) equipped with a perforated sheet program device whereby any or all of the above means b, e, d and c may be automatically brought into play in any sequence or cycle, to the end of producing from simple polychrome yarns a vast variety of ornamental fabric effects. The various features described, e. g. the cam means (e), are designed and adapted to be variously combined and applied to various machines for the control of the yarn color patterns according to the effects desired and other exigencies,—i. e. this particular described combination of all these features is not necessary but illustrative. Other combinations may be made, to controlledly place polychrome yarns in fabric, in the spirit of this invention.

II

Figs. 18, 19, 20 and 21 illustrate how application may be made to a knitter differing only from the Fig. 1 machine in having two feeds, or two sets of the various means described in I. Two independent feeds of polychrome yarns with independent control features permit of producing very interesting and complex fabric patterns as will be described later. Another matter of interest in this illustration is the use of well known electrical means (selsyn motors) for solving without complex gearing this problem of transmitting rigorous angular motions to yarn feed wheels mounted on a revolving element of the machine.

III

Figs. 22, 23 and 24 illustrate how this invention may be practiced so that the patterns of a polychrome yarn are controlledly located in the fabric by utilizing the previously described photoelectric yarn position checking up and correcting means and hook-up and the previously described timer means (plus, of course, any or all of the desired timer rate varying means for varying fabric effects) merely to vary a drag applied to a yarn otherwise drawn forward only by the knitting needle action. This natural feed or needle feed of yarn with a manually adjusted tension is common practice. In this exemplification of my invention a varied Foucault current drag is merely applied, by controls previously described, to a disc revolved by the needle fed yarn, the drag being varied in a manner to insure the color patterns passing the control point at the rate predetermined and thus to insure the construction of the predetermined fabric color effects.

IV

Figs. 25, 26, 27, 28 and 29 show a simplified modification of the Fig. 1 means for varying the timer rate—and hence for varying the yarn feed rate governed by the timer. In Fig. 1 the means shown for this comprise a plurality of change gear boxes, differentials and electric clutches to impart cumulatively to the timer and yarn feed any or all of a set of incremental speeds previously set up in the change gears. In this simplified modification, by permitting the timer and yarn feed speed increments to be made in many sudden discrete steps, by means of an electromagnetic step-by-step motor, much gearing and apparatus is saved. These steps of change, being short, will be reasonably evened out by the elasticity of the yarn. The step-by-step motor is operated by impulses created by a group of interrupters geared to the knitter, and therefore its operation is as free from slip as any geared device. The perforated program sheet determines which groups of impulses may reach the motor, instead of which clutch and change gear box shall act. One might say this modification utilizes electric impulses to replace gear and clutch teeth in the speed increment drive.

V

Figs. 30, 31 and 32 illustrate how other forms of electric impulse gearing may be used for the feed increments. A three magnet multi-tooth impulse motor of the phonic wheel type, capable of rotation either way, is shown. The commutator in this case, instead of supplying the motor impulses, serves to lock the motor at appropriate times though the impulses are steadily delivered to it.

VI

Figs. 33, 33a and 34 illustrate a means using the dielectric quality of differently dyed yarns, instead of their color changes, for recognizing and checking up to a timer the position of yarn spots, and for causing corrections. Such corrections may, of course, be made either to the power driven feed means of Fig. 1 or to the Foucault drag means of Fig. 22. A radio frequency resonant circuit is described for detecting slight changes of capacitance in a special condenser device having the moving yarn as dielectric. The utility of this alternative to control by color is emphasized by the increasing popularity of several processes for predisposing visually indistinguishable areas of an all white yarn selectively later to accept different dyes,

VII

Figs. 35 and 36 show stop and let go means, alternative to the clutch controlled speed retarding means of Fig. 1, for correcting "ahead of time" yarn feed. A friction driven feed wheel is briefly stopped dead and released, instead of being made to turn a little slow for a cycle in the heretofore described structures.

Figs. 37 and 38 show tooth and escapement means to cause the yarn feed wheel to drop back a tooth when the yarn is found ahead of the timer by any of the yarn checking means described herein.

Both of these variants may be likened to means to set back the hands of a fast clock instead of regulating it.

VIII

Fig. 40 shows one of many possible variants of the photocell circuit described above that may be made within this invention. It uses instead of a mechanical relay a gaseous discharge tube of a well known grid glow type. It is quicker and better than the relay, for very short patterns and high speeds in particular.

IX

Fig. 41 illustrates how several feeds of a multi-feed knitter may be controlled (to a timer) and varied (to a pattern) by one control of any of the modified forms described. The particularities of this illustration are the feeding and checking as one yarn of four like-colored yarns wound on one package with their colors aligned, and the magnetic means adjustably to advance or retard any yarn relative to the others after passing the control point.

X

Figs. 43, 44 and 45 illustrate still another device than either of those shown in Figs. 12 and 34 for recognizing and controlling yarn position. Droplets of stiffening size (removed by solvents later if desired) for making marker points related to the patterns are required in the yarn. These operate an electric contact in relation to a timer. No vacuum tube or amplification is required. The necessity of this marker alternative to the color and dielectric quality method of control is emphasized in connection with certain long pattern yarns where none of the color change points recur regularly enough or frequently enough to make control by them possible.

XI

Figs. 46 to 73 illustrate a very few of the typical fabric pattern effects that can be produced by my invention and the principles of this planning are described.

XII

Figs. 74–81 illustrate one form of machine necessary to produce the long pattern yarn required for making this invention completely useful. The mechanisms described above can be utilized with short patterns or short repeats of polychrome yarn to produce in color geometric figures and designs of great variety, but long pattern yarns are required to produce in fabrics representations or pictures other than geometric, such as shown in Figs. 72, 73. Yarns having the long repeats necessary cannot be produced by any known means. The description shows how pictorial stencil sheets, one for each differently colored area of the fabric design, are each scanned by a contact stylus, energizing solenoids, that apply coloring rolls at proper times to a band of moving yarns, which are then dried, packaged and steamed or otherwise "fixed".

*Description*

Referring to the first embodiment of the invention illustrated in Figs. 1 to 17, a circular latch needle knitting machine of the stationary cylinder type is shown to be generally designated by the reference numeral 1, because this is a convenient type to illustrate. Yarn 2 is fed to the needles of the knitter through the usual guides 3 and 4 past a checking or testing unit 5, the details of which are illustrated in Figs. 14 to 17. The yarn is drawn from a supply (not shown) by means of two feeding drums 6 and 7. The checking unit 5, as well as the feeding drums are mounted on a framework 8 above the knitter. An enlarged view of feeding drums 6 and 7 is shown in Fig. 22 in connection with a modified embodiment of the invention.

It will be clear from the last mentioned figure that the yarn 2 lies in staggered grooves in two feeding drums or capstans, encircles these drums in figure 8 style several times so as to get positive traction without danger of the yarn abrading itself or piling up and locking as may occur when a soft yarn is passed in several contiguous wraps about a single drum. The feeding drums are geared together by means of gears 9 and 10 mounted on their ends. The drum 6 is fastened to the end of a horizontal shaft 11 rotatably mounted in bearings 12, 13 of the frame 8, and the drum 7 is rotatably carried by a stud mounted on the frame 8. The other end of shaft 11 carries a bevel gear 15 which meshes with a bevel gear 16 on the upper end of a vertical shaft 17 rotatably mounted in brackets 18 and 19 of the framework 8. The lower end of shaft 17 carries a bevel gear 20 which meshes with a bevel gear 21 mounted on the end of a shaft 22. The rate of rotation of shaft 22 may simultaneously and additively be varied by a considerable number of elements. The plan view of Fig. 1 best shows this.

The source of primary mechanical power is pulley 24, driven through a belt 25 by a motor or shafting not shown. Loose pulley 26 is provided as a means to uncouple the power by passing the driving belt 25 thereonto. Pulley 24 is fastened on shaft 27 which drives at one end the knitter 1 by the bevel gear 28 and ring-bevel gear 29 in the usual way.

The other end of shaft 27 enters a gear box 30 as driver, from which gear box two other driven shafts 31 and 32 emerge. The gearing within the box 30 is not illustrated. It may be of any well known design. The gear ratios between shaft 27 and shaft 31 must be such that the latter makes exactly one revolution for one revolution of the knitter, i. e. this gear reduction will be the same as that between gears 28 and 29. The exact ratio of the gearing between shafts 27 and 32 in box 30 will be reverted to after the connections have been traced further.

Shaft 32 is the main shaft of the gain controller, which latter is generally designated by numeral 33. 32 runs nearly the full length of the controller 33 in a housing 34 provided with suitable bearings and oiling arrangements, not shown. Power is taken off this main shaft 32 at a number of places, as shown. The first power derivation is via equal bevel gears 35 and 36, shaft 38—journaled in bearing plate 37 and in bearing 39—via spiral gear 40 carried by shaft 38, to ring gear 41 of differential 42. Differential 42 is of the revolving bevel gear type used in automobile rear axles so that the velocity imparted to ring gear 41 is doubled when imparted to shaft 22.

There is quite a wide variation in the length of yarn that may be used to form one course of fabric in knitter 1. The setting of the stitch by the needle wave cam (see description below of Figs. 10 and 11), the tension desired in the fabric, the weight or counts of the softness or stiffness of the yarn, plus other factors, all affect this length. But for any given set of conditions there is a small range of variation in the length of yarn that may be used per course over which range no noticeable or objectionable difference in the tension or "feel" of the fabric will be produced. This is the range used for the yarn feed or gains that produce the fabric effects desired.

If we call L min the lower limit of this range for the yarn and stitch, etc. to be used, then change gears between shaft 27 and shaft 32 in basic gear box 30 must be chosen so that the speed imparted to drive drums or capstans 6 and 7—by way of shaft 38, differential 42, shaft 22, and the gears and shafts 21, 20, 17, 16, 15, 11, 9 and 10 as hereinbefore traced—will feed a length of yarn quite closely, equal to L min for every complete revolution of ring gear 29.

It will be noted that this minimum suitable length of yarn per course is independent of the length of the linear color pattern or "repeat"

of the yarn. It is a length basic to the size and quality of yarn and feel of fabric desired. Hence the designation of "basic" gear box for box 30, and "basic" speed for the speed thereby imparted to shafts 22, 17 and 11 when shaft 22a is still.

The function of all the elements of gain controller 33 is to add very exact increments of speed to this "basic" speed. All of such increments that are large enough to affect the yarn tension materially are so arranged in this structure, as to be positive, i. e. to cause a greater length of yarn than L min to be fed into a course. This fact is most succinctly stated by saying that in the Figs. 1 to 17 embodiment the basic feed rate gives maximum desirable tension. All gains will be positive gains as measured from basic. There is one minor exception, noted below.

Let us now follow further along shaft 32. The second power take off is by bevel gears 43 and 44 to driving shaft 45. This latter, by a considerable gear reduction in box 47—called the "retard" box—drives shaft 46 in the direction shown, at a very low speed.

Shaft 46, journaled in bearing 48, carries toothed clutch member 49, shaft 50, journaled in fixed member 51 one face of which is cut as a toothed clutch member. On shaft 50 is splined movable clutch member 52. Magnet 53, when energized, causes 52 to engage with 49 and thus imparts the speed of shaft 46 to shaft 50. When magnet 53 is deenergized the teeth of movable clutch member 52 are engaged, by the action of a spring, in the teeth of fixed member 51, so that shaft 50 is held stationary. A worm 54 is carried by shaft 50 and drives or holds stationary ring gear 55 of differential 56 according to whether magnet 53 is or is not energized.

Magnet 53 is energized, as will be later described, by the photocell circuit, whenever the color pattern of the yarn passing in the field of the photocell is found at the instant of scanning to be ahead of the position it should have at that instant. It stays energized, as will be shown, for the greater part of the time it takes to feed one color pattern of yarn. During the time 53 is energized therefore, a small increment of speed derived from slow shaft 46, i. e. from retard gear box 47, is imparted to shaft 22a in a sense opposite to the arrow. This is a negative or retarding increment of speed, though very small. It is superimposed on the "basic" speed of shaft 22 by the differential 42. The rate of yarn feed is thus retarded below the rate otherwise provided, and during the feeding of the greater part of one color pattern, whenever the photocells find the yarn color patterns to be ahead of where they predeterminedly should be. The timing of the yarn color patterns is thus corrected constantly, and a very close control of the color pattern timing relative to a predetermined time schedule is insured.

Now the time schedule of the yarn patterns is given by timer commutator 57 coacting with timer brushes 58 and 59. Brush 59 in particular when in contact on the short conducting segments 62, 63 of commutator 57, and by a path we shall trace later, times the later to be explained action of the photocell, whereby the yarn is judged either to be ahead of time or not and whereby the yarn is caused to be retarded, when ahead of time, by magnet 53.

Before tracing these timer circuits, together with the photocell circuits necessarily involved, the relation of this timer as a whole to the yarn feeding drums 6 and 7 must be understood, and the use of change gear boxes 60 and 61 explained. This can most easily be grasped through a numerical example.

Let us assume that, for the yarn to be used and fabric feel desired it is determined that 200" of yarn is the basic length, the length L min defined above.

Let us assume that the average length of the color pattern on the yarn is 12'. The basic speed will then feed 200÷12=16⅔ patterns per course. Let us assume that the feeding drums have a nominal periphery of 8". Then the feeding drums 6 and 7 must turn some 200÷8=25 times for each revolution of the knitter.

The feeding drums, parenthetically, will actually, in such a case be "biased" from 1% to 2% oversize in order to insure that the yarn will tend to run ahead of time rather than behind time, so that the one-way or retarding correction provided (by magnet 53, etc.) may be able to keep it in control. This "mis-lateral" or "biased" control is used for simplicity. It is of course easy to provide means both to retard and hasten the yarn and then the drums 6 and 7 would not be made oversize.

Now, forgetting the oversize of the drums, which the correction or retardation by magnet 53 completely compensates, we find our drums 6 and 7 must revolve 25 times to feed 16⅔ yarn color patterns. We therefore set up, in gear box 60, a gear ratio to satisfy this. (Assume for the moment that shaft 22b and therefore commutator 57 do not turn.) This gear ratio will give to shaft 65 and to brush carrier 64 a speed equal to twice the speed of shaft 38 multiplied by 16⅔÷25, or a speed ⅓ faster than shaft 38, which has the same speed as shaft 32.

Thus the gears in box 60 step up the speed of shaft 65 in the ratio 4 to 3 against shaft 32. The important relation thus attained, however, is that timing brush holder 64 revolves ⅔ as fast as feed drums 6 and 7, marking off thus the exact instants when drums 6 and 7 should just have fed forward each new yarn pattern.

Now whatever additional speed or "gains" may be at will imparted to drums 6 and 7 by way of shaft 22b (i. e. in Fig. 1 by those elements to the right of gear box 61) that additional speed must be shared by the timer in this same ratio of 2 to 3. Therefore, in the assumed case we must place in box 61 gears stepping down the speed (if any) of shaft 22b to shaft 68 in the ratio of 3 to 2.

It will be understood that, when the pattern length of the yarn is changed, or, if the length L min is altered (e. g. due to using heavier or lighter yarns) the gears in 60 and 61 will be changed. But the ratio of speeds of shaft 32 to shaft 65 must always be one-half the ratio of the speeds of shaft 22b to 68.

Four collector brushes 70, mounted on brush holder 69, serve to bring out the connections of timing commutator 57 through four collector rings 71. This circuit is best traced out in connection with Fig. 12.

As there illustrated, the photoelectric cells 72 and 73 are shown connected through mercury brush contacts 74, 75 (like the one illustrated in Fig. 42). This is only necessary when these cells are mounted movably with respect to the balance of the apparatus. In the present case because in rotary feed knitter 1 a single yarn 2 is used, they may be stationary and the connection may be direct to the filament 76 and grid 77 respectively, of an electric discharge device 78. The anodes of the two photoelectric cells are interconnected and connected through conductor 79, to contact brush 70a engaging collector ring 71a of the timing commutator 57. When the photocells are movably mounted a contact brush 80 is used in conductor 79 as shown. The collector ring 71a is connected through a conductor 81 with a conducting segment 82 which is in contact with segment 83 of the rotatable cap 84. Cap 84 may rotate only through a small angle and is locked in any position or adjustment by screw 85. Cap segment 83 is permanently connected to contact 62. Brush 59, mounted through insulation 86 on brush carrier 64, closes the circuit from contact 62 to contact 63, thence via conductor 87, collector ring 71b and conductor 88 and battery 89 to the midpoint of a resistance 90, which bridges the conductors leading to the cathodes of the photoelectric cells 72 and 73. With the photoelectric cells receiving equal light, if one of them suddenly receives more or less light than the other, the grid 77 of the electrical discharge device 78 will change potential relative to filament 76 and cause a change of current in the plate circuit of the device, including the battery 95 and the primary winding of a transformer 94. The secondary winding of this transformer is connected through an audio frequency amplifier 91 of any suitable design and a transformer 92 to the operating winding of a relay 93. The change of current produced by the unbalancing of the two photoelectric cells will be sufficiently amplified to energize very sensitive relay 93, which then closes a locking circuit for itself from the positive pole of battery 96 through magnet 53, conductor 97, brush 70d and collector ring 71d of interrupter 57, conductor 98, conducting segment 99 of the interrupter, brush 58, conducting segment 100, conductor 101, collector ring 71c, brush 70c, conductor 102, armature and front contact 103 of relay 93, and the lower winding 104 of the relay back to the negative pole of battery 96. The current flowing through this circuit will be sufficient to maintain the relay 93 energized and also to cause magnet 53 to attract its armature 105 and actuate the clutch 52.

The relay 93 and the magnet 53 will be maintained energized until their circuit is interrupted, which happens when upon the completion of a cycle of rotation by the timing interrupter 57 the contact brush 58 leaves the conducting segment 100 at point 106 where a small section of insulation is provided. Once the relay 93 is de-energized it cannot become again energized and therefore magnet 53 cannot become reenergized until the photoelectric circuit is once more unbalanced by virtue of one cell receiving more light than the other.

It is perhaps obvious that grid 77 and filament 76 of tube 78 are always at the same potential when the circuit of battery 89 is open and that they will remain at the same potential after this circuit is closed (by brush 59, etc.) provided that the resistance of photocells 72 and 73 are at that time balanced. Thus the only causes of a change in the plate or output current of tube 78 must be either the closure of the circuit of battery 89 when the photocells are differently lighted, or a sudden unbalance in the lighting of the photocells after the circuit of battery 89 is closed. The method of operation planned is to use this latter order of events.

By that last statement is meant that the planned operation is to close the circuit of battery 89 by the timer brush 59 just when both photocells are lighted by reflection from one and the same colored yarn spot; also to again open this circuit while both are still lighted by this one spot, as long as the yarn is "on time". Thus, when the yarn starts to get "ahead of time",— as the slightly oversize feed drums 6 and 7 tend to cause it to do—the color change in the yarn affects one photocell before the other and before they are both "turned off" by the timer by opening circuit of battery 89, and this unbalance causes magnet 53 to retard the feed during one revolution of timer commutator 57.

By this method of operation, having once started feeding a polychrome yarn so that the photocells become active while a certain spot of the yarn pattern is before them, we find the yarn constantly trying to creep slightly ahead of time, and the photocell circuit constantly retarding it when it gets sufficiently ahead.

Referring now to Figs. 14, 15, 16 and 17 the lamp and photoelectric cell unit there illustrated, and given the general reference numeral 5, comprises two photoelectric cells 72 and 73, respectively within compartments 107 and 108 of a casing 109 in front of apertures 109a and 110 leading to central compartments 111 and 112. These central compartments are longitudinally separated by means of a wall 113. All walls of these compartments are mirror surfaces and each compartment contains a cylindrical lens 114. An incandescent filament 116 of lamp 115 is imaged in one plane by cylindrical lens 117 onto the yarn 2. The scattering of light in the other plane is prevented by the reflecting walls 120 and 121 which serve (see both Figs. 15 and 16) both to confine the light going to the yarn 2 and the reflected light going therefrom to the photocells. The yarn travels over the curved edges 118 of the V-shaped grooves 119 formed in the ends of walls 120 and 121. The exposed portion of the yarn is surrounded by a hood 122 the interior of which is optically black so that only light reflected by the yarn will be projected through the two compartments 111 and 112 and thence onto two mirrors 123, which in turn reflect the light into the photoelectric cells 72 and 73.

Just ahead of mirrors 123, 123 are two restricting slits 124, 124 (Fig. 17) formed by closely approaching the beveled edges of two pairs of blades 125, 125, 126, 126 which extend across the spaces 111 and 112 respectively. The lenses 114, 114 are so located as to image each its half of the lighted length of yarn 2—quite intensely lighted by having imaged upon it filament 116—squarely upon these slits 124. The slits are made slightly narrower than the image of the smallest diameter yarn to be used. These slits thus may be said to trim down the yarn images to a standard width and length. The result is to eliminate all those variations in the intensity of light reaching photoelectric cells 72 and 73 from yarn 2 that would be due to diametral variations, knots, fuzz or slufs on the yarn, and to restrict the photocell response, therefore, to pure variations in reflectivity, i. e., color or condition of treatment of the yarn.

Ahead of slits 124, in each light passage 112, and 111, is provided a removable light filter 127, 127. The view of Fig. 14 shows how one of these filters may be slid into a slot 128 in the edge walls 129 and 130 of passage 112. The use of color filters, while not necessary in all cases, offers many advantages. One advantage is that by filters the common spectral bands reflected by two differently dyed portions of one yarn may be suppressed, leaving only the remaining and quite different bands to be admitted to the photocells. This would greatly accentuate that differential response required by the circuit above described in case the photocells are selective between these remaining bands. Or the filter may be so chosen as to absorb substantially all the reflected light from one dyed portion while admitting the greater part from another. Another use of the filters may be to suppress all but certain common spectral bands reflected from two adjacent differently dyed portions of yarn. By so doing these two adjacent portions are made effectively into one longer portion as far as the photocell action is concerned. E. g. in a yarn dyed in rotation: black, red, green, blue, orange, brown, and repeat, suitable green filters would effectively make one long "black" spot of the consecutive black and red spots and on the photocells this yarn would act as though dyed: black, green, blue, orange, brown, but with the black twice as long as the others. If now the period during which the photocells are active, i. e. the period of closure of the circuit of battery 89, is made long, longer let us say than will be accommodated by any of the spots except the double length "effectively black" spot, then clearly magnet 53 will act on every cycle until the yarn has been retarded sufficiently so that its long "effectively black" spot is presented to the photocells during their whole active period. By this use of filters we thus see that a yarn of equal spots may be made self-correcting or self-phasing.

No filters would be required in this case if the yarn were dyed with one spot longer than any other spot in the pattern.

The light filters may be so chosen that only one of certain spots on the yarn or fabric would affect the photocell. The yarn would thus be self-phasing by spot quality or color alone and not by a double length spot.

Where two photocells are used in combination with two color filters selective or self-phasing control is possible.

Obviously, not only visible light but infra red or ultra violet or other radiations may be used. Not only reflected radiation but generated radiation may be used. For instance, the yarn may be irradiated with short wave lengths (ultra violet) and due to the presence of some suitable dyestuff a purple spot may be caused to fluoresce, i. e. to emit a longer wave length.

The foregoing is a full description only of the first three power branches from shaft 32 in Fig. 1—being (a) the basic speed drive through shaft 38, (b) the correction or retardation speed through shaft 46 and (c) the timer drive through shaft 65. I have also fully described the photoelectric cell arrangement and illumination, the operation of these cells in the circuit and their cooperation with the yarn spots and with magnet 53 and retarder clutch 52 to maintain the feed of yarn color patterns "on time" with timer device 57. In other words, the foregoing description makes clear how "patterned" yarn may be fed by knitter 1 at some "basic" rate marked off by a timer device and how the colored patterns of such yarn are kept from getting out of time.

Given this fundamental yarn control by patterns there must next be explained the means for using this control by slightly varying the time table laid down by the timer for the feed of color patterns, i. e. the means for making "gains" and "shifts", whereby this fundamental yarn feed control becomes useful in producing a vast quantity of new fabric effects.

In the view of Fig. 1, the first branches of power away from shaft 32, by shafts 38, 46 and 65 relate to means for controlling the feed of color patterns, at a "basic" rate. The remaining three power branches from shaft 32, by shafts 128, 129 and 130 provide predetermined speed increments, it will be seen, that may be superimposed at will as "gains" or "shifts" on that basic speed. It will be seen that the addition of each of these speed increments is caused by one of a set of electromagnets controlled, as will be seen in the circuit of Fig. 13, by the perforated program sheet of the program device generally designated 132. This is shown in Fig. 1 as driven by shaft 31 and will be more fully described below.

A power branch is taken from shaft 32 at its extreme right end in Fig. 1, by a pair of bevel gears through shaft 133, through change gear box 138 and shaft 128. Shaft 128, by the use of proper gears changes in change gear box 134 may run at any predetermined speed. The speed chosen depends upon the length of the color spots on the polychrome yarn used and upon the effects desired by the fabric designer.

Shaft 128, by spur gear 135, idler 136 and spur gear 137, drives shaft 138 and clutch member 139 at its own speed. It also directly drives clutch member 140 at this speed.

By selectively causing magnets 153 and 154 to attract their armatures the movable clutch members 141 and 142—which are splined on shafts 145 and 146 respectively—may be caused selectively to connect shafts 145 and 146 to shafts 138 and 128 by way of clutch members 139 and 140. The armatures of the magnets 153, 154 stay put when so attracted even after the magnets are de-energized, by reason of the V-shaped "jockey" springs 156 acting on angular lugs on each armature. The clutches therefore stay engaged, when once engaged on one side, until forcibly shifted to the other side. The clutches 141, 142 are at will forcibly shifted out of engagement with the live side and engaged with their respective stationary members 143, 144—which are also the bearings for shafts 145, 146—by the energization of magnets 152, 155 opposed to magnets 153, 154. Because of "jockey" springs 156 the clutches stay put on the stationary side as well as on the live side.

Shafts 145 and 146 bear worms 147 and 148 respectively, engaging worm wheels 149 and 150. Wheel 149 is fast on shaft 22e. Wheel 150 is the ring gear that revolves the "spider gears" on planetary bevel gears or planetary bevel gears of differential 151. Shafts 22e and 22d are related to this differential as the rear wheel axles in any car are to the differential.

When clutch 141 is engaged on the live side, i. e. to member 139 a certain slow speed determined by the gears in box 134 is thus imparted to shaft 22e in the direction of the arrow. Allowing for a reversal of direction in each of the five differentials shown aligned 151, 157, 158, 56 and 42, it will be found that the speed increment imparted to shaft 22e is imparted thereby through shafts 22b and 22a to shaft 22 and so to feed drums 6 and 7, in the direction of their original or fabric rotations. Thus the energization of magnet 153 causes a positive increment of speed to be given to the yarn feed, and the same increment, but multiplied by the gear ratio set up in gear box 61, is also given to the commutator 57 of the timer. Thus the time table or schedule which the yarn color patterns are controlled to keep by photocell unit 5 and the rate of feed in inches of the yarn by drums 6 and 7 are speeded up together in exact proportion. The effect is really the same as though the gear ratio between shaft 27 and shaft 32 in the "basic" gear box 30 had been slightly raised. The means used are adopted merely as more flexibly controlled than one big change gear box.

If magnet 154 is energized, shaft 146 with worm 148 is connected to live clutch member 140, and the very same speed is imparted to ring gear 150 as is given to worm wheel 149 by energizing magnet 153. But, by the action of the "spider gears" or planetary bevel gears in differential 151 this speed of ring gear 150 imparts twice this speed to shaft 22d.

By energizing both magnets 153 and 154 simultaneously three times the increment of speed given by magnet 153 alone can be imparted to the timer and feed drum system.

It is the purpose of the two clutches and arrangements just discussed to make the relatively longer "gains". E. g. if the fabric designer is working with a yarn having repeats of six different colors in, say, 2″ long spots, he may use gear box 134 to give a minimum gain via magnet 153 and worm gear 149, etc. of one such spot per revolution of the knitter. By energizing magnet 154 alone he may get a gain of two spots per revolution. By energizing both 153 and 154 he can get a three spot gain, i. e. a full half pattern. He is, of course, not limited to gains in terms of integral spots, but one-spot, two-spot and three-spot gains produce, as will be seen, striking color mixing effects in the fabric and will be frequently used.

Very minute gains both positive and negative, of the order of one stitch per revolution, i. e. of the order of a fraction of one percent, are intended to be controlled by clutches 160 and 161 through magnets 162, 163, 164, 165. This is the only exception to the rule in the Fig. 1 machine that all speed increments or gains are positive. This is so small an exception, quantitatively, that it is clear it does not affect the rule given above that the basic speed set-up in box 30 may be taken in this machine as the speed giving maximum satisfactory tension i. e. basic speed gives yarn length per course=L min. These very small gains are mainly used by the designer to cause the slanting or sloping of any stripes or patterns being formed, and therefore it must be possible to make them in either sense.

Knowing the reduction by worm and worm gear 167, 168 and the speed doubling effect of the planetary bevel gears in differential 169, the designer will so choose the change gears set up in gear box 166 as to give him the gain he desires. This will most often, but not at all necessarily, be a gain of one stitch in a course, which causes a slope of about 45°. The gear ratio set up in box 166, considered as a means to slope fabric patterns, is practically independent of the basic speed, of the yarn size used, of the yarn patterns.

It may be permanently set up for a 45° slope if the designer needs no other slope.

Input shaft 170 of box 166, being properly geared to output shaft 129 for the slope desired, the latter and clutch member 171 thereon mounted will revolve slowly in the direction shown. By means of bevel gear 174, bevel idler 175 and bevel gear 176 the clutch member 173 is caused to revolve at the same speed as 171 but in the opposite direction. Whichever was last energized of magnets 162 and 163 determines whether movable clutch member 172 engages live clutch member 171 on the oppositely rotating live member 173. Movable member 172, being splined on shaft 179, thus drives the latter, and live clutch member 177 that it carries, in either direction selectively.

Movable clutch member 160 is connected by shaft 180 to worm 167. 160 is placed in engagement with live member 177 by magnet 164 and alternatively, in engagement with the combined stationary clutch and bearing member 178 by magent 165. Thus is made by energizing magnets 164 and 165 alternatively the determination of whether there shall be any slope gain at all, and by energizing alternatively magnets 162 and 163 is determined the "hand" of that slope. The motion (if any) imparted to worm wheel ring gear 168 of differential 169 is sometimes adding and sometimes subtracting from the speed of shaft 22 and feed drums 6 and 7. It will be so very slow that in one whole revolution of knitter 1 it will cause a length of yarn of the order of ⅛″ to be added to or taken from the amount of yarn going into one course of the fabric. It is hard to overemphasize the sensitiveness of the fabric patterns to very minute gains of this sort. That is why positive gearing means are employed throughout and the quickest possible magnetic clutch shifting means. The very best friction speed changing devices might introduce a slippage of the order of 1% which would be more than enough to put the fabric pattern completely out of control.

The next power branch away from shaft 32 is by way of bevel gears 185, 184, vertical jack shaft 183 (Fig. 5), bevel gears 182, 181, to shaft 130, which carries clutch member 186. Movable clutch member 187 is engaged by magnet 188 with member 186. It is disengaged from 186 by magnet 189 and engaged on its opposite face with stationary clutch and bearing member 190. Member 187 is splined on shaft 191 which enters gear box 192. Herein is made a big gear reduction, and is also provided a certain range of change gears, whereby shaft 193 and cam 194 fastened on it may be caused to rotate many times slower than the knitter and at the designer's pleasure. A suitable range of speeds for cam 194 in terms of the revolutions or courses of knitter 1 might be from one revolution per 10 courses to one revolution per 100 courses. This cam, 194, is removable and may be cut by the designer to any form he desires. It provides means for making small cyclic gains, whereby the stripes and other figures being knit may be given undulatory or oscillatory forms of length determined by the number of courses taken per revolution of cam 194 and of form and amplitude determined by the cutting of said cam.

A cam follower arm 196, urged downward by spring 197 and equipped with a barrel shaped roller 195 to ride the cam at a wide range of angles, is connected by a pawl with ratchet 198. Ratchet 198 is fastened to the "spider" or frame that carries the planetary bevel gears of differential 158, i. e. in differential 158 ratchet 198 acts as the "ring gear". Since the resistance of all the friction and the resistance to motion of the yarn, i. e. the total load resistance on shaft 22c (entering this differential 158 on the right) and shaft 22b (emerging on the left) are such as to tend to rotate ratchet wheel in the direction opposite to the arrow, it can be trusted to follow the cam follower arm 196 in both directions, with the arrow because forced to by the pawl, against the arrow because that is its tendency.

Thus it is possible, by cam 194, additively to superimpose on shaft 22b (regardless of the speed increments imparted to it by shaft 22c) a slow cyclic increment determined by the cam shape and speed.

On top of the gear box 192 used for the cam pattern undulator device just described, is mounted a solenoid device we may call the jump shift device. It serves to make very sudden positive gains or shifts to produce discontinuities in the fabric patterns. Solenoid 199 with its magnetic return frame 207 attracts and draws in plunger 200 when energized. Spring 201 holds plunger 200 in outermost position, as shown in Fig. 5, when 199 is not energized. To provide room for the compressed spring to lie when plunger 200 is fully attracted spring housing extension 202 is attached to the rear of frame 207. Link 203 couples plunger 200 to bell crank shaped pawl 204 pivoted on stud 205 carried by rocking member 206. Adjustable stop member 207, held by two screws in its curved slot to the wall of differential housing 158, permits of varying the stroke of 206. The energization of solenoid 199 first causes bell crank pawl 204 to rotate about stud 205 and take hold of ratchet 198 and then causes the latter (which it will be recalled is the "ring gear" of differential 158) to make a sudden rotation in the direction of the arrow. The amount of this sudden rotation is determined by the position of stop 207. The sudden rotation of ratchet "ring gear" 198 in this direction imparts twice that amount of sudden angular movement to shaft 22b and thence to feed drums 6 and 7 by the path previously traced. Therefore the operation of solenoid 199 jumps ahead the whole yarn feed control mechanism, including the timer 57 and the feed drums 6 and 7 in their proper proportion, as fixed by the gears of box 61. This makes no relative shift of the yarn and its time table and in no way disturbs the yarn feed control but it does result in a sudden advance of the yarn, control and all, relative to the position of knitter 1 or, more tangibly stated, relative to the yarn feed guide 3. This might be called a forward color phase shift of the yarn relative to the fabric.

In order to avoid the serious slack or low tension place in the fabric that would nautrally result, the excess of yarn thus almost simultaneously fed to the knitter must be disposed of. Therefore the operation of the jumpshift device must be accompanied by the operation of a looper device to take out and prevent being put into the fabric this sudden excess of yarn.

The looper device is not shown in Fig. 1 or 2, where knitter 1 is only most diagrammatically indicated, but it must be attached to or closely associated with revolving feed guide 3 in this type of machine. The looper is best shown in Figs. 7 and 8. It comprises a solenoid 208, with plunger 209, restoring spring 219, spring housing extension 220, mounted on frame 221 adjacent yarn feed guide 3 and traveling around the knitter with it. When the jump shift device of Fig. 5 operates, arm 206 by a brush 222 bridges control strips 223, Figs. 6 and 13, which together with their insulating support 225, are angularly adjustable by loosening clamp screw 224. These contact strips are adjusted in every case to agree with the adjustment of stop 207 (Fig. 5), in such manner that the earliest movement of rocker arm 206 bridges strips 223. The bridging of strips 223, as may be seen in circuit of Fig. 13, energizes solenoid 208. The latter being like feed guide 3 on the revolving table of knitter 1 the circuit must pass through slip rings and brushes 226, 226 and 227, 227 shown on Fig. 13 but not the knitter. Practically at the instant that jump shifter solenoid 199 begins the sudden advance of yarn 2 as described, the solenoid 208 starts to rotate ratchet 213 and this causes the bottom one of five spring wire spokes 215 to snap over extension 217, striking the yarn and carrying a loop of it between the pair of needles most directly in line at that point of time. This adequately takes up all slack. The whole device continues its travel past the stationary needles in a right hand direction as shown in Fig. 8, accompanied also by the needle wave there shown. The loop of yarn caught over a wire spoke 215 drags the latter sideways until the wore spoke, which is extremely fine and flexible, bends enough to slip out. There is no other control of the size of the loop of yarn taken out by this shown on Figs. 1 or 2 to avoid complication. When the jump shift device solenoid 199 is energized it is immediately followed therefore by the energization of looper solenoid 208. This pulls in plunger 209, and by link 210 rotates arm 211 carrying the pawl 212 which is spring pressed against ratchet 213 as shown. This ratchet is held from retrograde movement by holding pawl 214 on a lug of guide 3, on which is also mounted the bearing 228 of ratchet 213. Ratchet 213 carries a link extension from which project radial fine spring wire spokes 215. These are of such length and the ratchet is so oriented that when solenoid 208 has completed a stroke one of these fine wire spokes is held by pawl 214 in the position shown, pressing strongly against snap-over extension 217 of guide 3.

The yarn 2 is being constantly laid by guide eye 218 in guide 3 across the faces of open latch needles 216, as is understood in this type of looper device. These spokes, being extremely springy, as they snap between the needles, merely take up what slack they find. This is entirely sufficient to prevent any loose spots in the fabric due to the sudden positive color phase shifts or jumps caused by solenoid 199.

To complete the understanding of the Fig. 1 structure the program device 132 must be explained. Figs. 27 and 28 will be referred to in this connection. Shaft 31, emerging from gear box 30, Fig. 1, makes one revolution per revolution of knitter 1. It carries cam 229 on which rides cam roller 230 of forked actuator 231. The latter actuates pawl arm 232, in the following manner: as cam 229 revolves it raises 231 and pushes arm 232 to the right against spring 233 until pawl 234 carried by it gets hold of a new tooth of ratchet 235. Then cam 229 reaches the drop and roller 230 no longer opposes spring 233. Arm 232 swings left as roller 230 drops to the low point of the cam, and rotates ratchet 235 one tooth in the direction of the arrow.

Ratchet 235, pin cylinder 240, two star wheels 237 one at each end of 240, are all fixed together on one shaft 236. A pivoted contact lifter frame comprising two end pieces 239, each with "jockey roller" 238 to engage the star wheels 237, and comprising also an insulating contact lifter rod 241, is pressed toward the star wheels by two springs 246 one at each end. When cam 229 permits spring 233 to give a forward step to ratchet 235 and the parts attached thereto the star wheels 237, having exactly as many teeth as ratchet 235, and being properly related angularly to the latter, act to raise and drop rollers 237 quickly during this step. Rollers 237 raise and lower contact lifter and pieces 239 and hence, by lifter rod 241, raise and lower quickly during the step the contact springs 242, each with a contact pin 243.

Driven by pins in the center of pin cylinder 240 is a program sheet or belt 131 of tough insulating paper or other suitable material, that may be perforated at each longitudinal space by holes corresponding to contact pins 243. Usually program sheet 131 will be a closed loop, i. e. an endless belt, arranged to repeat indefinitely one more or less involved sequence of pattern controls.

Beneath the contact pins 243, and separated from them by program sheet 131 except where the latter is perforated, is connection block 244 made of insulating material and having conducting inserts 245, 245 in line with contact pins 243. Contact pins 243, through the bases of their supporting flat springs 242 are all strapped together. The various circuit connections are made by wires to inserts 245.

It will be seen that each revolution of the knitter, and hence of shaft 31, causes all the contact pins 243 to be lifted briefly while program sheet 131 on cylinder 240 is stepped one step and then permits them to come down and make contact on any inserts 245 which are uncovered by the new line of perforations in 131. This method is used, rather than the dragging of wipers over a perforated sheet, in order to decrease the wear on the program sheets, which will usually be short loops rapidly repeated, to insure firmer contacts than a paper sheet could be trusted to separate, and to avoid that coating of the contact surfaces with worn off paper pulp or fibrous matter from the sheet 131 that would surely occur if the program sheet itself were made to lift the contacts. This method it is that requires the use of the stay put clutches and jockey spring devices such as 156, 156 in all the control means of Fig. 1.

The circuit of Fig. 13 shows diagrammatically the electrical connections of all the above described elements used for making gains and shifts, i. e. for varying the rate of feeding of the yarn patterns so as to obtain varied fabric patterns. Fig. 12, in contradistinction, shows the connections of these elements serving to maintain the underlying vital control of the rate of feed by color patterns, so that this feed rate may be predeterminedly varied by the means of Fig. 13.

Starting at the negative pole of battery 247, current flows by conductor 248, the first insert 245, the first contact pin 243 and spring 242 to strap connection 249 when program sheet 131 is perforated under the first contact pin. Sheet 131 will be perforated opposite this first pin 243, if there is to be made any other connection at that step of the program device. Due to the "stay put" nature of all the clutches there will be more positions of the program device without any perforations, however, than with perforations. Those positions at which any change in the yarn feed rate is desired will, alone, be the positions requiring perforations. The condition shown in Fig. 13 is that of no change, i. e. of no perforations in sheet 131.

Now, with a perforation under the first contact, current will flow from strap 249 through any other pin or pins 243 and inserts 245 that are permitted by the perforations to meet, and through the appropriate one or ones of the eleven magnets shown, back through conductor 250 to the positive side of battery 247. It should be remarked that if one of the upper tier of magnets, 189, 163, 165, 155 or 152 is energized in a given position of program sheet 131, there should never be a perforation permitting the simultaneous energization of the opposed magnet of the lower tier; i. e. 152 and 153 for example must not be energized at the same time.

It is possible, by the use of additional contacts on the program device, to operate any additional electromagnetic control devices that may be desired.

Figs. 10 and 11 show an accessory device that many designers will find useful. In the description above of the determination of the basic speed for shaft 32 the shortest L min. of the chosen yarn that would make fairly uniform knit goods under the given adjustments of the given knitter was stated to determine the basic or slowest feed rate. The longest ditto or L max. determines the range of "gains" that may be employed. In some cases it may be desired to use larger "gains" than the range between L min. and L max. will allow. This can often be done if the size of the loop of yarn drawn out by each needle is changed, i. e. if the "stitch" is changed. On machines of different types different stitch adjustments are provided. The adjustment often provided on the stationary cylinder latch needle type here shown as knitter 1 is shown in Figs. 10 and 11 with the addition of "stay put" magnetic means to change this adjustment back and forth between two limits. Both limits can be manually altered. In the Fig. 10 section 251 is the stationary needle cylinder in the many vertical grooves 264 of which lie needles 216 held in place by a restraining band 265 of coiled spring. The revolving table 252 and cam shell 253 fastened thereto carry top cams 262, 261 and bottom cams 263 and 260. In a vertical bore in cam shell 253 a plug 254 slides up and down. It is held upward by spring 256 pressing on plug top 255. Plug 254 carries top cam section 259. In the usual way stud 258 with its eccentric tip 257 engaging a notch of plug 254 is rotated by hand to bring 254 and top cam section 259 to the desired height, and then locked in that position by a set screw or the like.

The lugs of needles 216 follow between cams 262 and 263, hugging the latter as a matter of fact because they are frictionally held by spring band 265, and because they have just been climbing up the course visible at the right of 263 in Fig. 11. They will hold this level and not start down again until they strike cam section 259 when they will be forced down to pass under the lowest point of 259. They will hold this level until they strike fixed bottom cam 260. The lowest position to which the needles come is thus fixed by the vertical setting of cam section 259 or of plug 254. A change in this makes no change in the balance of the needle wave form. Fig. 8 shows the needle wave form with three needles 216 at the low level. The depth that each needle 216 reaches below the top of groove 264 in cylinder 251 is what determines the length 11 (of the loop of yarn or "stitch") drawn by that needle through the loop of the preceding course. Fig. 46 shows these loops. All of this is well known in the art. Now, to enable a small increase in the length of loop 11 to be made under control of program sheet 131 when a considerable positive gain or increase in yarn feed per course is to be made, or a decrease in 11 when negative gains are to be made, a double coil electromagnet 267 is mounted by bracket 268 on revolving cam shell 253 at a point near stud 258. An armature 269 having a large cylindrical hub 270 is clamped on a reduced extension 273 of stud 258 by nut 271. An integral latch arm 272 with beveled end extends from hub 270 at right angles to the armature 269 proper, so as to engage combined latch and armature 274 of another two-coil magnet 275. A spring 276 holds 274 in latching position except when magnet 275 is energized. A spring 276a holds armature 269 against the point of adjustable back stop screw 277 except after magnet 267 has energized and latched armature 269 at the other extreme of its throw. When 267 energizes and so long as 269 (with its latch extension 272) is held by 267 or by latch 274 in its right hand rotated position the eccentric tip 257 of stud 258 depresses plug 254 and cam section 259. When magnet 275 is energized its armature 274 releases extension 272 of armature 269 and spring 276a returns armature 269 to back stop 277. Eccentric tip 257 rises and permits plug 254 and cam section 259 to rise. Thus magnet 267 lengthens the loop 11 and magnet 275 shortens the same. The amount of the change is fixed by the stroke of armature 269, i. e. by the setting of screw 277. The range or position of the limits of up and down movement of cam section 259 are manually adjustable by loosening nut 271 and slightly rotating armature hub 270 on the stud end 273 and re-tightening nut 271. Magnets 267 and 275 being on the rotating table 252 require to have their circuits brought out by collector rings and brushes as did looper magnet 208. These two stitch adjusting magnets would, except for the collector rings, be connected in the circuit of Fig. 13 exactly like any pair 152, 153 of opposed magnets there shown.

Fig. 9 shows in diagrammatic form another form of cam operated cyclic gain producing device or undulator, for the same purposes as cam 194 of Figs. 1 and 5. This form merely takes up and lets out, cyclically, a loop of yarn 2 between two smooth guides or rollers 282 by a roller 278 on the end of lever 280, pivoted at 279, spring pressed against and oscillated slowly by cam 281. The cam, of course, may be cut to suit the designer's idea. Yarn 2 is shown, very symbolically, being fed (at the rate determined by all the controls hereinabove described) past photocell unit 5. The mere taking up and letting out of a loop of yarn below feed drums 6 and 7 and photocells 5 clearly superimposes a cyclic or undulatory "gain"—first positive and then negative—upon any feed rate given to the yarn by drums 6 and 7. Cam 281 may be connected by suitable speed reducing means to shaft 11 (Fig. 2) or it may be driven under control of program sheet 131 by any step by step magnetic motor, e. g. of the general type shown in Fig. 26. If applied to a structure like Fig. 2 central guide eye 4 would be somewhat lowered because this cyclic loop must be manipulated below photocell unit 5 and above central eye 4, as is indicated in Fig. 9. This type of yarn loop cam undulator may be applied to any knitter with a yarn control of this invention, but it makes relatively a greater saving of complexity if applied to the modified structure of Fig. 25 because here all the clutches and differentials but those necessary for the yarn timing and controlling function are replaced by step by step means of advancing the yarn above basic speed, and it is primarily intended to be so applied.

II

Fig. 18 illustrates a machine of the same circular stationary cylinder latch needle type as knitter 1 of Fig. 1, but equipped with two different supplies of yarn. These supplies and the feed drums or capstans and the photocells to control them, must revolve therefore, otherwise the two yarns would be twisted together. Supply cones 283, 283 are carried on a frame erected upon the revolving table of the knitter 1A. This frame consists of two uprights 284, 284 screwed into the revolving table 252A and joined by three horizontal shelves or cross bars 285, 286, 287. The top bar 287 has bolted to it the flange of a vertical hollow stud 290, which is placed exactly on center. This stud carries an insulating sleeve 291 and on that are a number of collector rings 293. The top of this central stud is steadied, and the whole frame with it, by being journaled in a bracket 294. This bracket carries insulatingly mounted collector brushes 292, 292, as many as there are rings. It is supported by a stationary frame, erected on the outer stationary table 295 of knitter 1A, comprising uprights 288, 288 and top cross piece 289. This latter has an ample clearance hole in the center for hollow stud 290. The wire connections from collector rings 293 are brought inwardly from the latter into the inside of stud 290 and thence down as shown to make circuit connection to various elements on the revolving frame, as will be seen. The yarns 2A, 2A, from cones 283, 283 are led through guides on shelf 287 as shown and downward around the capstans 296, 296 driven by selsyn motors 297, 297 and past photocell units 5A, 5A, through feed guides 3A, 3A to the needles of the knitter.

The functions and operation are in all respects like those of the structure of Fig. 1 and circuit Fig. 12 with the following exceptions: there are two yarn control systems and two complete gain and shift producing systems with program controls instead of one. And the transmission from the end shaft 22 of each to its feed drum or capstan is by the well known electrical system of coupling by selsyn motors instead of by shafts and gearing as shown in Figs. 1 and 2.

Fig. 20 is a very much simplified and fragmentary plan showing the relation of the two control and gain producing systems 33A, 33A to knitter 1A. The tight and loose driving pulleys 24A, 26A are shown, corresponding to 24 and 26 of Fig. 1. The bevel pinion 28A drives the knitter through large bevel gear 29A. Another bevel pinion 28AA is driven by 29A. The basic gear boxes 30A, 30A are thus related in speed to knitter 1A exactly as box 30 to knitter 1 in Fig. 1. Reference numerals in this figure, except for the suffix letter A correspond to those of Fig. 1. It is to be understood that all the features of Fig. 1 are present—33A, 33A representing two control and gain systems each like that bearing reference numeral 33 in Fig. 1, and 132A, 132A representing two program devices like 132 of Fig. 1. The basic speed shafts 38A, 38A correspond to 38 of Fig. 1 and the helical gears 40A, 40A meshing with ring gears 41A, 41A are each like 40 and 41 of Fig. 1. The output sides of differentials 42A, 42A (Fig. 18) each exactly like 42 of Fig. 1, are however connected each to a selsyn transmitter 298, 298, instead of to bevel gear 21. The angular motion imparted by basic shaft 38A and by control and gain units 33A to these transmitters 298, 298 is by them electrically transmitted to motors 297, 297 by way of the electrical conductors in conduits 299, 299 and collector brushes 292, rings 293 and wiring as shown.

Fig. 19 shows the well known simple selsyn circuit, merely for reference, it being no part of this invention. 298 is the transmitter, 297 the receiving motor. Five of brushes 292 and of collector rings 293 are shown. One of the delta connections of the stators in both pairs can be common, making nine rings needed. The frame of the machine may be used for this one, if it is not too variable in the resistance between the stationary and revolving parts, making only eight rings needed. The rings and brushes 300 to each rotor are built in the motors 298, 297. As is well known the synchronous or phase-retaining action of the two rotors depends on both being across the same alternating current mains. Terminals 302 therefore are to be connected across a source of 110 v. 60 cycle alternating current or the like. The two slip ring connections 292, 293 used for conducting this A. C. into the rotor of motor 297 may be also used to supply current to the lamp 115 (see Figs. 14 and 15) needed to illuminate the yarn in each unit 5A. Obviously, were there more independent yarn supplies then two additional control and gain units could be provided and additional selsyn couplings.

Fig. 21 illustrates the application of another type of well known selsyn connection, differential selsyns, to the problem of accurately driving capstan 296 on a revolving part of a knitter such as 1A. The knitter is not shown, and only enough of the control and gain unit to identify it. Like reference numerals are used except with a suffix B to refer to identical parts found on Fig. 1. The gears 40, 41 and the differential 42,—whereby in Fig. 1 the shafts 22a and 38 combine their speeds and impart the resultant to the feed drums 6 and 7 by way of shaft 22 and other transmission gearing—are done away. The speeds of shafts 22aB and 38B are combined by the well known principle of differential selsyn motors, whereby the angular movements of two rotors, dipole rotor R of transmitter 303 and star rotor R of differential selsyn unit 304, are cumulatively impressed upon dipole rotor R of receiving motor 305. Thus gears 40, 41 and differential 42, the only high speed gearing in Fig. 1 outside of gear boxes 30 and 34, is replaced by a silent electrical differential. The speed of shaft 38B must, for like conditions, be made twice that of 38 in Fig. 1. This is because by the spider gears of differential 42 the speed of shaft 38 is imparted double to shaft 22, whereas the speeds of the selsyn rotors of 303 and 304 are directly added as imparted to rotor of 305.

III

Figs. 22, 23, 24 illustrate a much simpler purely tension yarn feed control, that can be combined with the gain units (speed varying devices) either of the Fig. 1 type or of the Fig. 25 type. It has the disadvantage of considerably less positiveness, producing fabric pattern lines of greater irregularity than does the already described feed drum or capstan drive. The symbolical fragmentary plan of Fig. 24 shows what is altered of the devices of Fig. 1, or of Fig. 25. All the elements remain that affect the speed of the timer commutator 57C and brush carrier 64C. That is to say nothing is removed of the Fig. 1 apparatus except the first two power branches away from shaft 32, namely shaft 38 and all that it leads to and shaft 45, gear box 47, and shaft 46 with all that it leads to. There is no feed drum and therefore no transmission, mechanical or electrical, to it is needed. The whole result of the operation of the various clutches and gears is to vary the timer speed. The yarn is controlled to the timetable laid down by the timer solely by varying the tension or drag on the yarn. For that reason the more sudden shifts or feed rate changes, such as we saw resulted when jump shift solenoid 199 of Fig. 1 is operated, are not to be undertaken when using this type of control.

Fig. 22 shows yarn 2 being drawn downward through central eye 4, past photocell unit 5, after passing in figure 8 form repeatedly over grooved wheels 6D and 7D, geared together. These wheels are quite small in diameter, are very freely journaled, and are then revolved at quite high speed by the yarn as it is drawn over them and into the fabric by the needle wave, instead of themselves driving or feeding the yarn at a predetermined speed by power as is the action of feed drums 6 and 7 of Figs. 1 and 2.

Attached to grooved wheel 6D through shaft 301, which rotates in frame plate 306 and in a tubular hub thereof not shown but extending within wheel 6D, is a large diameter copper disc 307. This disc runs in a small gap in the otherwise closed magnetic circuit of field coil core 308 on which are wound series aiding the coils 309, 309. These coils are connected in circuit of battery 310 through rheostat 311. Rheostat 311 is adjusted by trial to produce a strength of magnetic field in iron core 308 just so strong that the resultant Foucault drag on disc 307 when the machine is at full speed will fall slightly short of preventing yarn 2 from running "ahead of time" relative to "basic" time as marked off by timing commutator and brush holder 57C, 64C.

A second field coil unit, 308′, 309′, exactly like 308, 309 except that its winding is less powerful, straddles disc 301 at another point. Coils 309′ in series with a rheostat (not shown) are connected in the circuit of Fig. 12 in place of magnet 53. The color patterns of yarn 2 when passing photoelectric cell unit 5, will quickly be found to be "ahead of time" because the drag of coils 309 was adjusted a trifle weak. This meant that in Fig. 12 when the circuit of battery 89 has been closed by the timing brush 59 and before 59 again opens this circuit, the active needles (opposed by the insufficiency of coils 309) will have brought a color change in front of upper photocell 72 (Fig. 16). This, of course, results in energizing relay 93 and energizing coils 309′ for nearly one revolution of timer 57c. Coils 309′ by careful adjustment of the rheostat, are regulated to apply enough additional Foucault drag to disc 301 adequately to correct the tendency of yarn 2 to run ahead and to cause it to lag a very little. Because of the delicate and unstable nature of this yarn control by tension balanced against needle pull it is necessary to check up yarn position much more frequently than when the feed is mechanically positive and only a slight creep is to be corrected. A check up every color spot, or every two spots, instead of every pattern or so, may be made. All this requires is a higher gearing up of the timing commutator 57C and brush carrier 64C so that a more rapid time table will be marked off.

IV

Fig. 25 illustrates a modification in which, with no change of the fundamental yarn control features of Fig. 1, the speed varying or "gain" producing elements—namely all that apparatus to the right of gear boxes 60 and 61—is replaced by an electromagnetic step by step motor and an interrupter to operate it. In the figure, the same reference numerals are used as in Fig. 1, except on new elements, and no description is needed except as to the step by step motor and the interrupter. Shaft 31, that comes out of gear box 30, has a speed equal to the knitter. It is extended to drive interrupter 312, which therefore makes a complete turn for every turn of machine 1. Brush holder 314 carries six brushes 313, 313 that contact on the five rows of conducting segments 317 or the collector ring 315 of the interrupter. There is one row of sixteen conducting segments 317, a second row of eight, a third of four, a fourth of two, and the top row (Fig. 29) has one. All of these are connected, within the insulating material of 312, to ring 315. The whole periphery is divided into 32 spaces, and, as is shown, the segments 317 are so arranged that no two occupy the same one of these 32 spaces, i. e. no two overlap. 16+8+4+2+1=31. Therefore one space, the 32nd, contains no segment 317. The five upper brushes 313 are wired to five inserts 245 of a program device exactly like that of Fig. 1 but having fewer contacts. The operation is as described above. The only particularity to note is that that brief period when contact pins 243 are raised, while program sheet 131 is stepped forward by spring 233, falls entirely in the thirty-second space of interrupter 312 where there is no contact segment. It is clear that, depending upon the perforation of sheet 131, any one revolution of interrupter 312 can be made to open and close the circuit of coil 318 and thus cause it to be energized any number of times up to thirty-one; e. g., suppose in a certain course of knitter 1 exactly 17 energizations of magnet 318 are desired. Therefore there will be only perforations under contact pins 243—1, 243—5 and of course under 243—6 that leads to coil 318. Current now flows from the negative pole of the battery, through the lowest brush 313—1, through collector ring 315, through each in turn of the first eight segments 317 of the "sixteen" row, through brush 317—2, through insert 245 and contact pin 243—5, through strap 249, contact 243—6 to coil 318 and back to positive side of battery. After the circuit thus traced has been closed and opened eight times while brush 313—2 passes over the first eight segments of the "sixteen" row brush 313—6 passes over the one segment in its row. This brush is at this time connected, through contact pin 243—1, to magnet 318 because sheet 131 is assumed to be perforated under contact pin 243—1. After brush 313—6 leaves the one segment 317 in its path, brush 313—2 continues making and breaking the circuit on the remaining eight segments in its path. Coil 318 receives thus 17 impulses or closures and openings of its circuit and thus 17 times attracts and releases armature 319 by which action pawl 320 normally retracted by spring 323 is caused to advance ratchet 321 by 17 teeth. Holding pawl 322 retains this advance. Ratchet 321 rotates shaft 22b to which it is fast, in the opposite direction to the rotation of shaft 22a, whereby through the action of differential 56a positive gain is imparted to shaft 22a.

The maximum "gain" above the basic speed that can be made with this device as shown is thirty-one teeth of ratchet 321 per course.

The greater simplicity of this electromagnetic gain producing structure is a great advantage. The disadvantageously jerky nature of the speed increments added to basic speed will be well enough absorbed by the elasticity of the yarn in most cases.

V

Figs. 30, 31 and 32 illustrate a variant of the modified structure of Figs. 25, 26, 29, in which the electrically controlled gain producing or speed increment producing motor is not a ratchet motor but of a phonic wheel type. The specific form of impulse motor shown happens to be one disclosed in U. S. Patent 1,536,021, issued April 20, 1925 to P. Van Santen Kolff. In this, and in similar impulse motors, is utilized the cyclic energization of magnets arranged about a dentelated rotor to cause the latter to revolve. The Kolff motor being well known no detailed description will be given. Cam 333, which closes and opens contacts 328, 329 and 330 in overlapping rotation and which thereby energizes and deenergizes in rotation magnets 325, 326, 327, is driven through suitable gearing (not shown) by shaft 27 (Fig. 25). This cam rotates 32 times per course. It thus may even be mounted directly on shaft 27 when the ratio of speeds of bevel gears 28 and 29 is as 32 to 1. By the understanding of the Kolff motor it will be perceived from this speed of cam 333 that the motor will always take 32 steps per course if not otherwise impeded. Incidentally the rotor 335 of the motor here shown, Fig. 31, happens to have the same number, twenty, of magnetic inserts or iron teeth, 324, as are shown (under reference numeral 24) in the patent to Kolff referred to. Each revolution of cam 333 will thus normally move the rotor 335 1/20 of a revolution. To vary the steps per course taken by rotor 335 advantage is taken of the fact that if one iron insert 324 be temporarily opposite a magnet, e. g. 327 in Fig 31, the subsequent energization of another magnet, e. g. 325, will not move the rotor 335 until or unless the first energized magnet 327 is deenergized. There is to this end provided a commutator 331 with seven brushes 332—1, 332—2, . . . 332—7, for potentially closing the energizing circuit of magnet 327 in parallel to contact 330 and thus locking rotor 335 at all those intervals when contact 330 is open, together with a perforated program sheet means, general numeral 132F (substantially the device 132 of Figs. 1 and 25) which, among other things, determines at which intervals the commutator will be permitted to energize magnet 327 and lock the rotor.

Commutator 331 is to be understood to be driven by shaft 31, Fig. 25, in place of commutator 312, i. e. one revolution per course. It has five rows of contact segments 336, of sixteen, eight, four, two and one segments each respectively. The five brushes 332—3, 332—4 to 332—7 pass over these five rows of segments respectively. Brush 332—2 finds one segment 336 in its path. Brush 332—1 is always on a common ring 337 connected to all the segments 336. Commutator 331 is so constructed and oriented and brushes 332 are so positioned that each time contact 330 is opened by cam 333 one or the other brush 332 will already be on one or the other of segments 336, and will not have passed off until cam 333 has again closed contact 330.

Program control 132F needs no detailed description, being operated exactly like the device 132 of Figs. 1, 25, 27, 28, it merely has more contacts and instead of individual inserts 245 on insulating contact bar 244 there are certain contact strips 338, 339, 340, 341, 342 and 343. Cam 333 tends to advance rotor 335 thirty-two full steps or teeth in every course. Commutator 331 with its brushes 332 and thirty-two segments 336 tends to lock rotor 335 and prevent these steps, all thirty-two times. The first six positions of program control 132F determine which of segments 336 shall be effective in locking the rotor. The perforations shown in sheet 131E, permitting contact pins 243—2, 243—4, 243—5 and 243—6 to make contact on strip 338 (on which pin 243—1 makes contact all the time), will clearly result in brushes 332—3, 332—5, 332—6 and 332—7 holding magnet 327 energized and thus locking rotor 335. Brush 332—3 will pass over at intervals sixteen segments 336, and while in contact with any one of them will complete the following circuit: From negative pole of battery through conductor 344, brush 332—1, ring 337, segment 336, brush 332—3, contact 243—2, strip 338, contact 243—1, conductor 345, coil 327 and conductor 346 back to battery. Similarly, but at intervals inter-related between those when brush 333—3 is making contact, the same circuit will be closed by brushes 332—5, 332—6, and 332—7 through contact pins respectively 243—4, 243—5 and 243—6. The number of steps (out of 31 possible) during which in this example, rotor 335 is locked is 23, of which 16 are locked out due to the perforation in 131E under contact pin 243—4 and brush 332—5, two more due to pin 243—5 and brush 332—6 and one due to 243—6 and brush 332—7. This leaves the rotor free to step just eight times with the given perforations in sheet 131E. The number of possible steps of the rotor, from which the locked out steps must be subtracted to obtain the actual steps taken, is 31 and not 32 because one step (the last) is permanently locked out by brush 332—2 and the one segment 336 in line with it. This is done in order to use the time that a thirty-second step would take for shifting perforated pattern sheet 131E to the next position. This shifting is done by the force of spring 233 when roller 230 drops off cam 231 all as described in connection with Figs. 25 and 27.

Having thus described how the possible 31 steps of rotor 335 may at will be diminished by any run of the numbers 1, 2, 4, 8 and 16, i. e. how any number of steps from 0 to 31 may actually be imparted to rotor 335, under control of the first six perforable positions in program sheet 131E, the control of the direction of turning of the rotor by the next six perforable positions will be explained. These next six positions may be said to be normally perforated as shown. Tracing the circuit from positive pole of battery, through conductor 346, to middle point 347 of star connection, through coil 325, conductor 348, contact 243—8, plate 339, contact 243—7, conductor 349, cam operated contact 328, conductor 350, we come back to the negative pole of the battery. A circuit is similarly traceable from plus battery through coil 326, conductor elements 351, 243—10, 340, 243—9, 352, cam contact 329, conductor 350 to negative pole of battery.

If now the perforations were altered to be only under pins 243—7 and 243—9, 243—11 and 243—12 the circuit traced in the same way through magnet coils 325 would be found to connect this coil in series with cam operated contact 329 instead of with 328 as shown. The circuit traced through coil 326 would be found to pass through cam contact 328 instead of through 329 as shown. This would result in changing the order of energization by the cam of the magnets from 327, 325, 326 as shown to 327, 326, 326. This will reverse the direction of rotor 335.

Diagrammatic fragmentary plan Fig. 32 shows, under the numeral 335M, the motor whose relative controls we have just traced, with its shaft 334 carrying a worm 353, which drives worm wheel 354. In Fig. 25 worm wheel 354 is to be substituted for ratchet 321 and motor 335M for ratchet motor 318. Thus through shaft 22b, (see Fig. 1 also) whatever speed increment motor 335M has to give is added to feed drums 6 and 7 through differentials 56, 42, bevel gears 21, 20, shaft 17, gears 16, 15 and shaft 11. At the same time, through gear box 61, the increment of speed due to motor 335M is added with a proper multiplying ratio to the timer.

In using this reversible impulse motor variant of the Fig. 25 modification it is necessary to realize that gains can now be made of both the positive and negative kinds. Put otherwise, the range of speed increments is much widened. For that reason, if the whole range is to be used, the designer will locate centrally in the whole usable yarn feed ranges, rather than at the lowest or L min point, that feed drum speed we call "basic." Concretely this is the speed imparted to feed drums 6 and 7 by shaft 38 alone, (a speed merely corrected not changed by shaft 46 whenever the photocells act on magnet 53) and on top of which increments of speed positive or negative are to be made.

Because of the wider range of yarn length that may be fed per course it is even more necessary than in other models to provide a compensating stitch adjustment. For this reason magnets 267 and 275, respectively, the stitch lengthening and the stitch shortening magnets of the device described in connection with Figs. 10 and 11, are shown connected at one side to two contact pins, 243—13 and 243—14, of the program device 132F. The other side of both is connected to —battery by conductor 355. Pin 243—15 is connected to plus battery by wire 356. When sheet 131E is perforated for pin 243—15 and for either (but never both) of pins 243—13 and —14, either of magnets 275 or 267 will be operated, and the stitch will be shortened or lengthened respectively.

VI

Figs. 33, 33a and 34 show an important embodiment of my invention having means to detect variations in the dielectric qualities of yarn instead of in colors. In some cases, as for example in the two treatments known commercially as "immunizing" and as "saponifying" and in the application of treatments called "resists", a yarn may be left all white, i. e. with no visually distinguishable spots, yet may be prepared to accept a particular kind of dye in one place and not in another. The practice of "spot preparing" yarn in some of these ways without color change is increasing almost as rapidly as the spot dyeing process whereby true polychrome yarns are produced. Reference is made to applicant's co-ending application Serial No. 646,646 filed December 10, 1932, teaching an unusually efficient means and method of doing "spot dyeing" "spot saponification" and "spot immunizing". The product of such pretreatment might be called potential polychrome yarn. Such yarn is woven or knit into fabrics, alone or with other yarns, and subjected to the real dyeing process later in the piece goods. There are certain economies of handling and advantages of appearance that result. There are other yarns, properly speaking polychromed or spot dyed, that may equally well or better be controlled by their dielectric constant or by their phase angle than by their color. Those spots or color on which a mordant has been used (to bind the lake) will usually have a higher electrical conductivity (of the order of hundreds of times higher) relative to adjacent spots dyed or treated otherwise. This is because mordants are usually metallic salts that deposit on the yarn in insoluble form. A high conductivity is one of the dielectric qualities detectable by the means to be described. The conductivity of cellulose acetate yarns has also been found to be hundreds of times lower (electrical resistance higher) than of ordinary rayon or viscose yarns.

In certain published tests ordinary viscose was found to have an electrical conductance (time in 1/100 minutes) of 4.5 compared to cellulose acetate 2320. Silk having a "weighting" of 7.4% was found to have an electrical resistance of 4523 as compared with 10 for silk having a "weighting" of 40.9%.

The "saponifying" process mentioned is a process for treating acetate yarns by strong alkalis in such a way as to reduce the acetate to viscose. The spot saponifying of yarns is being practiced, and increasingly. For all these reasons it is necessary to be able to detect other qualities of spot treated yarns than color, and to control the feed by linear "patterns" or "spots" on the yarn that the eye cannot see. While the photocell, sensitive to a much wider band of radiation than the human eye, can detect these invisible spots in some cases, the means to be described is more reliable in other cases.

Condenser plates 357, 357 have smooth square flat edges 359, 359 of length less than the yarn spot lengths to be distinguished. These edges are brought close together and held in this relation, almost touching but for a space sufficient to pass the yarn 2, by sliding the spring grip of the curled upper and lower ends of plates 357 on two quartz rods 361. Quartz is used because it has a very low dielectric constant and is a splendid insulator. To insure a minimum of leakage between plates 357 over the surface of these rods 361 the plates are cut away as shown to make the length of exposed rod surface that leakage currents must traverse, very considerable. These exposed surfaces should be wiped dry and clean of lint and dust occasionally to avoid changes in electrical adjustment. Plates 357 are equipped each with a binding post 358. Rods 361 are encircled each by two spring guide rings or bands 362 having polished edges, and which are moved along the quartz rolls until there is defined between each pair a space just wide enough for yarn 2, and in exact line with the space (a trifle less tight for the yarn) between edges 359, 359. Accumulating "static" or frictional electricity is removed by grounding guide rings 362.

View 33a shows merely how yarn 2 is run onto and off from rods 361 at a sufficient angle to keep it in place. By substituting this device for the photocell and lamp unit 5, and by substituting the circuit of Fig. 34 for that of Fig. 12 (or for Fig. 40—see below) the machine shown in Figs. 1 to 17, or any of the modifications such as shown in Figs. 25 and 30, is ready to control to a time table. To apply speed increments or gains at which, all exactly as described when using the photocells, execept for the following details of the circuit action and adjustment. In circuit Fig. 34 hot cathode type triode 363 with grid biasing cell 366 and grid condenser 365 is connected with battery 364 and battery by-pass condenser 369, and with primary of radio frequency transformer 367 (bridged by variable tuning condenser 368) in a well known high frequency oscillating hook up. This whole element of the circuit serves merely as a generator of tunable radio frequency alternations. Any other R. F. oscillator that is stable and tunable will do. By condenser 368 the frequency is adjusted until in resonance with the second circuit element. The main circuit in which the oscillator must be adjusted to produce resonance is the loop comprising the secondary of transformer 367 and condenser 371. Now, condenser 371 is the condenser formed between plate edges 359, 359 and having the mass of yarn 2 as a large part of the dielectric between these plates. The filament of a detector triode 370 is connected to the lower (grounded) side of condenser 371, and the grid of the same triode, through a biasing battery and small condenser in parallel is connected to the upper side of condenser 371. Assume for instance an alternating acetate and viscose yarn, i. e. a "spot saponified" acetate yarn, is to be controlled. Condenser 368 will be adjusted to cause the loop formed of condenser 371 and secondary of 367 to resonate sharply when a viscose spot has been placed so it has entered about half way between plate edges 359, i. e. so that about half of the yarn between plates 359 is acetate and half viscose. With this adjustment of 368, while either the fully acetate or the fully viscose lengths of yarn are passing, the circuit will not resonate, and the alternating potential across condenser 371, and hence from filament to grid of detector tube 370 will be relatively low. As the edge of the next different spot enters between 359, 359 and comes about half way the condition of resonance is set up and the sudden increase in the alternating potential on the grid of 370 makes a very large change in the output of this tube into the amplifier 372, which may be of any suitable design. Plate battery or power pack for tube 370 and for the amplifier tubes is included in 372.

The amplified output of 372 is allowed to pass through iron core transformer 373 and at those times and for those periods determined by the timer comprising commutator 57 with segments 62, 63, etc. This is the same timer mechanism with the same reference numerals illustrated in Figs. 1 and 12. If yarn 2 is not too "early" the condition of resonance will not be set up until the timer has opened the output circuit of 372. Thus the weak output, even though again stepped up in tube 374, will not break down the gas filled diode 375. When a "difference point" of the yarn reaches that half way point in the condenser that causes resonance while the circuit through timer brush 59 on segments 62, 63 is still closed, then strong impulses are produced in the secondary of transformer 373, which being amplified by tube 374 cause an increase of potential across resistance 376. This increase assists battery 377 to ionize or break down the gas filled tube 375, and then current flows through magnet 53 and continues to flow, for the most of one revolution of the timer, or until cut off by brush 58.

It will be clear that, just as any change of light value affects the photocells differentially, whether from dark to light or vice versa, and if occurring while the timer permits the cells to act, operates retarding magnet 53, just so any point on the yarn of sudden change in dielectric constant or in conductance, or in other electric quality, whether from higher to lower or lower to higher, will (when permitted by the timer) act to operate the retarding magnet 53. This property of detecting mere change and not absolute value makes the system very flexible. Any yarns of the same pattern length, regardless of color or spot qualities can usually be run with little or no readjustment of the circuit because of this dependence on mere change of value.

VII

Figs. 35 and 36 illustrate an alternative to the yarn correction means of Fig. 1, in which, it will be recalled, magnet 53 when energized is locked up for one revolution of the timer and applies a negative speed increment to feed drums 6 and 7. In Figs. 35 and 36 a yarn feed capstan 378, integral with or fixed to toothed wheel 379 is frictionally driven by shaft 11 due to the pressure of spring 380 which forces 379 against flange 381 of shaft 11G. Nuts 382, 382 are adjusted to insure sufficient friction to feed any yarn without slipping. Whenever, due to yarn 2 running "ahead of time" (see Fig. 12) relay 93G is energized, it closes the circuit of magnet 53G by its contact 103, through battery 96; magnet 53G is thereby energized. This causes stop pawl 383 to engage a tooth of 379 and arrest the rotation of capstan 378. The speed of shaft 11G is not affected.

In the modification of Fig. 35 it is thus clear that relay 93G, having no locking winding, starts to fall back again (quickly in fact) as soon as the photocell energizing circuit is opened by wiper 59 passing off from segments 62, 63. Thus pawl 383 seizes capstan 378 and stops it completely for a very brief part of a revolution of timer 57, instead of slowing shaft 11 slightly for almost a whole revolution of the timer. When contact 103 opens spring 384 withdraws pawl 383 from the tooth of 379 and shaft 116 resumes its friction driving of capstan 378.

This Fig. 35 device "sets back" the yarn capstan as one would set back the hands of a clock that is "fast", instead of slowing up the capstan (regulating the clock) as is done at least for one timer cycle by the means of Fig. 1. Obviously, when the device of Fig. 35 is used we must have "dead", or remove all of the Fig. 1 speed-correcting apparatus—being gear box 47, shaft 46, clutch 52, magnet 53, shaft 50, worm and worm wheel 54, 55 and differential 56.

Another type of these yarn correcting devices for "setting back" instead of slowing up the yarn capstan or feed drum, is shown in Figs. 37, 38, 39. To apply this device merely hook magnet 53H in the unchanged circuit of Fig. 12 in place of 53, and remove or leave dead the speed retarding gearing and clutches in Fig. 1, just enumerated. Magnet 53H, when energized by the amplified photocell output (as shown), places the cam shaped end 385 of its armature in the path of the one end of an escapement pallet 386, pivoted in and carried and guided by a slot in driving head 387, which rotates with shaft 11H. Pallet 386 is held by spring 388 in engagement at one end with a tooth of the toothed crown 389, integral with yarn capstan 390. Thus shaft 11H by head 387 and by the one end of pallet 386 in a slot of 387 drives capstan 390 at its own speed. But when magnet 53H interposes cam end 385 of its armature in the path of the long end of pallet 386 the latter is first rocked against spring 387 and is then rocked back. This causes capstan 390 to be escaped backward one tooth relative to shaft 11H and driving head 387. Magnet 53H, just like magnet 53, is energized at the end of the revolution of timer 57 so that this escaping action or "setting back" is not indefinitely repeated.

VIII

Fig. 40 is a modified version of Fig. 12. All the same elements and reference numerals will be noted up to transformer 92. In Fig. 40, more to illustrate the nature of the amplifier than because a greater amplification is needed, a further stage of amplification 391 is shown with its output transformer 392. The essential novelty is in substituting at this point a grid-glow tube 393 for the relay 93. In detail, the secondary of output transformer 392 is connected between filament and grid of grid glow tube 393, with a filament biasing battery 394 in the circuit. Tube 393 is of the unstable "soft" or gas filled type which, once ionized, are no longer controllable by the grid. The grid is so negative that it requires a considerable voltage impulse in 392—the amplified signal from the unbalanced photocell—to permit the battery 96 to start up a plate current flow. The grid is so made sufficiently little negative for one instant the flow continues, energizing coil 53, until interrupted at brush 59 of the timer. This modification of Fig. 12, where "grid glow tube" 393 or a tube of the so-called Thyratron type replaces mechanical relay 93 is in every way interchangeable with Fig. 12.

IX

Fig. 41 illustrates a circular knitting machine IJ of the latch needle, stationary cylinder type, i. e. of the same type as I of Figs. 1 and 2, or IA of Figs. 18, 19, but arranged so that several yarns 2a, 2b, etc. may be predeterminedly fed to several points of the fabric, through several guides 3J, using only one photocell unit 5J and one yarn feed control and gain producing unit like that of Fig. 1 instead of one per yarn as illustrated in Fig. 18. This is done by providing a plurality of yarns of the same color pattern together side by side on one spool or package 395, in such a way that their colored portions are matched up. They may for example be colored all together as one yarn, e. g. by printing them after doubling (but not twisting) them and by winding them then directly onto package 395.

These yarns, or this multiple yarn—in the figure a quadruple yarn is used—may be said to be "in color phase" on the package.

Starting with this condition the 4 yarns shown are fed—under the control of photocell unit 5J—by feed drums 6 and 7 which are turned accurately to plan by selsyn motor 297, all as described in connection with Figs. 18, 19 and 20. The difference is that in the latter two yarns possibly quite different in pattern, are controlledly fed, independently, by two complete control and gain systems 33A, 33A under control of two photocell units 5A, 5A. In the present modification we show several yarns (4 shown) controlledly fed, but together and not independently, by one control and gain system like 33 (not shown) under guidance of one photocell unit 5J. The Fig. 18 structure permits a greater freedom or variety of fabric effects but the Fig. 41 structure permits much higher output at less first cost for the machine. It is, moreover, not devoid of interesting fabric pattern possibilities, as will be seen below.

In order that the four like yarns 2a, b, c, d,—fed together like one yarn as far as central guide eye 4, and there separated to go to four knitting points and feeding guides like 3J, 90° apart about the cylinder—may normally reach the needles "in color phase" it is arranged to pass each one over an adjustable stationary guide roll 396. This is so clamped on upright 406 that its height can be adjusted and the length of yarn between eye 4 and feed guide 3J thereby increased or decreased. By this means, once for all, the four guides 396 are so set that, for example, the black spot of all four yarns will reach the needles simultaneously. Two other fixed guides 397, 398 are arranged for three of the yarns, also a movable guide 399. The latter is carried by armature 407 of magnet 403 which is held in the attracted position shown by latch 405. Magnet 404 can attract latch 405 which is on its armature, and release 407. Spring 400 then moves bell crank end of armature 407 against one of the steps of fixed stop 401. The latter is manually preset as desired by thumb screw 402. When arm 408 is moved to stop 401 by spring 400 the movable guide 399 pulls out a certain loop of yarn 2a, and thereby causes any given spot of 2a to come "late", by the amount of this loop, to feed guide 3J and the needles. The loop in yarn 2A so taken up can be again let out by the energization of magnet 403. That condition, loop, or no loop, set up by either of magnets 403, 404, will "stay put" until the other magnet operates. It is understood that in my program device used with machine IJ, (like that of Fig. 13) sufficient extra contacts 243, 243, and proper perforations in sheet 131, would be provided, also the needful wiring, so that magnets 403, 404 can be alternatively energized at the designer's will in the program of the fabric. These magnets 403, 404 are connected in Fig. 13, exactly like any pair there shown, such as 152, 153.

There are shown, in Fig. 41, three magnets 404. This is to indicate that three exactly similar arrangements are provided for taking up or letting out a loop respectively in each of the three yarns 2a, 2b and 2c. The repetition three times in the drawing of the parts 396 to 408 would have been confusing.

The reason there are not four of these loop making and releasing devices and the reason there are only three steps in stops 401 is that, the color phase shifts produced by these loops are purely relative. The drawing supposes that yarn 2d (at the point at the back of the cylinder or diametrically away from the observer of Fig. 41) has no loop making device. Obviously, all desirable fabric effects due to color phase changes between these four yarns can be produced by adjustment of yarns 2a, 2b and 2c relative to 2d.

Fig. 42 shows in detail the rotatable low resistance mercury connections 74, 75 shown diagrammatically in Fig. 12 and of use only in those machines where, as in the Fig. 41 structure, the photocell unit or units, 5A or 5J are required to revolve. This type of connection provides a very invariant and low resistance connection, which is important in the circuits of photocells. Good copper laminated or wire collector brushes, properly maintained, are satisfactory—this mercury device is, however, especially maintenance free. Detailed explanation is hardly required. A central mercury mass 409, in the central cavity of a molded Bakelite or other insulating member 415 carried on the rotating frame of the machine, is in contact with conductor 410 leading to the cathode of one of the photocells 72, 73 of unit 5. The mercury mass 412 in ring shaped cavity 412 of member 415 is similarly in contact with a conductor 414 leading to the cathode of the other photocell. Collector members 411, 413 on the stationary part, dip deeply respectively into masses 409 and 412, and make very constant contact. For the photocell cathode circuits of Fig. 12 such a refinement offers a saving in maintenance and greater freedom from false operations.

X

In Figs. 43, 44, 45 and 46 is shown still a third general method for controlling and varying the feed of the yarn by depending upon mechanically stiffened or hardened spots regularly spaced throughout the yarn in proper relation to the dyed, colored or treated spots whose position it is desired to control. The necessity of using this method in some cases will be evident when the possibilities (see below) of long repeats are considered. Let us assume that, in a device to be described below, a yarn has been appropriately printed or colored at appropriate points and for appropriate lengths so as to be the linear embodiment of some image in several colors, e. g. such a yarn might be the linear reproduction of a red and green rosebud. If the pattern or fabric to show the rosebud does not also include other more formal pattern elements like stripes, so that the yarn has frequently resuming and reasonably regular color spots by which it may be timed or controlled, it will be found practically impossible to operate the timer in accordance with the color change points that outline one edge of an object so irregular. If this very irregular timing is somehow accomplished—e. g. by suitable perforations, in the pattern sheet—it will still be an unsatisfactory control, if the rosebuds are large or far apart, because in that case the yarn would receive so infrequent correction. Imagine, for example, this invention applied to knitting in the breast of a plain black athletic jersey the necessary orange spots or stripes to outline a tiger or other symbol of the organization ordering such garments. There would be no points of color or dielectric quality change except at the edges of the figure on the front. In the long ungoverned course around the back the yarn would "creep" very markedly. It would be difficult to bring the orange spots to their correct position within an inch or more if there were but one control point and one correction in the whole course. Yet the accurate reproduction in a fabric, by using "long pattern" polychrome yarn of a single representation or figure in the midst of a large uniform background is one of the most useful applications of this invention.

To make this application more easily possible it is only necessary while printing or coloring the long pattern on the yarns, to "mark" them at regular short pattern intervals with some marking that will not be objectionable in the finished fabric or that can readily be removed after the fabric is completed. Colored or treatment "markings" that are either invisible or of such a nature as to stand the steaming and other treatment given to the yarns in the setting or fixing of the true "long pattern" markings and that yet can be removed or marked out selectively, or over-dyed selectively, in the finished fabric, are possible. For example, suppose a wide white piece goods with one or two striking bluebirds be desired, in artificial silk. Suppose acetate yarn is used. During the printing of those blue portions constituting the bluebird "long pattern" a very strongly alkaline paste may be applied at "short pattern" intervals— related to but never falling on the blue portions—and by suitable later treatment a white acetate yarn with a "short pattern" of invisible white viscose spots superimposed on a "long pattern" of blue dyed acetate spots will result. We may then control the yarn with spot pattern frequency by the means shown in Figs. 33, 34. Or this same yarn, before knitting, may be dyed in a light tan colored dye liquor that will affect only the viscose or "saponified" spots, thus permitting the photocell control of it. The completed fabric may then be overdyed in a light tan liquor that will affect only the acetate portion, until the viscose spots and the acetate background are matched. The light tan over-dye will not noticeably affect the warker blue portions.

A simpler solution, and one more universally applicable to all yarns and color conditions— one that may even be used in some plants universally on both long and short patterns, thus entirely replacing in those plants the photocell equipment by the devices of Figs. 43, 44, 45—is the application during the printing or dyeing of the yarn, or else later but in exact relation to the yarn color patterns, of tiny droplets of "size". In many cases these may be left permanently in the yarn, in other cases they may be of such materials, e. g. waxes or gum arabic, that they can later be selectively worked out. The effect of the application of any such droplet of consistent compound, later dried into the fibers, is not to make the yarn of any larger diameter at that point if no excess is used, but merely to make the yarn resistant to flattening at that point. Fig. 44 illustrates in the solid lines how a yarn 2 running over the cylindrical surface 416 of a feed roller or capstan will spread out and become thinner particularly if pressed upon by the surface 417 of another roller. The round shape of a section 2K of the same yarn when stiffened by a "size" marker is shown in dotted line, as also the raised position thereby imparted to the roller surface 417.

Fig. 43 shows a yarn 2, passing over surface 416 of drum 418 and under roller 417. This latter is mounted in arm 419 pivoted at 421 on a block 423 supported by insulation not shown. Arm 419 by its weight rests on the contact points 422, 420 which are carefully adjusted so that the unsized main portions of yarn 2, even the ordinary slubs that may occur, will not break contact 422, 420 but so that a "sized" point 2K in the yarn will interrupt this contact by lifting roller 417 a few thousandths of an inch. Shaft 11K is driven from the power shaft of the knitter, through a "basic" gear box like 30, Fig. 1, and a "basic" speed shaft like 38 with the desired speed increments or "gains" added thereto by any of the mechanisms described (see Figs. 1, 25, 30.) This shaft carries a driving head 387K, with an escapement pallet 385K to drive drum 418 through crown of teeth 389K. Pallet 385K is caused to escape drum 418 backward one tooth angle provided cam end 385K' of the armature of magnet 53K is in the path of the end of pallet 386K when the latter is passing. All this is exactly like the device of Figs. 37, 38, 39. Shaft 11K carries two timing interrupters 427 and 424. When 424 is in the position shown a circuit is about to be closed from positive pole of battery 428, through conductor 431, magnet coil 53K, conductor 432, conducting segment 425 and both brushes 430, conductor 433 to negative of battery. This will energize magnet 53K, which will thereafter be maintained energized by a locking circuit branching from conductor 432 through resistance 429, conductor 435, contact 420, 422, bar 419, conductor 437, back to negative battery. The speed and size of drum 418 is chosen so that it advances yarn 2 a very small amount faster than would cause successive "sized" points 2K of yarn 2 to open contact 420, 422 at the exact same phase of each revolution. If, next, a "sized" point in yarn 2 opens contact 420, 421 while brushes 434, 434 are both on conducting segment 426 of commutator 427, magnet 53K still receives locking current via brushes 434, conductor 435 and resistance 429. It will therefore stay energized for this revolution of shaft 11K and will interpose cam 385K in the path of 386K and cause drum 418 and yarn 2 to be escaped back or retarded by the amount of one tooth 389K. In so doing it causes the next "sized" point of yarn 2 to arrive a little later at a time when brushes 434 are no longer both on conducting segment 426. In this condition the locking circuit of 53K through resistance 429 is simultaneously opened at both places—at brushes 434 and at contacts 420, 422, and hence 53K is deenergized. It will receive locking current again very quickly through resistance 429, but it is so designed that it will not pull up on this weaker current. Cam 385K is therefore not in the path of 386K in this case, and the yarn is not retarded. The tendency of the yarn to feed a trifle fast, due to generous size of drum 418, will again advance a "sized" point of yarn 2 to open contacts 420, 422 while brushes 434, 434 are both still on conducting segment 426, and again magnet 53K will stay energized and will retard the yarn. The advantage of this particular arrangement lies in this: that by reason of high resistance 429 only very weak currents pass through contacts 420, 422—barely enough to hold the armature of 53K in energized position,—and thus these contacts are enabled to release magnet 53K on the very slightest opening. Also, because of the light pressure on contacts 420, 422, a heavy current would cause more contact trouble.

Analysis will show that this arrangement makes the yarn "self phasing", i. e. wherever the "sized" points at first fall in the cycle, the yarn will fail to be retarded (53K will fall) in every cycle until finally the "sized" points synchronize substantially with the closure of contacts 434, 434 by segment 426.

Analysis will also show that, if an occasional knot or slub occurs in yarn 2 big enough to break contact 420, 422, the very worst that it can do is to release magnet 53K when the latter should stay up and retard the yarn. This merely means that possibly two successive retardations may have to occur to bring the yarn back to proper timing.

It will, of course, be understood that this "sized" point or lump timing control for yarns may be used to replace the photocell control or the dielectric quality control in any of the types of machines illustrated above.

XI

Figs. 46 to 73 inclusive illustrate a very few of the simpler fabric patterns or effects that can be produced on knitting machines having yarn timing controls of this invention as hereinbefore described. The effects of Figs. 46 to 66 inclusive and of Figs. 72 and 73 require to produce them a machine of the Fig. 1 or Fig. 25 general type, i. e. having only one yarn feed, although all of these patterns except Figs. 72 and 73, can be produced equally well and faster on either a machine like that illustrated in Fig. 18 having several independent yarn feeds, or on one like that shown in Fig. 41 with several feeds but a common control. These patterns may also all be produced by the photocell control of the yarn by its color, by the control utilizing differences in dielectric quality as typified in Figs. 33, 34 or by the use of "sized" points or mechanical markers on the yarns with means of the general type described in relation to Fig. 43.

The patterns of Figs. 67, 70 and 71 require two independent yarn feeds, (see, for example Fig. 18). The patterns of Figs. 68 and 69 could be produced perfectly well by a single feed machine, or by one with independent feeds, but are shown particularly to illustrate certain kinds of effects to which the multi-feed single control type of Fig. 41 is particularly adapted.

Before describing these figures in detail the following color code and understanding used in them may be noted. In Fig. 46 a couple of "courses" or rows of successive loops of the simplest or "plain jersey" type of knitting are shown greatly enlarged. Polychrome yarn is shown, and the change of color of any individual yarn can be noted in this figure. In all the other figures that whole portion of one such horizontal row of loops that is of one color is symbolized by a single line whose length represents the length of the one colored part of the course, and whose character (dotted, solid, wavy, etc.) represents the color. The line characters and colors thereby represented are:

| Heavy full | =black |
| Light full | =white |
| Dotted | =orange |
| Broken or dash | =blue |
| Dash dot | =green |
| Dash double dot | =red |
| Wavy | =gray |

These symbolized colors will be used in describing the figures, referring e. g. to a "red" spot rather than to a "dash double dotted" stretch.

The assumption is further made that the upper courses are the older, i. e. that these patterns are built from the top down, and that the yarn of any given course is laid in from left to right.

Figure 47:

Figs. 47, 48, 49 and 50 are vertical stripes made with the same yarn, colored, in equal length spots, black, white, blue, white, green, white, orange, white, (i. e., eight spots), and repeat. In Fig. 47 the feed is such that a whole number of these repeats goes into a complete course, thus the black spots of each course come under the black ones of the course preceding, and vertical solid color stripes are formed as shown.

Figure 48:

In Fig. 48 the rate of yarn feed is slightly decreased—a negative "gain" from Fig. 47—so that the integral number of repeats per course is reduced by ⅛ of a repeat, or so that the yarn laid in per course is shorter by one spot length. The result is to bring the black spot of course 2 one length to the right of the black of course 1, etc., etc., so that each vertical stripe is found to be composed of all of the colors. This is a very good mixture or "heather." The vertical lines of separation points or color change points are quite visible in the drawings, but would be much less so in suit fabric.

Figure 49:

Fig. 49 is constructed of this same yarm with a still larger negative gain over Fig. 47, a two-spot negative gain. This means that, compared with Fig. 47, the length of yarn that is fed per course is shorter by the length of two spots. This brings every black under the blue, every blue under the green, every green under the orange, and also brings all the whites together, so that we have alternating stripes of white and of mixed black, orange, green, blue. In the drawing, the appearance is not so different from that of Fig. 47, but in the colored goods it is very different.

Figure 50:
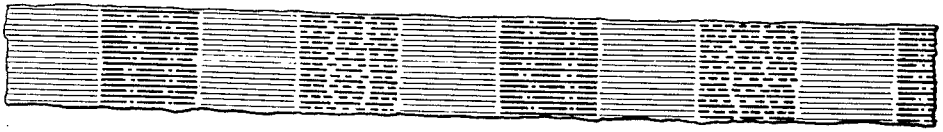

Fig. 50 shows what the result is of a four-spot negative, or of a four-spot positive gain. The "repeat" being eight spots long it is a matter of convenience, in going from Fig. 47 to Fig. 50 whether the feed of the yarn will be decreased or increased to get the result of a "half pattern" or a "four-spot" displacement. It will be seen that the black and the green are aligned, the blue and orange, and the white and white, thus giving alternating and different vertical stripes of color, one of black, green mixture, the other of a blue, orange mixture, with plain white stripes between these stripes of color. Figs. 50 and 49 do not look at all alike in the fabric.

Figure 51:
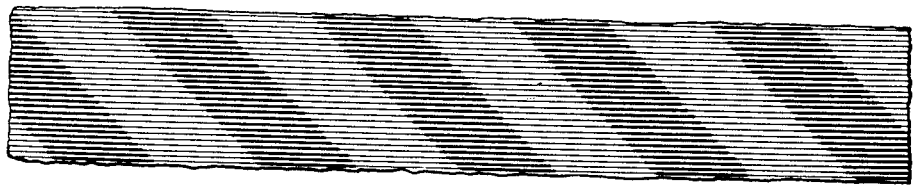

Fig. 51 using plain black and white spotted yarn is to illustrate the sloping effect of very slight changes in the rate of yarn feed. If the feed had been such as to place in one course an exactly integral number of pairs or "repeats" of black-white spots, there would have been black exactly under black and white exactly under white, just as at the left end of the Fig. 47 pattern. A negative gain, i. e., a decrease in the yarn fed per course, of the amount of one loop or stitch (11, Fig. 46), which in a 200-needle machine with one feed would be ½ of 1%, shifts the spots of each course laterally relative to the preceding an amount about equal to the height of each course, and produces a 45° slope of the stripes. In the Figs. 47 to 50 the increase or decrease of the feed rates used in each, by a mere ½ of 1% or so, would have imparted slopes in either direction to the plain or mixed color stripes described. Obviously, by means of the program device described, the designer may change about in one fabric, as frequently as he likes, between the plain color stripes of Fig. 47, the heather of Fig. 48, the white and four mixed color stripes of Fig. 49, and the white and two different mixture stripes of Fig. 50, and may at the same time without affecting the color mixtures change any or all of these colored stripes from vertical to right or to left hand slopes and back.

Fig. 52 illustrates the effect of alternatingly making the ½ of 1% gain of Fig. 51 positive and negative.

Fig. 53 still uses the same black and white yarn as Fig. 51 and applies a sudden positive gain, termed a shift because of its suddenness. This may be produced by magnet 199 in conjunction with magnet 208 (Figs. 1, 5 and 7). The stroke of magnet 199 is adjusted to make this shift equal exactly one spot length. The result is square checkers as shown when timed to make the stripes as long as they are wide between shifts. These one-spot shifts, or any half-spot or fractional spot shifts, or shifts of more than a spot, can be applied to the yarn of Figs. 47 to 50, producing checkers or stairs or broken stripes of any or of all those color mixtures. Other checkers or other discontinuity or "shift" patterns may also be sloped or zig-zagged.

Figs. 54 and 55, using a repeat of 4 equal spots of black, blue, green, orange, illustrate together the way in which a mixture or "heather" (which is really 4 contiguous vertical stripes all alike of all four colors mixed) may be treated to make the vertical alignment of the color change points less conspicuous. In Fig. 55 the pattern of Fig. 54 has been rather frequently zig-zagged. These zig-zags could be even finer and more irregular to good advantage, but the illustrative effect might suffer in that the lines would be hard to follow.

Figure 56:
Figure 57:
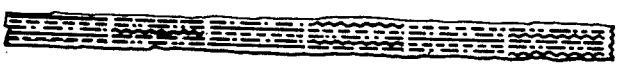

Figs. 56, 57 and 58 illustrate the color changes that a six-spot repeat allows. The repeat is black, blue, green, gray, orange, red. In Fig. 56, with integral repeats per course, there are these six colors in vertical stripes. In Fig. 57, applying a 2-spot negative gain to Fig. 56, we get two alternate stripes of black, orange, green mixed and of blue, red, gray mixed. In Fig. 58, by a three-spot gain we get three different stripes, respectively, of black and gray mixed, of blue and orange mixed, and of green and red mixed.

Figure 59:
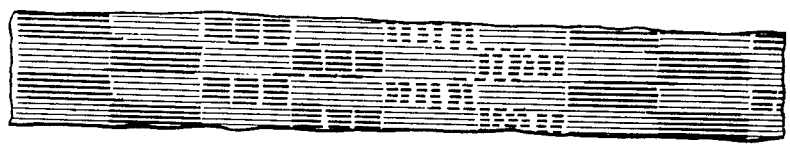
Figure 60:
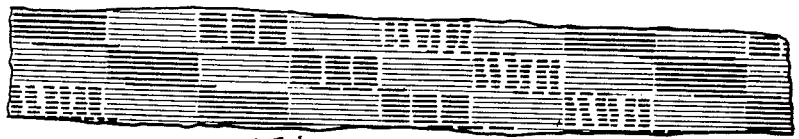

Figs. 59 and 60 illustrate the effect of shifts made without the special sudden shifting means (magnets 199 and 208) shown in Figs. 1, 5 and 7. It is perfectly possible to make checkers for example by speeding up or slowing down the feed drums 6 and 7 (or the equivalent yarn feeding element in one of the other structures) sufficiently to make the desired one spot gain in a single course, and by thereafter reverting to the original rate of feed. These figures show the result. Fig. 59 starts with the feeding of an integral number of repeats per course of a black, white, blue, white, orange, white yarn. This gives vertical solid color stripes or blocks. The feed rate is increased, at the beginning of the fifth course visible in the figure, to feed one spot less per course, i. e., a one-spot negative gain is applied. The fifth course in Fig. 59 shows this transition, exaggerated for better understanding. By a negative gain the yarn is caused to go a trifle further. The first black spot of this transition course is seen a little displaced to the right versus the black of the course before. The rate of increase of this displacement is shown very greatly exaggerated, as the blue spot creeps even more to the right, the orange more yet, and the second black has almost gotten completely under the white. In the sixth course the feed rate reverts to the original integral number of repeats per course, and vertical blacks result until in the tenth course a one spot gain, but a positive one, is again applied only for the one course. It will be seen that the yarn goes less far and that the spots creep back to where they were at the top of the figure. The result is checkers of several colors, each row of blocks of one color being zig-zag or staggered corner to corner.

In Fig. 60 all the shifts are by negative gains, and the same phenomenon of a course of "creep" between each set of checkers is seen. The shifts all being one way each row of blocks of one color is corner to corner in one diagonal. This pattern (and without the course of "creep") could be produced using the jump shift device 199 and the looper 208. The pattern of Fig. 59 could not be so produced.

Figure 61:
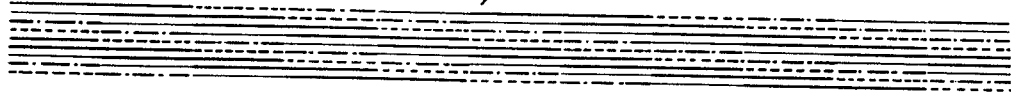
Figure 62:
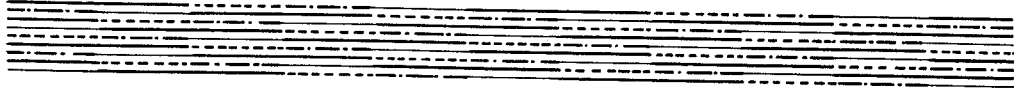
Figure 63:
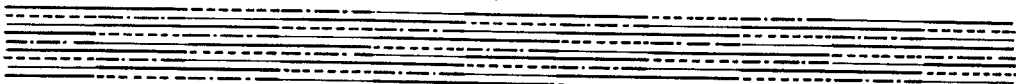
Figure 64:

Figs. 61 to 64 illustrate some of the effects producible with yarns having spots not all of the same length. Here the yarn pattern or repeat is a five unit one, having black for two units of length, orange, green and white for the other three. Fig. 61 shows a rate of feed one unit short of an integral number of repeats per course. This is a mixture cut by marked very flat black diagonal right-slanting stripes. In Fig. 62 the feed is two units short of integral, and the result is a mixture dominated by flat left slanting vague stripes of black with orange and green interlarded. In Fig. 63 the feed is 3 units short of integral or 2 units over integral, and this is substantially the converse of Fig. 62, a mixture dominated by flat right slanting vague stripes of black with orange green interlarded. In Fig. 64 the feed is 2½ units over or under integral, and produces a set of soft or vague vertical stripes as follows: a stripe one unit wide of black, green; a stripe one-half unit wide of black, white; another a half unit wide of orange, white; another a half unit wide of orange, black; then repeat. With proper choice of colors and lengths some very beautiful effects can be obtained with yarn spots not equal in length.

Figure 65:
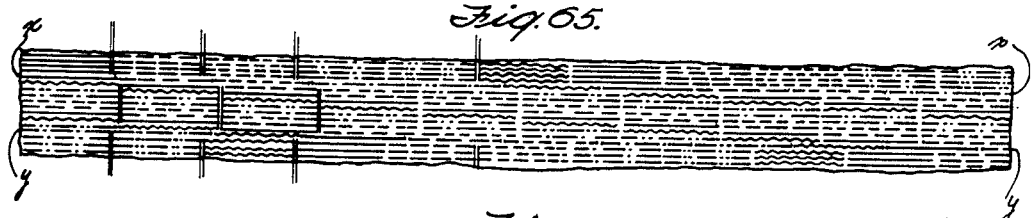
Figure 66:
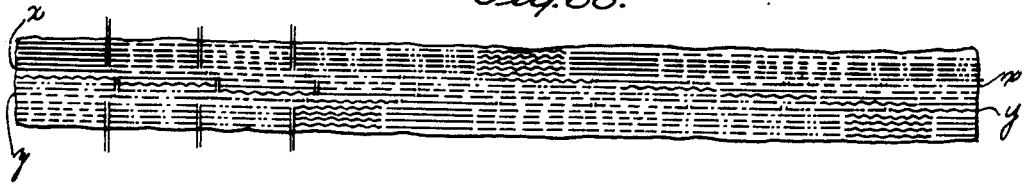

Figs. 65 and 66 using a six equal spot repeat of black, blue, orange, green, red, gray, are drawn to show the "creeping" relationship between an integral feed (solid color stripes), and an integral plus one spot feed (heather) and the further fact that the number of courses of "heather" laid before resuming the integral or solid color rate of feed determines how the new solid color stripes will be lined up to those laid before the "heather." In Fig. 65 an integral feed is held until course $x$, when a negative one-spot gain is applied. This course $x$ is the transition course, and the slow advance or creep of the spots to the right, past those of same color in the course above is noted. By the next course this creeping is completed and vertical stripes all alike of all six colors mixed are laid by a feed one spot less than integral. This is what we have called "heather", for the stripes are not visible as such, being a 1 alike. Attention is called to the fact that if these "heather" stripes were visible individually they would be found not to line up at all with the solid color stripes above course $x$. There are, above $x$, an integral number, say $n$, of repeats in each course, or $6n$ stripes. Below $x$ there are only $6n-1$ stripes. Hence the vernier or creeping relation brought out, on purpose, by the double vertical lines.

When, in the ninth course after course $x$, the integral feed rate is resumed, in course $y$, as shown, the spots begin to shorten or creep to the left relative to the "heather" stripes, and by the next course after $y$ the solid color integral feed rate is in full swing. The fact is to be particularly noted that—because it was just nine courses that were laid at a feed rate one spot less than integral,—the solid color stripes below heather band $x$ to $y$ have crept to the right relative to the solid color stripes above this band by just nine spots. Of course a shift of nine spots looks and is identical, in the case of a 6-spot repeat, with a shift of $9-6=3$ spots. In Fig. 66 the same points are to be noted, namely, the right hand creep as the spots are stretched out by the one spot slower feed applied in course $x$, the vernier relation of the "heather" stripes to the solid stripes above, the return or left-hand creep in course $y$ as the faster feed is resumed, and the fact that four courses of this one-spot-less-than-integral feed shifted the new solid stripes four spots to the right (or two spots to the left) relative to the solid stripes above course $x$.

Fig. 67 is laid with two yarns with independent feeds, a black white yarn of equal spots, and a blue white ditto. The feed of the former is a very minute amount faster than will lay integral repeats per course. The feed of the latter is an equal amount slower. The result is two interrelated systems of stripes, a left sloping set of black white and a right sloping set of blue white stripes. This gives four different colored lozenges—black, white—white, black, blue—and blue, white.

Fig. 70 (postponing Figs. 68 and 69 for a moment), illustrates the interweaving, such as can be produced in a machine of the Fig. 18 type, of two patterns. The first is laid with a 3-spot red, gray, black repeat, in checkers or blocks formed by a half spot negative shift every six courses. The second is laid with a 3-spot blue green orange repeat, in blocks formed by a half spot positive shift every six courses. The two feeds are relatively so timed that the color change points of both yarns coincide about their courses. The result, as the figure shows clearly, is a pattern showing a series of layers of blocks, each block 12 courses of yarn high and one spot wide, the blocks in each layer being staggered to those above and below. The colors of these blocks are 3×3=9. In one layer are: red, green;—orange, gray;—blue, black. In the next are:—red, orange;—blue, gray;—black, green. In the next are:—red, blue;—gray, green;—orange, black.

Fig. 71 pattern is laid with two interlarded yarns as follows: first a 3-spot—red, gray, black—repeat, fed integrally for 6 courses, then given a one spot negative shift; second, a 3-spot—blue, green, orange—repeat, fed integrally plus a positive sloping increment such that the stripe edges intersect the block corners of the first yarn. The result is a series of triangles, shown best in the diagram of Fig. 71a. There are of course 9 mixed colors since there are three colors in each feed. These three examples give only a feeble idea of the almost infinite number of patterns of mixed colors and interesting geometric shapes that can be obtained with two independently controlled feeds of different yarns.

Fig. 68 shows a result obtained in the Fig. 41 machine using a 4-end yarn from one supply and one feed. The yarn is a black, white, orange, white repeat. It is laid with integral feed, i. e., an integral number of repeats per course. But, by means of the adjustments between the four yarns that are possible in this machine, the second end is slightly negatively shifted (a little loop held out) relative to the first, the third is negatively shifted twice as much as the second, and the fourth three times as much. The fifth course is laid by the same yarn as the first. The sixth by the same as the second, etc.

Fig. 69 shows the result of laying the same yarn on the same Fig. 41 type machne, with a feed one spot short of integral, and with the yarn ends displaced thus: The guide 399 (Fig. 41) has been set to stop 401 which is so adjusted that it retards or negatively shifts the yarn of the first course or course Z by ¾ of a spot (i. e., a loop equal to ¾ of the length of a yarn spot is held out by 399). The yarn of the next course under Z is similarly negatively shifted, but only ½ spot, by its adjustable guides. The third course is shifted only ¼ spot. The fourth course not at all. The feed of one spot under integral brings the blocks corner to corner as shown.

Figs. 72 and 73 show a representation of a flower, in green and red, with a vertical stripe of red, on a background of a third color, which can be produced on the machine of Fig. 1 or on the modifications of Fig. 1 shown in Fig. 25 or Fig. 30.

All of the fabric patterns so far described have been produced with yarn having what I have termed short patterns or short repeats. The flower of Fig. 72, clearly, requires a yarn colored in each course at different points and for different lengths. This yarn pattern will not be completed and will not exactly repeat itself after a fraction of a course, as do all the 2, 3, 4, 6 and 8 spot patterns above considered, but only after enough courses have been laid to complete the figure of the flower. Hence I have above termed yarns of this character "long pattern" yarns. The vertical stripe 450 shown is very convenient as providing a regularly recurring spot on the yarn, by which the photocells 5 or the condenser device of Figs. 33, 34 can determine its earliness or lateness and cause magnet 53 to make correction. If this stripe is not wanted, however, the yarn at these same recurring points may be touched during printing of the long pattern with a droplet of "size", as generally described above in reference to Fig. 43, and the Fig. 43 control unit and hook-up may replace in Fig. 1 machine the photocell unit 5 and its (Fig. 12) circuit. As will easily be seen, in the laying of a "long pattern" yarn there will be no need for any feed changing means, nor for program means to govern such. A vastly simplified mechanism might be used, consisting substantially of the remaining parts of Fig. 1 with everything to the right of line 5—5 removed, and with the whole program device 132 and its drive removed. Neither shaft 22f, nor any element to the right of it in Fig. 1, nor the commutator 57 will ever turn in this long pattern use of the machine. Gear box 30 need only be set to lay in each course a predetermined and integral number of times, that unit length of yarn, (that greatest common divisor of the long pattern), the yarn length that will properly knit up between two figures or two stripes such as 450—1 and 450—2. For brevity let me call this length a "long pattern unit." Its existence as a submultiple length of the long pattern is just as real if stripes 450—1, 450—2, etc., are left out of the design. The length of this "long pattern unit" determines the frequency with which the yarn timing is corrected. If, therefore, the figures are very large, and unless "sized" points are used, and used right through the body of the figures, as may be done, the yarn timing correction is less frequent and the outline of the figure is likely to be more irregular or dentelated. But there can, even then, be no cumulative error causing general distortion.

In Figs. 72 and 73 the "long pattern units" in any one course, e. g., in that course represented by broken line QQ', are all alike. The long pattern might be complete when line RR' is reached; but it will be seen that it is very easy, in the printing mechanism whereby yarns are colored in any "long pattern", to reverse the whole pattern without additional mechanism, and this gives cheaply the added variety of mirror or reversed views in the fabric. Hence, in the example shown, the long pattern yarn is a piece long enough to knit all the course around the machine from course SS' to TT'. In case of breakage of a long pattern yarn the operator must either patch in a piece of properly colored yarn with two knots so as to bring the spacing between the control points (color spots for stripes, "sized" points or other members) to exactly what it was before the break, or must tie out one complete course. This latter is easier, and it will frequently cause insufficient distortion of the figure to be serious. The effect will be that of dropping out a thin slice of the figure such as that included between line QQ' and line UU'.

Fig. 74 will be described in the course of describing the "long pattern" yarn coloring means required to produce the effects of Figs. 72, 73.

XII

Figs. 74 to 81 illustrate a means for controllably coloring the long pattern polychrome yarns, used to produce such figures in fabrics as are illustratively described in connection with Figs. 72, 73. The machine illustrated is capable of applying two colors to yarns having any relatively light base color, and of independently applying each of these two colors, beginning at any point of the yarn and continuing for any desired extent. It also is arranged to apply, at regular intervals, and if desired, a very small amount of a hardening liquid or "size" to the yarns. It handles and applies color and size alike to a considerable belt or warp of yarns at one time.

In Fig. 77, 451, 451 are the yarns to be colored. These may come from a "creel" i. e., each from a separate one of many supplies mounted on a frame—which is the implication of the converging yarns as shown—or they may previously have been made into a warp, i. e., rolled side by side on a warp beam, from which they can be drawn to run side by side through this machine. They first pass under bottom line guide roller 452, then they run vertically to the top of the machine and back down over top guide 453, over idling guide roll 494, over traction drum 454 and its presser roll 455 when they go to individual reeling or packaging machinery—such as skein reels or individual friction driven cone winders—forming no part of this invention. The machine is very high and the yarns 451 closely set side by side form a flat band of great height. Rollers 452, 453 and 494 are grooved, with a fine groove for each yarn of the band.

In the section view of Fig. 77 these grooves are visible, 456, 457, 495, as concentric circles representing the roll diameters at top and bottom of the grooves. Smooth rolls with yarn guiding and spacing reeds or combs could have been used in place of these grooved rolls. The necessity is merely with a minimum of drag to hold the band of yarns so evenly and closely spaced that, though they may touch, they never pile up. The lower smaller diameter roll is power driven to relieve the tension on the band of yarn.

The lower part of the height of the machine, within the frame plates 458, 458, devoted to the color and size applying means and to the yarn moving means that must accurately cooperate therewith. The upper part of the machine, constituting the greater part of its height, consists merely of a drying tower 459, shown broken in the drawings through which a counterflow of dry and heated air is forced by a blower through pipe 461, to escape through exhaust pipe 460. The lower end of drying tower 459 is closed by a bottom plate, of which the central section 464 pivots to vertical position for easier feeding through the band of yarns when starting, so as to leave normally only entrance slots 462, 462 for the band of yarn to enter by and leave by. There is, at the very top, convenient to top guide roll 453, a door plate 463, the top only being shown. This is a provision for stringing up the machine. An adjacent catwalk or platform must be provided in the building for the operator working through this door. The features of this countercurrent hot air drying tower form in themselves no part of this invention. Any other well known quick drying means, e. g., by steam coils and fans, may be substituted that permits the yarns to move vertically past the sets of coloring means to be described and that reduces as far as possible the (stretchable) length of yarn between traction drum 454 and guide roll 452. Just above lower guide roll 452 is an anvil color roll 465 driven by gearing in the direction shown by the arrow at a surface speed equal to the speed of vertical movement of the yarn band. This anvil roll 465 is placed so that the band of yarn will not rub on it, but otherwise as close as possible to the band. Opposite is a swinging color roll 473, carried by two end frames 468 and 474 on shaft 466. This color roll 473 is in constant rolling contact on the color drum 467. Both the latter and 473 have the same surface speed as the yarn band. As is best seen in Figs. 75 and 76, roll 473 carries a gear 475 at one end that meshes with gear 476 which connects to drum 467 by a sleeve 477. Power is applied to the machine by shaft 478, through gear box 479, shaft 480 and driving gear 481, which meshes with gear 476. In the detailed view of the arrangement of gearing, Fig. 76, it will be seen that driver 481 also meshes with a gear $476^1$ attached by a sleeve $477^1$ to a second color drum $467_1$. All the before mentioned parts are duplicated, with prime numerals, in this upper color set. There is this difference: in the lower set gear 476, attached to drum 467, drives live guide roll 452 by means of an idler gear 482 and of gear 483 on the shaft of 452. Through this gear 483 and idler 484 and gear 485 on the shaft of anvil roll 465 the latter is also driven. In the upper color set gear 476', attached to drum 467', has no guide roll 452 to drive, but instead drives traction roll 454 with its presser roll 455 (geared to it by 486, Fig. 76) by gear 487. This it does through idlers 488, 489. Idler 489 also meshes with another idler 490 and drives upper anvil color roll 465' by its gear 485'.

It is to be understood that, were a third or a fourth color set desired, this same construction would be duplicated with those obvious alterations in gearing resulting from the fact that there would be neither guide roll 452 nor traction roll 454 to be driven from such a third or fourth set.

Color drum 467 revolves with the lower part in a color bath 491 kept filled high enough so that drum 467 always is wet with the color. Monel metal or any metal suitable to resist the dyestuff, may be used for the bath 491, the drum 467 and the metal parts of color rolls 473 and 465. Color rolls 473, 465, are mere metal rolls 493, 493 covered with muslin or thin absorbent fabric 492 spirally tightly rolled on, as shown in Fig. 78, until the correct size and a hard but absorbent structure is attained. As they wear they may be built up and the surface renewed by unwrapping a layer or two, inserting under the end a new piece of muslin and rolling it on until the size and texture are as desired. The direction of muslin wrapping is of course such that the constant rolling over drum 467 in the case of roller 473 and the very frequent rolling contact with 473 in the case of roller 465, will tend to tighten, not loosen, the wrapping. If these color rolls are allowed to get really dry, the wrapping may need renewing. If, therefore, the vehicle of the color is one that dries quickly and is not easily resoftened, these rolls must be withdrawn at night, or when the machine stops for a time, and kept in a tight receptacle. Otherwise, and if the color used in the bath is not changed, a wrapped roll will last a very long time. If runs are short and colors are frequently changed, a considerable number of these rolls, one for each common color, will be provided to avoid rewrapping for each new color.

Swinging roll 473 is pivoted in the end frames 468 and 474 fast to torsion shaft 466. Frame 468 has a lower arm to which is povotally fastened the plunger 472 of a solenoid 471. The energization of this solenoid revolves together and frame 468, shaft 466 and end frame 474, with color roll 473 so that the latter bears against anvil color roll 465. The band of yarns runs pinched between these two hard but resilient and very absorbent color-saturated surfaces, and is very fully impregnated with the color as long as it so runs. It is to be noted that these rolls will have very exactly the same surface speed as the yarn so that the yarn will neither build up slack above them (as it would if they were fast), nor build up tension above them (as it will if they are slow). To attain and maintain this result the operator may wrap rolls 465 and 473 a little oversize, run them together (solenoid 471 energized) and some time without color, and then with color, until quite thoroughly hardened, and then adjust each to size by removing a little of the wrapping, checking for slack or tension by trial on one or two strands of very weak yarn.

Spring 469 instantly returns, swinging color roll 473 upward when the solenoid is deenergized. This spring must be strong enough, not only to hold up the heavy roll in the position of rest shown, with the arm of 468 to which it is attached against stop 470, but must hold it there and raise it thither quickly against the quite large rolling resistance of 473 pressed against the sticky and color coated surface of drum 467.

The upper color set operates in identical manner—merely at different times and at different places on the yarn as determined by its solenoid 471' under the control of a pattern device to be described.

Size bath 496 is provided with a capillary applicator consisting of two curved plates 497, 498 as wide as the band of yarn. These plates are so shaped to each other and then spaced apart by occasional very thin separators (not shown) that a capilary space is left between them. One edge dips in the size bath. The other edge is held close to but not touching the yarns. The capillary space is drawn full of the liquid size and the arrangement amounts to a fountain pen or sign lettering pen as wide as the roll 499. The latter just like the other fabric wrapped rolls, except that it is not power driven, and must therefore be very freely journaled, is carried in vertical end frames 500, 501 keyed on shaft 502 on which is also keyed horizontal arm 503. Plunger 504 of solenoid 505 is pivotally attached to arm 503. Spring 506 holds frame 500 in normal position against stop 507 so that roll 499 just fails to rub on the yarns. If solenoid 505 is energized it causes roll 499 to strike the whole band of yarns against the mouth of the size filled capillary space between plates 497 and 498. The roll and the yarn are soft enough so that each yarn enters this crevice far enough to contact on the liquid film of size and to withdraw a droplet. Solenoid 505 never is energized for any duration, it merely strikes periodical blows if required, to make those spaced "sized" points on the yarn discussed above. The commutator 508, carried on hub 511, relative to which it is angularly adjustable by screw 510 in an arcuate slot, operates solenoid 505 by brushes 509 very symbolically shown. In Fig. 74 is shown the circuit. If the size applicator is to be used, switch 512 is closed, after commutator 508 has been angularly adjusted by screw 510 to act at the desired point in the yarn pattern. A circuit is then closed by conducting segment 513 from positive pole of battery 514, through solenoid 505, switch 512, brushes 509 and segment 513, back to the other pole of battery. It will be noted that the time is very brief when brushes 509 are both in contact on 513. With the arrangement shown only one "sized" point can be made per revolution of shaft 478, which for most cases will be right. If more frequent sized points are required a two or three segment commutator can be substituted for the one shown.

Figs. 79, 80 and 81 show the stencil pattern device that controls the yarn color applying solenoid 471. An exact duplicate, but with the stencil differently cut is used to operate solenoid 471'. This device comprises a hollow drum 515 with a longitudinal channel 516, in which the ends of a perforated stencil sheet 517, stretched about the drum, may be fastened by the stiff hardwood or Bakelite or otherwise insulated wedge strip 518, drawn in by screws 519 at the two ends. The heads or ends of drum 515 are keyed on shaft 478, which is also the drive shaft of that part of the machine shown in Fig. 75. This shaft may be driven by a belt and pulley, chain or gear from a source of power such as a motor, not shown. This power application to shaft 478, e. g., pulley on it, is preferably at a point between gear box 479 and the stencil device being described. Shaft 478 bearing drum 515 is journaled at both ends of 515 in cast frame 520. This frame has at each end a forward extending arm 521 in which is journaled traversing screw 522 of the double thread type. Traverse nut 523, having the usual rocking follower blade to be able to follow both the right and left threads of screw 522, rides back and forth on the latter, being guided by rod 524 also supported between the two arms 521, 521. In this traverse nut is socketed, in an insulating shell, the round-pointed bronze or other good conducting metal contact stylus 525. This is lightly spring-pressed by 527 toward the surface of drum 515. An electrical connection is brought, through a flexible cable 526 and spring 527, to stylus 525. On shaft 478 at one end of frame 520 is a notched cam 528 which cam roll 529 follows. Pawl bar 530, carrying cam roll 529 and pulled inwardly by spring 532, is reciprocated by the notch of cam 528. It makes one reciprocation, when the notch of cam 528 passes roll 529, for every revolution of drum 515. Pawl 531 therefore turns ratchet 532 one tooth for each revolution of drum 515. Ratchet 532 is an idler. It has one tooth, 533, cut extra deep. When it has been stopped around until this deep tooth 533 comes under the point of pawl 531, the latter falls sufficiently deep to engage a tooth of ratchet 534 having an equal number of teeth with 532, but being of smaller diameter. Ratchet 534 drives stub shaft 536, journaled in boss 538 of arm 521. Gear wheel 535, pinned on shaft 536, is therefore turned. 535 meshes with pinion 537 which drives traversing screw 522. It will thus be clear that after nut 523 and stylus 525 have just come to any one of the many traverse positions they may take, drum 515 will make a number of revolutions determined by the number of teeth of ratchet 532 before nut 523 and the stylus will be moved to the next traverse position.

During each revolution of drum 515, covered by stencil 517, stylus 525 will make contact on the drum through any openings in the stencil. Stencil 571 shown is laid out for the red portions of the flower represented in Fig. 72. Since there is in Fig. 72 a red stripe 450, which means that in each "long pattern unit" length the yarn must be colered red for a short bit, there are cut short slots 539, 539 for every traverse position the stylus may assume. The area of the stencil pattern sheet 517 which corresponds to the red petal portion of the flower is also slotted, in varying length slots, 540, 541, 542, etc., in accordance with the outline.

The number of traverse positions of stylus 525, i. e., the number of possible slots side by side in sheet 517, is equal to the number of yarn courses planned in going from the top to the bottom of Figure 72, or (same thing) half the number of courses between course SS' and course TT' of Fig. 73. Thus the fineness of the traverse steps and the length of traverse screw 522 determine the height of the representation to be built, measuring this height in number of courses. As different heights of figure or representation are to be produced, gears 535, 537 must be changed to make the number of traverse steps agree with the number of knit courses needed. And the stencil sheet slots must be spaced, of course, to agree with this number.

To vary the width of the representation, e. g., the dimension from one red stripe to the other in Fig. 73, which also usually means to vary that length of yarn that I have called the "long pattern unit", one merely has to change the gear ratios in gear box 479 to such ratios as will feed vertically exactly the desired long pattern unit of yarn in the time that drum 515 or shaft 478 makes one revolution.

Coupled to the stencil pattern unit or drum just described, by coupling 543, is another 515' suggested in dot-dash lines in Fig. 79, exactly like the first, except that only the green areas of the flower pattern laid out on this second stencil would be slotted. The angular relation, fixed at coupling 543, between the "red" stencil drum and the "green" stencil drum, is such that the latter lags behind the former by an amount representing, at the particular gear ratios chosen for box 479, a yarn travel equal to the height from anvil color roller 465 to anvil color roller 465'. It will be seen that whenever the gears in box 479 are changed, e. g., as the long pattern unit is differently chosen, or as the yarn weight or the knitter stitch, and hence yarn length used per inch of course is altered, a concordant change is required in the angular relationship of the two stencil drums. To clarify by an example: If the height between anvil rolls 465 and 465' is 20% of the long pattern unit (20%, otherwise stated, of the yarn travel that the gears in 479 will cause in one revolution of shaft 478), then the angular lag of drum 515' behind 515 must be 20% of 360° or 72°. It must be possible to make this angular adjustment easily and very closely, for on it depends the registry of the red and green, e. g., lengths of the yarn pattern. Points such as 544, (see Figs. 72 and 79) where a green stretch of yarn suddenly turns red, may either show (a) green (the later color applied) overlapping on the red, or (b) a slight gap. Both effects are bad. (b) looks bad if the gap is at all large. (a) mixes the colors on the rolls. A very slight gap between consecutive and theroretically contiguous colors is better than an overlap.

Coupling 543 is of special construction in order to make good adjustment of color registry possible. One part, 545, fast to shaft 478, comprises a worm gear 547. The main part 543, fast to shaft 546, comprises a housing for this worm gear and a bearing for it, and is tangentially bored to receive a worm 548 with a square end. 548 engages worm wheel 547, angularly locking the two parts of the coupling. The worm 548 may be held from turning by any well known means such as an extended threaded portion and a lock nut on the end opposite that shown. A very accurate color registry is obtained by rotation of worm 548.

Fig. 74 shows stylus 525 bearing on stencil 517, and ready, at the very first opening presented to it in the stencil, such as the "red" area slots 539, 540, etc., to close the following circuit: From plus pole of battery 514, through wire 549, solenoid 471, conductor 550 (and a part of which is flexible cable 526), through stylus 525, drum 515, shaft 478 grounded on frame 520, back to grounded negative side of battery 514. This operates 471 and presses swinging color roller 473 against anvil roller 465. Both being charged with red color, that length of all the yarns is dyed red that passes anvil roller 465 while stylus 525 finds any opening in "red" stencil 517.

The lag of "green" stencil 517' and drum 515' behind 517 and 515 is shown.

While I have illustrated and described several textile fabrics as well as methods and means for producing the same, it will be obvious to those skilled in the art that the articles, methods and machines herein disclosed may be modified without departing from the spirit of the invention as defined in the claims. It will be obvious, for instance, that some of the features of the present invention are applicable to other textile machines than knitting machines and to knitting machines of other specific designs than the one herein disclosed. It will be obvious also that the controlling means and methods are subject to varied modifications and embodiments and that the ones disclosed, while novel and useful in attaining the objects of the invention, may also be modified.

What I claim is:

1. The method of producing knitted fabrics of polychrome yarn having recurrent color patterns which comprises, feeding yarn to the machine, measuring off a predetermined number of color patterns per course of the machine, and checking the number of color patterns fed to the machine at least once every course, whereby errors that may occur in the yarn feed will not be permitted to accumulate.

2. The method of producing fabrics ornamented in planned effects of several colors comprising; producing a yarn having repeated linear patterns of color, feeding the yarn into a fabric, checking the position of the linear color patterns in relation to the fabric on a planned schedule at frequent intervals at a point passed by the yarn moving to the fabric, and controlling the rate of feed of the yarn in accordance with each checking.

3. The method of producing color ornamented fabrics comprising; producing a yarn dyed in a planned sequence of differently colored lengths, starting to build a fabric with the yarn, determining at frequent predetermined instants the phase of particular colored lengths of the yarn, and varying the rate of feed of the yarn to correct for aberrations of the colored yarn lengths from the predetermined phase as required for the planned ornamentation of the fabric.

4. The method of producing fabrics ornamented in several colors comprising; producing a yarn having linear patterns of color, starting to feed the yarn into a fabric, at a control point passed by the yarn on its way to the fabric checking on a predetermined time schedule of instants the relative rate of feed of the yarn to the fabric in terms of linear patterns, and correcting the rate of feed of the patterns towards the fabric according to the time schedule.

5. In combination, a fabric forming machine, means for feeding to said machine yarn having markers at predetermined intervals, a device responsive to said markers along the path of the yarn towards said machine, and means controlled by said device for controlling the operation of said means for feeding.

6. In combination, a knitting machine, means for feeding to said machine yarn having long color patterns and having markers at predetermined intervals bearing a predetermined relation to said patterns, a device responsive to said markers along the path of the yarn towards said machine, and means controlled by said device for varying the operation of said means for feeding, whereby the color patterns in the knit fabric bear a predeterminedly fixed relation to one another.

7. In combination, a knitting machine, means for feeding polychrome yarn to said machine at a predetermined rate, to photoelectric cells responsive to waves radiated from said yarn, controlling means including an electronic discharge device for varying the operation of said means for feeding, and a differential balanced bridge including said cells for operating said discharge device.

8. The combination according to claim 7 and in which a timing device related to the speed of the knitting machine cooperates with said controlling means.

9. In combination, a knitting machine, means for feeding polychrome yarn to said machine at a predetermined rate, two photoelectric cells responsive to waves radiated by the yarn, means including an electronic discharge device having a cathode, an anode and a grid for varying the operation of said means for feeding, connections between an electrode of each of said cells and the cathode and grid of said device, respectively, a resistance bridged across said connections, and a connection from the midpoint of said resistance to the other electrodes of said cells.

10. The combination according to claim 9 in which the power shaft of the knitting machine operates a timer having contacts in the last mentioned connection leading to the other electrodes of said cells.

11. The combination according to claim 9 and in which the power shaft of the knitting machine operates a timer having contacts in the last mentioned connection, a magnet cooperating in the control of the means for varying the operation of the feeding means, and a circuit for said magnet jointly controlled by said electronic discharge device and said timer.

12. In combination, a fabric forming machine, means for feeding yarn to said machine, said yarn having predetermined portions thereof hardened, contacts for varying the operation of said means for feeding, and a roller pressing against the yarn for controlling said contacts.

13. In combination, a knitting machine, means for feeding yarn to said machine at a predetermined rate, said yarn having predetermined portions thereof hardened, contacts for varying the operation of said means for feeding, and a roller pressing against the yarn for controlling said contacts.

14. In combination, a knitting machine, means for feeding yarn to said machine at a predetermined rate, said yarn having predetermined portions thereof hardened, contacts for varying the operation of said means for feeding, and means controlled by said hardened portions of yarn for controlling said contacts.

15. In combination, a knitting machine, means for feeding yarn to said machine at a predetermined rate, said yarn having predetermined portions thereof hardened, contacts for varying the operation of said means for feeding, and a roller bearing against the yarn at a pressure to flatten other than hardened portions thereof and raised by said hardened portions, and a lever controlled by said roller to actuate said contacts in its raised position.

16. In combination, a knitting machine comprising means for feeding polychrome yarn thereto, means operated at a predetermined ratio of the speed of the machine for varying in a predetermined manner the number of yarn patterns fed to the machine during each course, a photoelectric cell responsive to waves radiated by said yarn, and means controlled by said photoelectric cell for regulating the operation of said means for feeding.

17. In combination, a knitting machine comprising means for feeding polychrome yarn thereto, means controlled by the power shaft of the machine for varying in a predetermined manner the number of yarn patterns fed to the machine during each course, a photoelectric cell responsive to waves radiated by said yarn, and means controlled by said photoelectric cell for retarding the operation of said means for feeding.

18. In combination, a knitting machine comprising means for feeding polychrome yarn thereto, means controlled by the power shaft of the machine for varying in a predetermined manner the number of yarn patterns fed to the machine during each course, a photoelectric cell responsive to waves radiated by said yarn, and means controlled by said photoelectric cell for accelerating the operation of said means for feeding.

19. In combination, a knitting machine, a timer operated at a predetermined variable rate in relation to the cycles of the machine, a program controller controlling the timer to its variable rate, means for feeding polychrome yarn to the machine at rate to supply a number of color patterns per course, and means including said timer and a device responsive to certain characteristics of the yarn to vary the number of color patterns fed per course.

20. The combination according to claim 19 and in which the program controller is operated at a predetermined speed with respect to the machine, a photoelectric cell forming part of said means responsive to yarn characteristics, and electromagnetic means controlling the yarn feed jointly controlled by said cell and timer.

21. The combination according to claim 19, and in which said means for feeding supplies several strands of polychrome yarn in color phase from one package to several points of the machine past said device responsive to characteristics.

22. In combination, a knitting machine having a power shaft, a photoelectric cell responsive to waves radiated by the yarn, means including a second shaft for feeding polychrome yarn to said machine past said photoelectric cell, a program controller for said second shaft, a coupling between said power and second shafts, means for operating said program controller from the power shaft, a timing device operated by the power shaft at a predetermined rate, a second coupling between said power and second shafts, and means jointly controlled by said timing device and said photoelectric cell for actuating said second coupling.

23. In combination, a knitting machine, a photoelectric cell responsive to means radiated by the yarn, means for feeding polychrome yarn to said machine past said photoelectric cell, a controller for said means for feeding including a web perforated in accordance with a predetermined pattern, terminals on one side of said web, contacts cooperating with said terminals on the other side of said web, means controlled by the power shaft of said machine for periodically moving said web and actuating said contacts to engage said web, a plurality of electromagnets for controlling the positions of lengths of yarn in successive courses, circuits for said magnets including said contacts and terminals, a magnet for controlling the rate of yarn feed to said machine, a timing device operated by the power shaft of said machine at a predetermined rate, and means jointly controlled by said timing device and said photoelectric cell for operating said last mentioned magnet.

24. In combination, a knitting machine, means responsive to characteristics of the yarn, means for feeding yarn to said machine past said means responsive, a controller for said means for feeding operable in accordance with a predetermined pattern, means controlled by the power shaft of said machine for periodically operating said controller, means operated by said controller for determining the positions of lengths of yarn in successive courses, means for controlling the rate of yarn feed to said machine, a timing device operated by said machine at a predetermined rate, and means jointly controlled by said timing device and said means responsive for operating said last mentioned means for controlling.

25. In combination, a knitting machine having a power shaft, a photoelectric cell responsive to waves radiated by the yarn, means including a second shaft for feeding polychrome yarn to said machine past said photoelectric cell, a controller for said means for feeding including a web perforated in accordance with a predetermined pattern, terminals on one side of said web, contacts cooperating with said terminals on the other side of said web, means controlled by the power shaft of said machine for periodically moving said web and actuating said contacts to engage said web, a third and a fourth shaft, each driven by said power shaft at a predetermined rate, coupling means between said third and second and between said fourth and second shafts, a magnet controlling each coupling means circuits for said magnets including said contacts and terminals, a fifth shaft driven by said power shaft at a predetermined rate, coupling means between said fifth and second shafts, a magnet for controlling the last mentioned coupling means, a timing device operated by the power shaft at a predetermined rate, and means jointly controlled by said timing device and said photoelectric cell for operating said last mentioned magnet.

26. In combination, a knitting machine having a power shaft, a photoelectric cell responsive to waves radiated by the yarn, means including a second shaft for feeding polychrome yarn to said machine past said photoelectric cell, a differential transmission between said power shaft and said second shaft, a controller for said means for feeding including a web marked in accordance with a predetermined pattern, contacts cooperating with said web, means controlled by the power shaft of said machine for periodically moving said web, a third and a fourth shaft driven by said power shaft at a predetermined rate, differential couplings between said third and second and between said fourth and second shafts, magnetic clutches for said third and fourth shafts, circuits for said clutches including said contacts, a fifth shaft driven by said power shaft at a predetermined rate, a differential coupling between the fifth and second shafts, an electromagnetic clutch for the fifth shaft, a timing device operated by the power shaft at a predetermined rate, and means jointly controlled by said timing device and said photoelectric cell for operating said last mentioned clutch of the fifth shaft.

27. In combination, a knitting machine having a power shaft, means for feeding polychrome yarn to said machine controlled by said power shaft, a timing device operated at a predetermined rate by said power shaft, a photoelectric cell responsive to waves radiated by the yarn as it is fed to the machine, means jointly controlled by said timing means and said photoelectric cell for checking and correcting the feeding of said yarn in accordance with a predetermined pattern, means for slightly varying over a desired range the rate of feed of said yarn to the machine and for controlling the yarn feed to relate to colors of one course variably and at will to the colors of previously knit courses, means for producing fabric pattern discontinuities by suddenly advancing the yarn feed, means operative thereupon to remove the excess, means for superimposing on the feed rate a set of cyclic feed variations in accordance with a predetermined pattern, and means including a program device for automatically bringing into play any one of said means in a predetermined sequence.

28. In a textile machine, a cyclic feeder of yarn having varying characteristics, a yarn governor system comprising a feed governor, a timer, a detector of yarn characteristics, means for changing the speed of said feed governor, a feed varying system comprising a speed changing system and a program device, said program device having indicia representing the fabric pattern, and means controlled by said indicia for variably operating said governor system.

29. In a textile machine, a cyclically operated device to guide yarn having repeated linear patterns of dissimilar portions into a fabric; a yarn governor system to control the rate measured in linear patterns at which the yarn is fed to said device, comprising a feeding governor to control the yardage rate of supply of yarn to said cyclically operated device, a time marker in said governor system to mark off relative to the cycles of said device planned cycles of times for checking the positions of chosen points in the yarns' linear patterns, a yarn change detector in said governor system actuated by certain sections of the yarn as it moves toward said device, a speed correction device in said governor system operated by said detector, means controlled by said speed correction device to actuate said feeding governor to change the yardage rate of the yarn supply so that this rate when measured in patterns of yarn agrees with the frequency of said time marker's cycles of times, whereby the frequency of yarn patterns is controlled exactly to the frequency of said time markers' cycles; a yarn feed varying system comprising a speed changing system to alter the phase and frequency of said time marker's cycles relative to the cycles of said cyclically operated device and cooperating with said yarn governor system to alter correspondingly the rate of yarn supply measured in patterns, a program device including a program record carrying predetermined indicia representing a fabric pattern, means controlled by said indicia for variably operating said speed changing system, means for operating said program record in speed relation to said cyclically operated device to render said indicia successively effective in determining the sequence of operations in said speed changing system, whereby said yarn governor system and said yarn feed varying system cooperate to vary designedly the incidence of yarn patterns relative to the cycles of said cyclically operated device and thus to vary designedly fabric pattern by the designed juxtaposition of yarn patterns in successive elements of the fabric.

30. In a textile machine according to claim 29, a shifter device in said speed changing system to cause large but brief changes in the rate of pattern feeding of said yarn governor system, thus effectively shifting the phase sharply between the yarn pattern feeding rate of said yarn governor system and the cycles of said cyclically operated device, a yarn waster in said speed changing system operated in conjunction with said shifter device to keep out of the fabric a slack of yarn suddenly fed thereto in excess of a normal use rate by the operation of said shifter device, a cyclical creeper in said speed changing system to cause a relatively slow cyclic phase shift between the rate of yarn pattern feed controlled by the yarn governor system and the yarn layer cycles, said phase shift being equal in amount in both forward and backward directions and having a predetermined time displacement curve form, whereby planned cyclic fabric pattern characteristics may be superimposed on fabric pattern characteristics.

31. A textile machine according to claim 29 and in which said detector comprises a photoelectric cell.

32. A textile machine according to claim 29 and in which said speed changing system comprises means for imparting to said yarn governor a basic speed, and means to superimpose on said basic speed low speed increments.

33. In combination, a knitting machine, means for feeding characteristically marked yarn to said machine, checking means responsive to certain characteristic marks recurring in said yarn for checking the position of said yarn, means for applying a drag to said means for feeding, and means jointly controlled by said machine and said checking means for controlling the drag applying means.

34. The combination according to claim 33 and in which Foucault current drag is applied to the yarn feeding means, and the jointly controlled means includes a timer operated by the machine.

35. In combination, a knitting machine, means including a rotatable drum for feeding polychrome yarn to said machine, a disc rotating with said drum, means including a photoelectric cell responsive to light reflected by the yarn for recurrently checking the position of a certain recurring color spot on the yarn, means for applying a Foucault current drag to said disc, a timer controlled by said machine, and means jointly controlled by said timer and said cell for controlling the operation of said means for applying.

36. In combination, a knitted machine, a cell responsive to waves radiated by the yarn, means for feeding yarn to said machine past said cell including a first electric motor, means including a second electric motor and responsive to said cell for varying the rate of yarn feed, and connections between the rotor and stator coils of said motors.

37. In combination, a knitting machine, a photoelectric cell responsive to waves radiated by the yarn, means for feeding yarn to said machine past said cell including a first electric motor, means including a second electric motor and responsive to said photoelectric cell for varying the rate of yarn feed, and connectioins between said motors for maintaining their operation synchronous.

38. In combination, a knitting machine, a photoelectric cell responsive to waves radiated by the yarn, means for feeding yarn to said machine past said cell including a first selsyn motor, means including a second selsyn motor and responsive to said photoelectric cell for varying the rate of yarn feed, and connections between the rotor and stator coils of said motors.

39. In combination, a knitting machine, a photoelectric cell responsive to waves radiated by the yarn, means for feeding yarn to said machine past said cell, a cam for varying the length of the yarn between said photoelectric cell and said knitting machine, means controlled by said photoelectric cell for controlling the feeding of yarn to said machine, and means controlled by said machine for rotating said cam.

40. In combination, a knitting machine, a photoelectric cell responsive to waves radiated by the yarn, means for feeding yarn to said machine past said cell, a spring-pressed lever pivoted intermediate its ends, a cam engaging one end of said lever, a roller carried by the other end of said lever on which the yarn is wound between said photoelectric cell and said knitting machine, means controlled by said photoelectric cell for controlling the feeding of yarn to said machine, and means controlled by the power shaft of said machine for rotating said cam.

41. In combination, a knitting machine for knitting polychrome yarn having a repeated color pattern, means for varying the length of stitches, and variable means operable in accordance with the rate of yarn use by said machine for controlling said means for varying the length of stitches.

42. In combination, a knitting machine for knitting polychrome yarn having a repeated color pattern, means including cam surfaces for longitudinally reciprocating said needles to vary the length of stitches, and variable means operable in accordance with the rate of yarn fed to said needles for controlling said means first mentioned.

43. The combination in accordance with claim 41 and in which the variable means comprises electromagnetic means controlled from a distant point.

44. In combination, a knitting machine having needles, means for feeding polychrome yarn having recurrent color patterns to said needles at varying rates, means for taking up the slack in the yarn between adjacent needles, means operable in accordance with the rate of the yarn feed to said needles for actuating said last mentioned means, a pattern sequence controller for variably operating the yarn feeding means in accordance with a prearranged pattern, and electromagnetic means operated by said controller for actuating the means to take up the slack.

45. In combination, a knitting machine having needles, a resilient pin of substantially the same diameter as said needles, a mounting for said pin above said needles, a stop in the path of said pin below the tops of the needles, electromagnetic means for moving said pin between said needles, and means operable in accordance with the rate of the yarn feed to said needles for actuating said electromagnetic means.

46. In combination, a knitting machine having needles, a hub carrying resilient spokes of substantially the same diameter as said needles, a mounting for said hub above said needles, a stop in the path of the spoke ends below the tops of the needles, electromagnetic means for rotating said hub, and means operable in accordance with the rate of the yarn feed to said needles for actuating said electromagnetic means.

47. In combination, a knitting machine having needles, a hub carrying resilient spokes of substantially the same diameter as said needles, a mounting for said hub above said needles, a stop in the path of the spoke ends below the tops of the needles, electromagnetic means for rotating said hub, means including a pattern controller operated by said machine for feeding polychrome yarn at a predetermined varying rate to said needles, a photoelectric cell responsive to waves radiated by said yarn, a timer operated by said machine, means controlled by said photoelectric cell and said timer for checking the position of said yarn, and means operated by said controller for actuating said electromagnetic means.

ARTHUR H. ADAMS.